United States Patent
Tripathi et al.

(10) Patent No.: US 11,979,820 B2
(45) Date of Patent: May 7, 2024

(54) METHOD AND APPARATUS FOR EFFICIENT NEIGHBORING CELL SEARCH IN A WIRELESS COMMUNICATION NETWORK

(71) Applicant: Samsung Electronics Co., Ltd., Suwon-si (KR)

(72) Inventors: Nishithkumar D. Tripathi, Parker, TX (US); Kyeongin Jeong, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 179 days.

(21) Appl. No.: 17/517,562

(22) Filed: Nov. 2, 2021

(65) Prior Publication Data

US 2022/0150806 A1    May 12, 2022

Related U.S. Application Data

(60) Provisional application No. 63/190,655, filed on May 19, 2021, provisional application No. 63/187,215, (Continued)

(51) Int. Cl.
*H04W 48/16* (2009.01)
*H04B 17/318* (2015.01)
(Continued)

(52) U.S. Cl.
CPC .......... *H04W 48/16* (2013.01); *H04B 17/318* (2015.01); *H04W 48/04* (2013.01); *H04W 48/20* (2013.01)

(58) Field of Classification Search
CPC ............................. H04W 36/30; H04B 17/318
(Continued)

(56) References Cited

U.S. PATENT DOCUMENTS

2019/0182742 A1 * 6/2019 Fujishiro ........... H04W 36/0061
2019/0223073 A1   7/2019 Chen et al.
(Continued)

FOREIGN PATENT DOCUMENTS

KR   10-2020-0102497 A   8/2020
WO      2020076220 A1    4/2020
(Continued)

OTHER PUBLICATIONS

International Search Report and Written Opinion dated Feb. 15, 2022 regarding Intenrational Application No. PCT/KR2021/016516, 8 pages.
(Continued)

*Primary Examiner* — Kiet M Doan

(57) ABSTRACT

Methods and apparatuses of UE for an efficient neighbor cell search in a wireless communication network. A method of a UE comprises: receiving system information including time instance information for performing measurements on neighboring cells; identifying a time instance included in the time instance information; determining, based on a comparison between a current absolute time and the time instance, whether to perform the measurements on the neighboring cells; and skipping performing the measurements on the neighboring cells based on a determination that the current absolute time is before the time instance.

12 Claims, 25 Drawing Sheets

Related U.S. Application Data filed on May 11, 2021, provisional application No. 63/164,769, filed on Mar. 23, 2021, provisional application No. 63/153,651, filed on Feb. 25, 2021, provisional application No. 63/151,304, filed on Feb. 19, 2021, provisional application No. 63/141,070, filed on Jan. 25, 2021, provisional application No. 63/141,183, filed on Jan. 25, 2021, provisional application No. 63/126,846, filed on Dec. 17, 2020, provisional application No. 63/118,525, filed on Nov. 25, 2020, provisional application No. 63/112,926, filed on Nov. 12, 2020.

(51) Int. Cl.
*H04W 48/04* (2009.01)
*H04W 48/20* (2009.01)

(58) Field of Classification Search
USPC .......................................... 370/330; 455/423
See application file for complete search history.

(56) References Cited

U.S. PATENT DOCUMENTS

| | | | |
|---|---|---|---|
| 2019/0335389 | A1 | 10/2019 | Lindoff et al. |
| 2020/0229052 | A1* | 7/2020 | Zhang .................. H04B 17/318 |
| 2021/0360645 | A1 | 11/2021 | Chen |
| 2021/0392525 | A1* | 12/2021 | Kaikkonen .......... H04B 7/0695 |
| 2022/0086671 | A1 | 3/2022 | Hong |
| 2022/0349979 | A1* | 11/2022 | Feki ...................... G01S 5/0278 |

FOREIGN PATENT DOCUMENTS

| | | |
|---|---|---|
| WO | 2020145559 A1 | 7/2020 |
| WO | 2020156436 A1 | 8/2020 |

OTHER PUBLICATIONS

"3rd Generation Partnership Project; Technical Specification Group Radio Access Network; Solutions for NR to support non-terrestrial networks (NTN) (Release 16)", 3GPP TR 38.821 V16.0.0, Dec. 2019, 140 pages.
"5G; NR; Radio Resource Control (RRC); Protocol specification (3GPP TS 38.331 version 16.2.0 Release 16)", ETSI TS 138 331 V16.2.0, Nov. 2020, 908 pages.
"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.2.0, Sep. 2020, 1,149 pages.
"5G; NR; User Equipment (UE) procedures in idle mode and in RRC Inactive state (3GPP TS 38.304 version 16.2.0 Release 16)", ETSI TS 138 304 V16.2.0, Nov. 2020, 41 pages.
"LTE; Evolved Universal Terrestrial Radio Access (E-UTRA); User Equipment (UE) procedures in idle mode (3GPP TS 36.304 version 16.2.0 Release 16)", ETSI TS 136 304 V16.2.0, Nov. 2020, 66 pages.
"5G; NR; Requirements for support of radio resource management (3GPP TS 38.133 version 16.5.0 Release 16)", ETSI TS 138 133 V16.5.0, Dec. 2020, 1,610 pages.
"LTE; Evolved Universal Terrestrial Radio Access (E-UTRA); Requirements for support of radio resource management (3GPP TS 36.133 version 16.7.0 Release 16)", ETSI TS 136 133 V16.7.0, Dec. 2020, 3,706 pages.
3GPP TS 38.321 V16.2.0 (Sep. 2020); 3rd Generation Partnership Project; Technical Specification Group Radio Access Network; NR; Medium Access Control (MAC) protocol specification, (Release 16), Sep. 2020, 154 pages.
"LTE; Evolved Universal Terrestrial Radio Access (E-UTRA); Medium Access Control (MAC) protocol specification (3GPP TS 36.321 version 16.2.0 Release 16)", ETSI TS 136 321 V16.2.0, Nov. 2020, 144 pages.
"5G; NG-RAN; Xn Application Protocol (XnAP) (3GPP TS 38.423 version 16.3.0 Release 16)", ETSI TS 138 423 V16.3.0, Nov. 2020, 449 pages.
Extended European Search Report issued Mar. 4, 2024 regarding Application No. 218923597, 14 pages.
Samsung, "Idle and Inactive Mode Aspects for an NTN—Observations and Proposals", 3GPP TSG RAN WG2 Meeting #112, R2-2008915, Nov. 2020, 14 pages.
Samsung, "Idle and Inactive Mode Aspects for an NTN—Observations and Proposals", 3GPP TSG RAN WG2 Meeting #113, R2-2100254, Jan. 2021, 10 pages.

* cited by examiner

METHOD AND APPARATUS FOR EFFICIENT NEIGHBORING CELL SEARCH IN A WIRELESS COMMUNICATION NETWORK

CROSS-REFERENCE TO RELATED APPLICATIONS AND CLAIM OF PRIORITY

The present application claims priority to: U.S. Provisional Patent Application No. 63/112,926, filed on Nov. 12, 2020; U.S. Provisional Patent Application No. 63/118,525, filed on Nov. 25, 2020; U.S. Provisional Patent Application No. 63/126,846, filed on Dec. 17, 2020; U.S. Provisional Patent Application No. 63/141,070, filed on Jan. 25, 2021; U.S. Provisional Patent Application No. 63/141,183, filed on Jan. 25, 2021; U.S. Provisional Patent Application No. 63/151,304, filed on Feb. 19, 2021; U.S. Provisional Patent Application No. 63/153,651, filed on Feb. 25, 2021; U.S. Provisional Patent Application No. 63/164,769, filed on Mar. 23, 2021; U.S. Provisional Patent Application No. 63/187,215, filed on May 11, 2021; and U.S. Provisional Patent Application No. 63/190,655, filed on May 19, 2021. The contents of the above-identified patent documents are incorporated herein by reference.

TECHNICAL FIELD

The present disclosure relates generally to wireless communication systems and, more specifically, the present disclosure relates to an efficient neighbor cell search in a wireless communication network.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to an efficient neighbor cell search in a wireless communication network.

In one embodiment, a user equipment (UE) in a wireless communication system is provided. The UE comprises a transceiver configured to receive system information including time instance information for performing measurements on neighboring cells, The UE further comprises a processor operably coupled to the transceiver, the processor configured to: identify a time instance included in the time instance information; determine, based on a comparison between a current absolute time and the time instance, whether to perform the measurements on the neighboring cells; and skip performing the measurements on the neighboring cells based on a determination that the current absolute time is before the time instance.

In another embodiment, a method of a UE in a wireless communication system is provided. The method comprises: receiving system information including time instance information for performing measurements on neighboring cells; identifying a time instance included in the time instance information; determining, based on a comparison between a current absolute time and the time instance, whether to perform the measurements on the neighboring cells; and skipping performing the measurements on the neighboring cells based on a determination that the current absolute time is before the time instance.

In yet another embodiment, a base station (BS) in a wireless communication system is provided. The BS comprises a processor configured to generate time instance information including a time instance and a transceiver operably coupled to the processor, the transceiver configured to transmit system information including the time instance information for measurements on neighboring cells, wherein: whether to perform the measurements on the neighboring cells is determined based on a comparison between a current absolute time and the time instance included in the time instance information, and performing the measurements on the neighboring cells is skipped based on a determination that the current absolute time is before the time instance.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TR38.821 v.16.0.0, "Solutions for NR to support non-terrestrial networks (NTN)"; 3GPP TS38.331 v.16.2.0, "Radio Resource Control (RRC) protocol specification"; 3GPP TS36.331 v.16.2.0, "Radio Resource Control (RRC) protocol specification"; 3GPP TS38.304 v.16.2.0, "User Equipment (UE) procedures in Idle mode and RRC Inactive state"; 3GPP TS36.304 v.16.2.0, "User Equipment (UE) procedures in idle mode"; 3GPP TS38.133 v.16.5.0, "NR-Requirements for Support of Radio Resource Management"; 3GPP TS36.133, v.16.7.0, "Requirements for Support of Radio Resource Management"; 3GPP, TS38.321 v.16.2.0, "Medium Access Control (MAC) protocol specification"; 3GPP TS36.321 v.16.2.0, "Medium Access Control (MAC) protocol specification"; and 3GPP TS38.423 v.16.3.0, "Xn application protocol (XnAP)."

Figure 1:
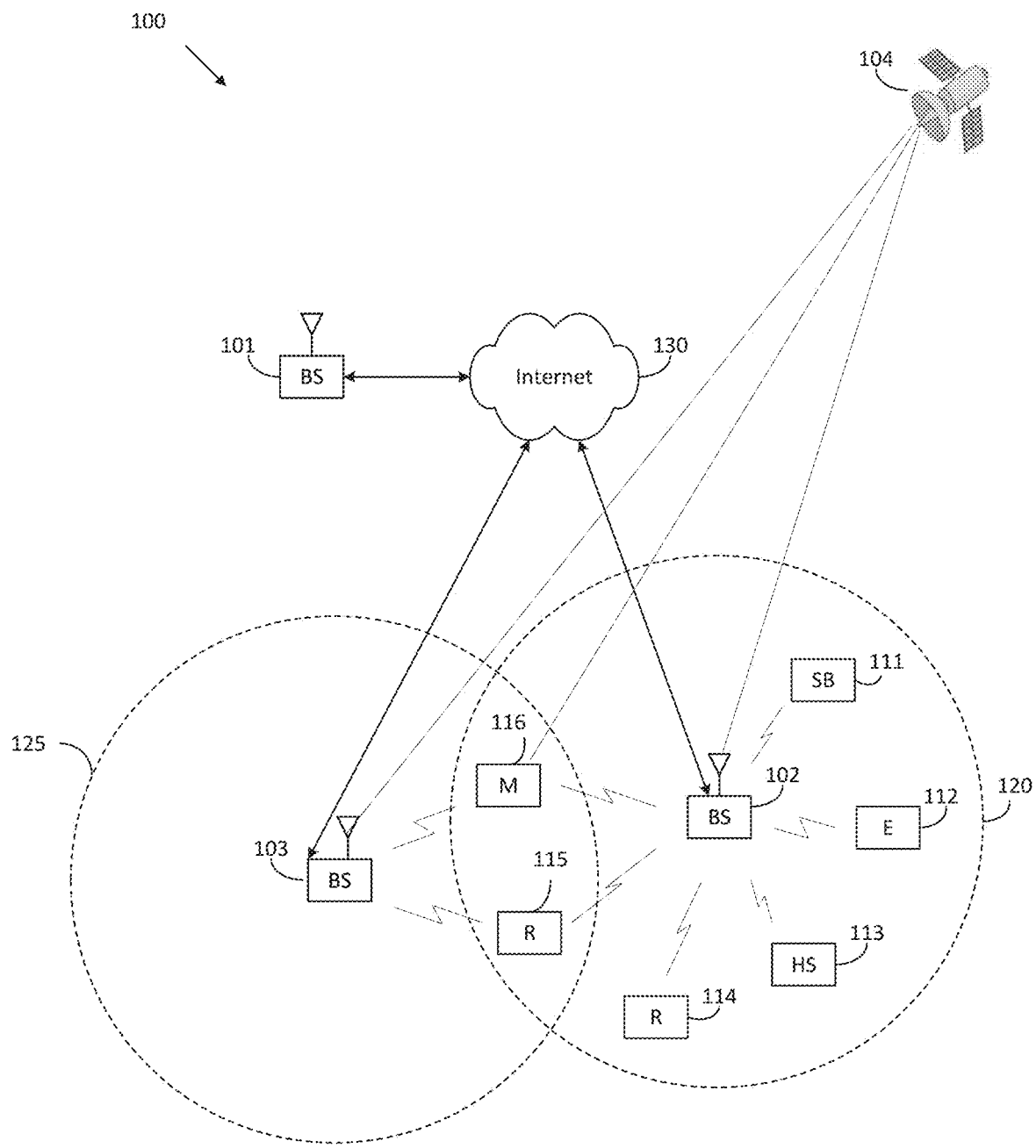
FIG. 1 illustrates an example wireless network according to embodiments of the present disclosure.
Figure 2:
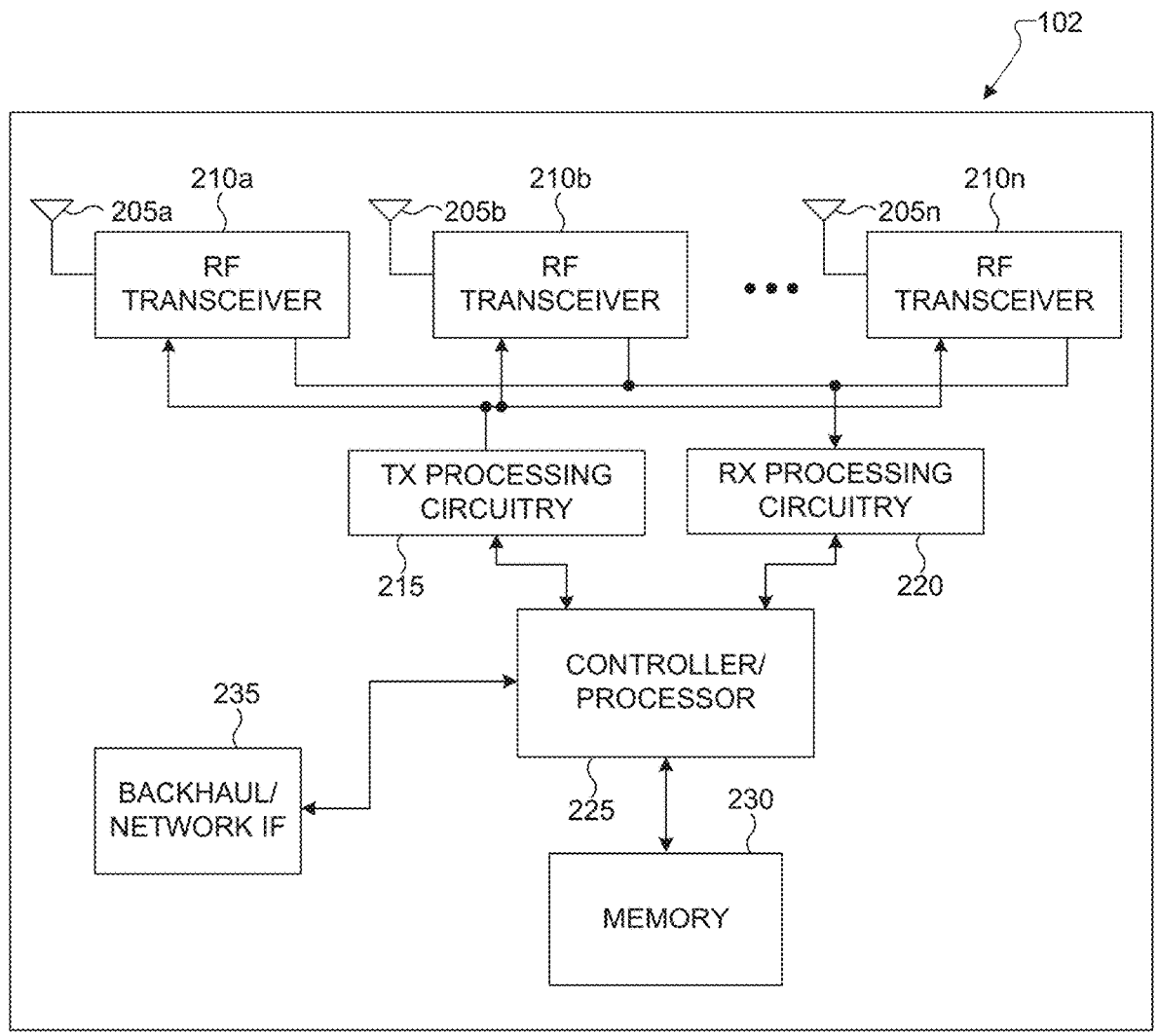
FIG. 2 illustrates an example gNB according to embodiments of the present disclosure.
Figure 3:
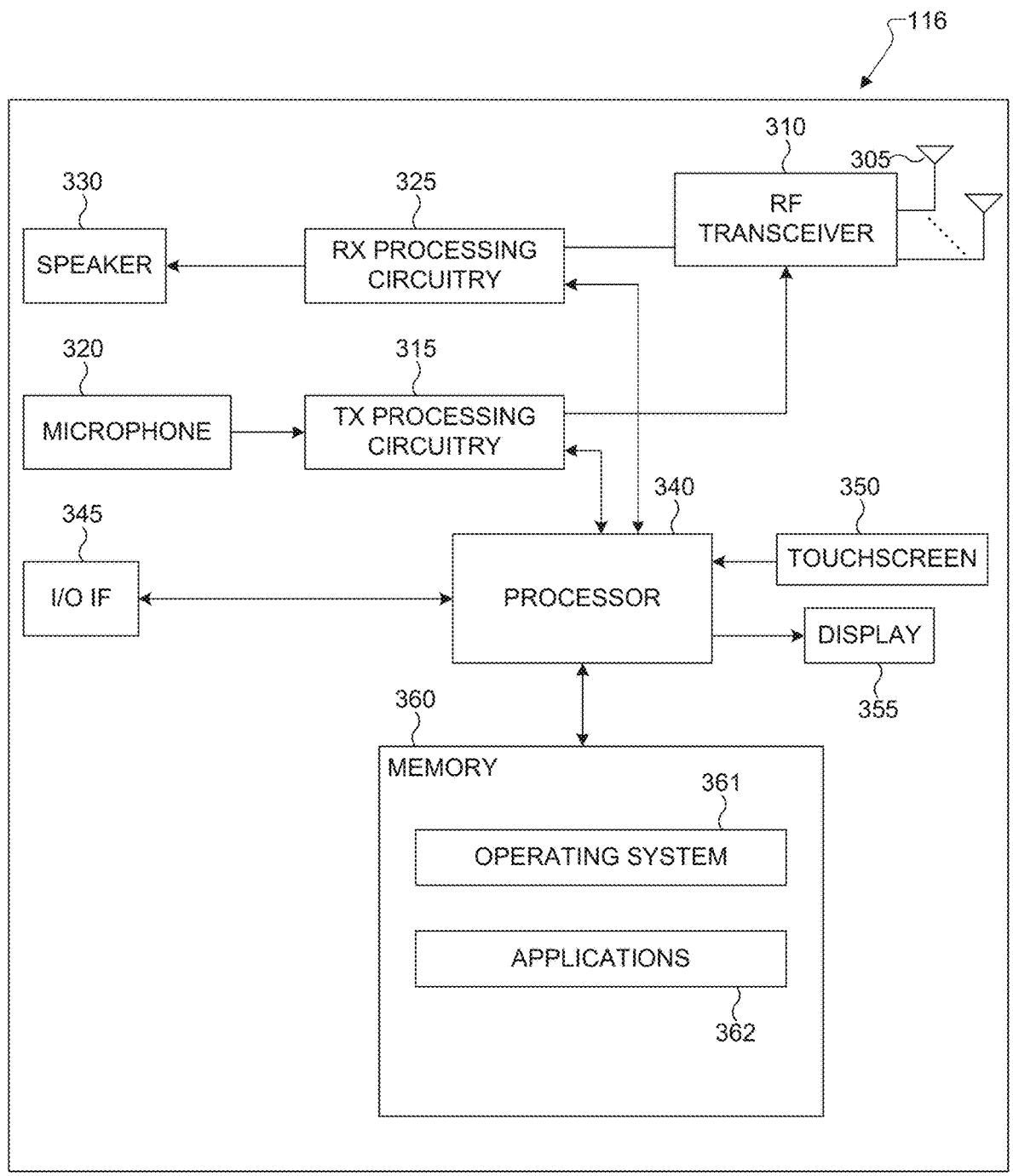
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for receiving system information including: information corresponding to location coordinates for a NTN gateway; information corresponding to a processing delay between the UE and a BS; and information corresponding to a reference point location; determining a timing advance based on a timing difference between the reference point location and the BS; and transmitting a timing advance report based on the determined timing advance. One or more of the gNBs 101-103 includes circuitry, programing, or a combination thereof, for generating system information including: information corresponding to location coordinates for a NTN gateway; information corresponding to a processing delay between a UE and a base station; and information corresponding to a reference point location; transmitting the system information; and receiving a timing advance report based on a timing advance, wherein the timing advance is based on a timing difference between the reference point location and the base station.

As described in more detail below, one or more of the UEs 111-116 include circuitry, programing, or a combination thereof, for an efficient neighbor cell search in a wireless communication network. In certain embodiments, and one or more of the gNBs 101-103 includes circuitry, programing, or a combination thereof, for an efficient neighbor cell search in a wireless communication network. Further, the network 100 could be an NTN in which one or more of the gNBs 101-103 are replaced by or receive network access via a non-terrestrial node such as a satellite.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection (e.g., a wireless network link including a non-terrestrial node). When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support an efficient neighbor cell search in a wireless communication network. For example, the gNB 102 may be or may receive network access via a non-terrestrial node such as a satellite. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for an efficient neighbor cell search in a wireless communication network. For example, in various embodiments, the UE 116 may communicate directly or indirectly with a non-terrestrial node such as a satellite. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
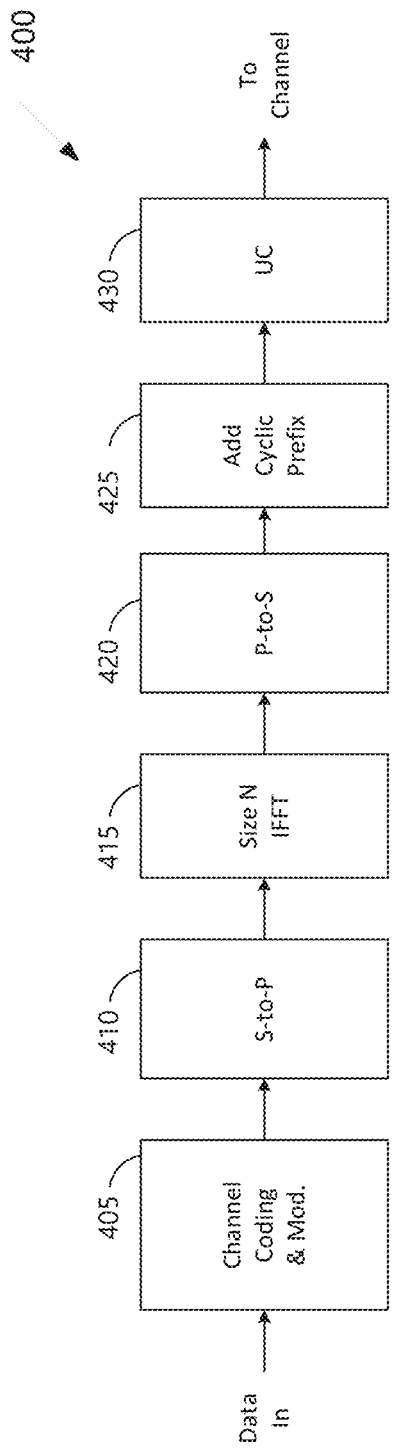
FIGS. 4 and 5 illustrate examples wireless transmit and receive paths according to this disclosure.
Figure 5:
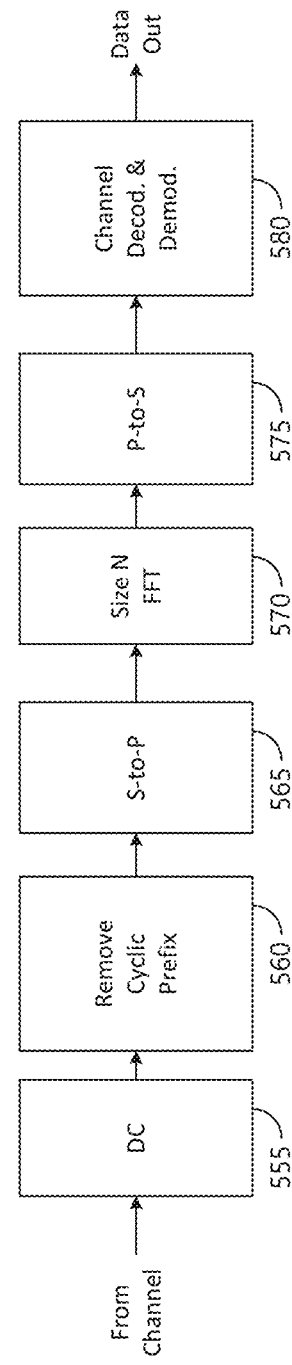

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support SIB based cell changes in NTN as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6:
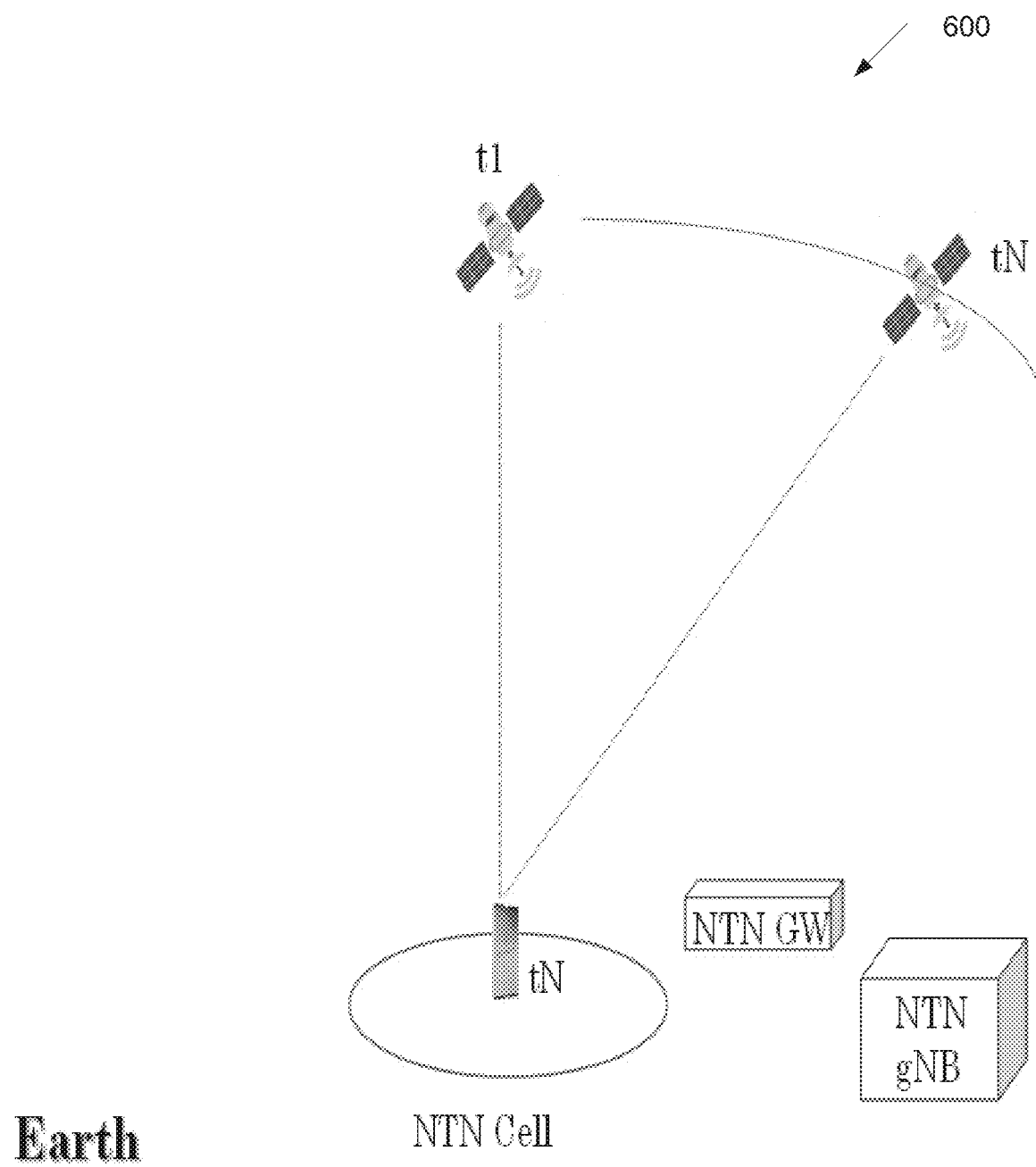
FIG. 6 illustrates an example of NTN configuration according to embodiments of the present disclosure.

FIG. 6 illustrates an example NTN configuration 600 according to an embodiment of the present disclosure. The embodiment of the example of NTN configuration 600 illustrated in FIG. 6 is for illustration only. FIG. 6 does not limit the scope of this disclosure to any particular implementation of the example of NTN configuration 600.

As illustrated in FIG. 6, specifically, the UE is attempting to estimate the UE's distance from the aerial/space-borne platform (e.g., a satellite) in NTN. Such distance estimate can then be used to do any timing pre-compensation at the UE. This knowledge can also be used to determine, report and use a suitable timing advance.

The aerial/space-borne platform acquires its own GNSS-based position at time t1. This information reaches a gNB via an NTN gateway. The gNB places the satellite's (potentially transformed position) in suitable system information (SI). The UE receives the satellites position at time tN and can now compare the satellite's position with the UE's own position at time tN. While FIG. 6 shows the aerial/space-borne platform moving from left to right, such platform may also be stationary with respect to a point on the earth's surface.

Figure 7:
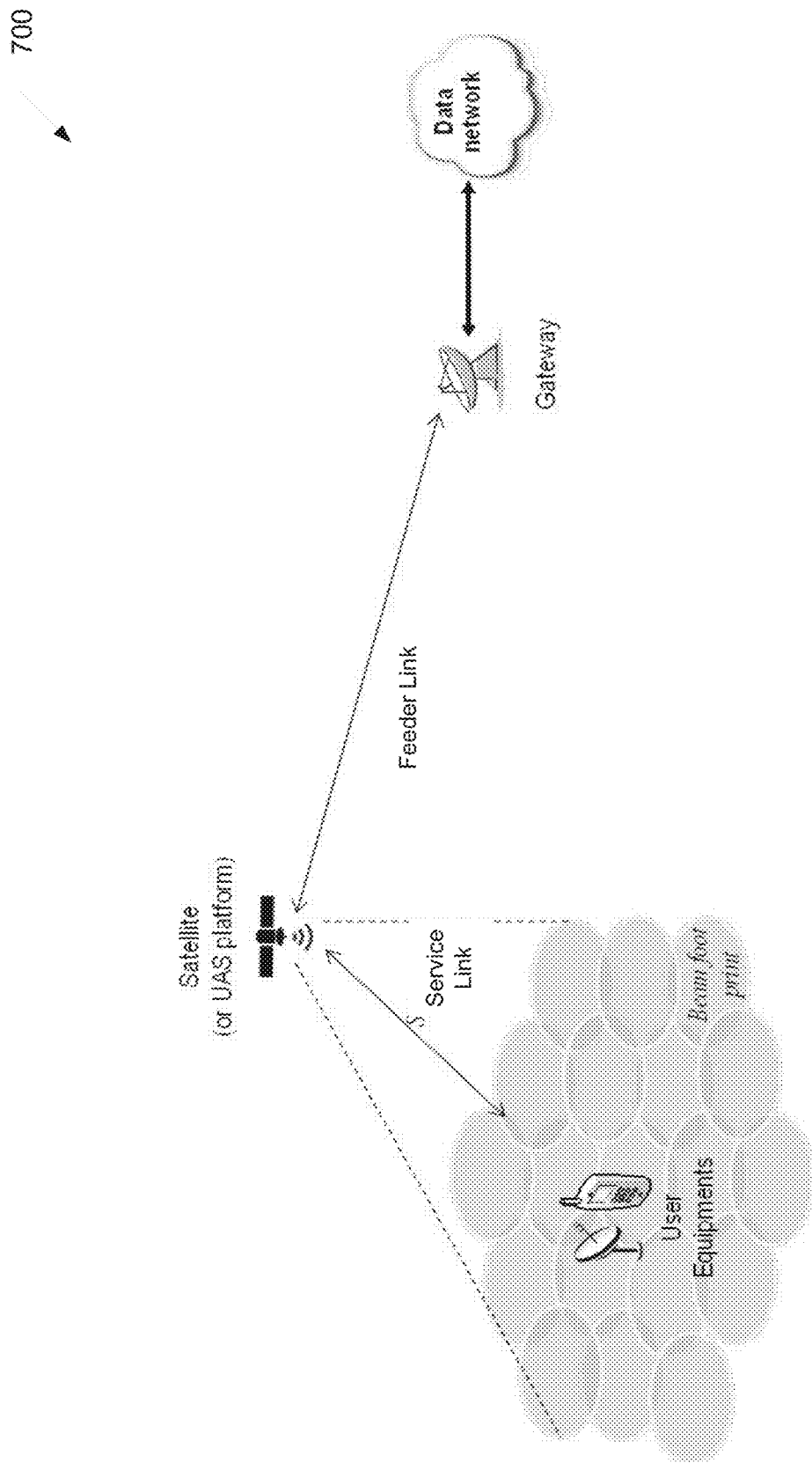
FIG. 7 illustrates an example of NTN communication.

FIG. 7 illustrates an example NTN communication network 700 according to embodiments of the present disclosure. For example, the NTN communication network 700 may be implemented in the network 700 in FIG. 7. An embodiment of the NTN communication network 700 shown in FIG. 7 is for illustration only.

The present disclosure is useful when long propagation delays exist such as those in am NTN. A brief description of an NTN is given below.

A traditional cellular network has all the necessary pieces of communications equipment on earth. Such network is often referred to as a terrestrial network (TN). In contrast, an NTN, as envisioned by 3GPP, makes use of some communications equipment that is located at a very high altitude above earth (e.g., more than tens of kilometers). FIG. 7 shows an example of an NTN that is using a space-borne vehicle such as a satellite or an air-borne vehicle such as an unmanned aircraft system or unmanned aerial system (UAS). An example of a UAS is a high altitude platform station (HAPS) such as a balloon or a special type of aircraft in stratosphere. The satellite could be geostationary earth orbiting (GEO), medium earth orbiting (MEO), or low earth orbiting (LEO), and highly elliptical orbiting (HEO).

The communication link between the NTN UE and the satellite is called the service link and the communication link between the NTN Gateway and the satellite is called the feeder link. Two satellites may communicate with each other using an inter satellite link (ISL). The satellite may carry a transparent payload or a regenerative payload for communications with the transceivers on earth.

A transparent payload implies that the communication equipment in the satellite is essentially an RF repeater. A transparent satellite payload receives an RF signal from a transmitter on earth, amplifies it, and transmits the amplified RF signal toward a receiver on earth. In case of a transparent payload, the gNB on earth sends/receives an NR RF signal to/from the NTN Gateway that is directly communicating with the satellite.

A regenerative payload involves some baseband processing on the satellite. For example, a full-fledged gNB may be on the satellite. In such case, the satellite and the NTN gateway implement the NG (i.e., N2 and N3) interfaces of the 5G network on the feeder link. In another implementation example, the gNB may be decomposed or disaggregated, where the satellite may implement gNB-DU (distributed unit) and the gNB-CU (central unit) would be on earth. The satellite and the NTN GW would then implement the F1 interface on the feeder link.

The 3GPP Release 16 has defined a mechanism that enables a UE to choose between a 4-Step random access (RA) procedure and a 2-Step RA procedure when both are configured for a UE in a TN. In the legacy 3GPP R16, the UE chooses 2-step RA when the measured reference signal received power (RSRP) in the serving cell exceeds the parameter "msgA-RSRP-Threshold." More specifically, msgA-RSRP-threshold is an RSRP threshold for selection between 2-step RA type and 4-step RA type when both 2-step and 4-step RA type random access resources are configured in the UL bandwidth part (BWP) for a given UE.

In an NTN, due to similar RSRPs in different parts of the cell, the RSRP-based RA type selection may not be reliable. Hence, a new method is needed. Hence, the current disclosure replaces such standalone threshold associated with the trigger quantity "RSRP" by a variety of triggers that utilize a standalone signal measurement quantity, a standalone non-signal measurement quantity, and a combination of two or more quantities from a set of signal measurement quantities and/or a set of non-signal measurement quantities.

Figure 8:
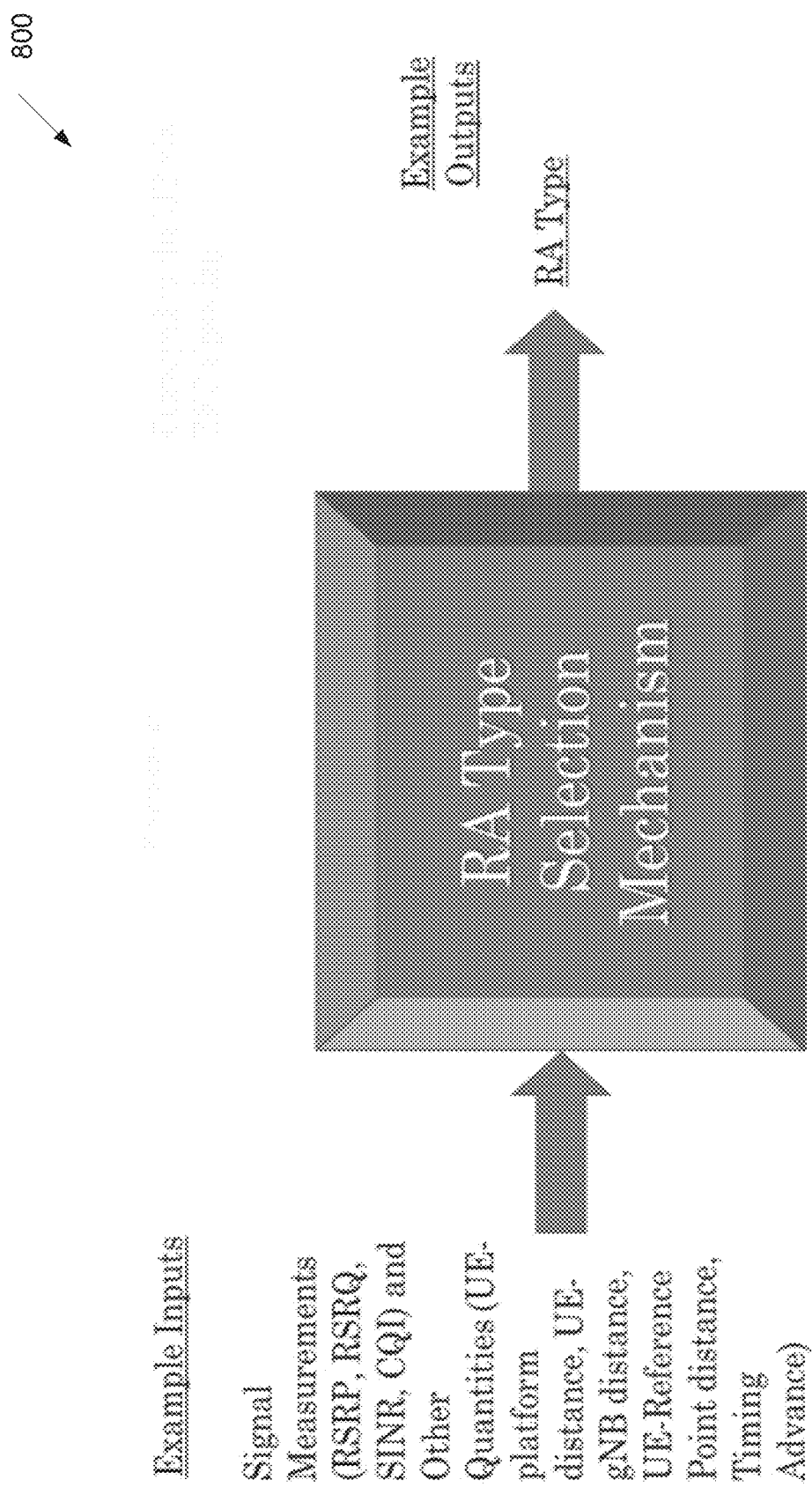
FIG. 8 illustrates an example of RA type selection mechanism according to embodiments of the present disclosure.

FIG. 8 illustrates an example of RA type selection mechanism 800 according to embodiments of the present disclosure. An embodiment of the RA type selection mechanism 800 shown in FIG. 8 is for illustration only.

FIG. 8 summarizes example inputs and outputs of the random access type ("RA_TYPE") selection mechanism at the UE. This mechanism enables the UE to properly choose between a 4-Step RA procedure and a 2-Step RA procedure in an NTN.

The RA type selection mechanism uses two types of inputs: (i) signal measurements such as RSRP, reference signal received quality (RSRQ), signal to interference plus noise ratio (SINR), and channel quality indicator (CQI) and (ii) non-signal measurements such as distances, timing advance (TA), and time since last handover (or equivalently, remaining dwell time in the serving cell). The output of the mechanism is the selected RA type.

In one embodiment, the distance between the UE and the platform can be represented by an equivalent propagation time, which could be one-way propagation time or round trip time (RTT). For example, propagation time=(speed of light)/(distance), where the speed of light is approximately $3 \times 10^8$ m/s and distance is the distance between the UE and the platform (e.g., satellite or HAPS).

If the UE does not know its GNSS-based location (e.g., due to lack of its capability or due to the GNSS being unavailable or inaccurate at the time of RA type selection), the triggers that do not rely on the GNSS-based UE location can certainly be used (e.g., RSRP, RSRQ, SINR, and CQI).

Figure 9:
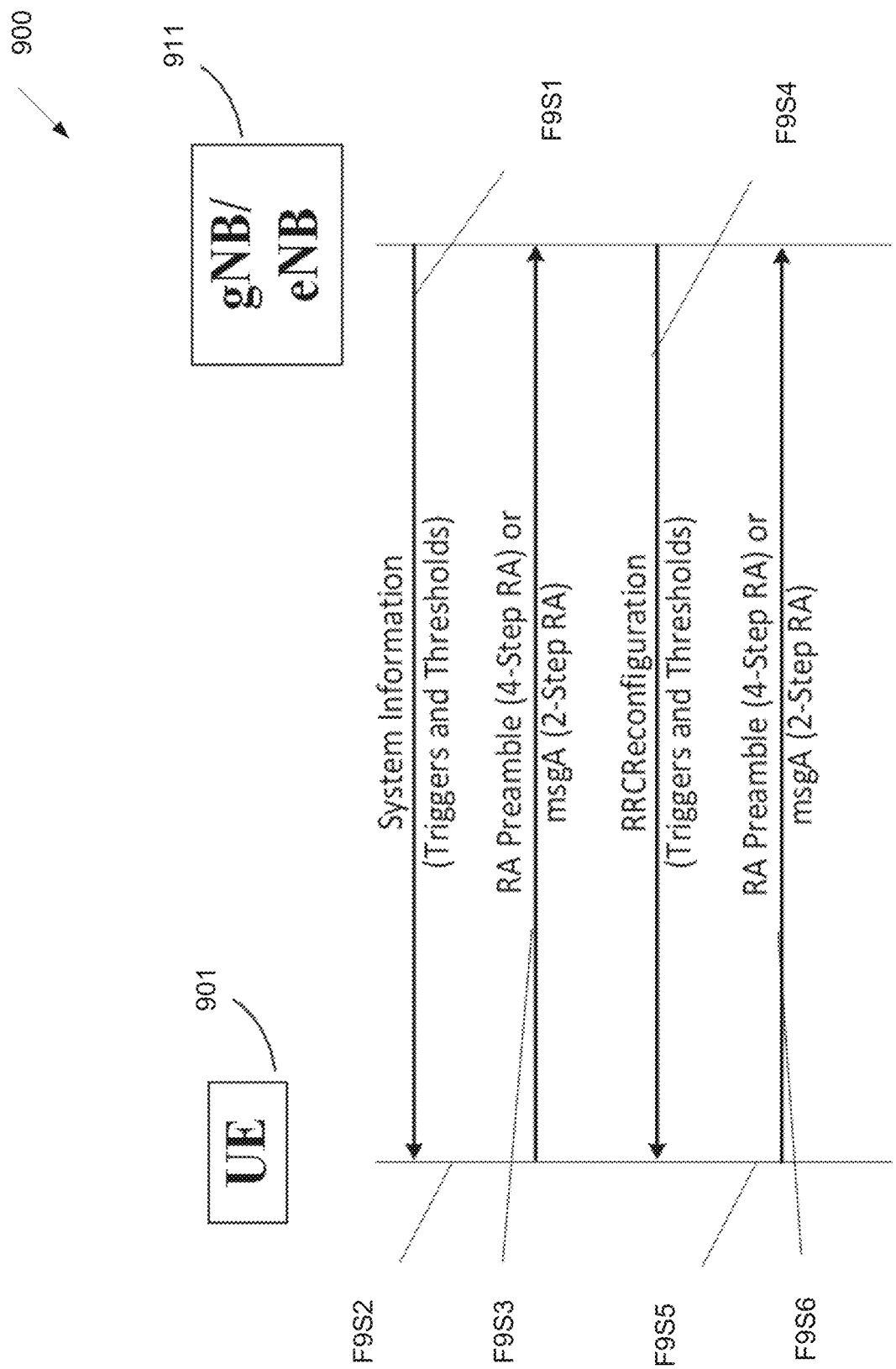
FIG. 9 illustrates a signaling flow for UE-network procedure according to embodiments of the present disclosure.
Figure 10:
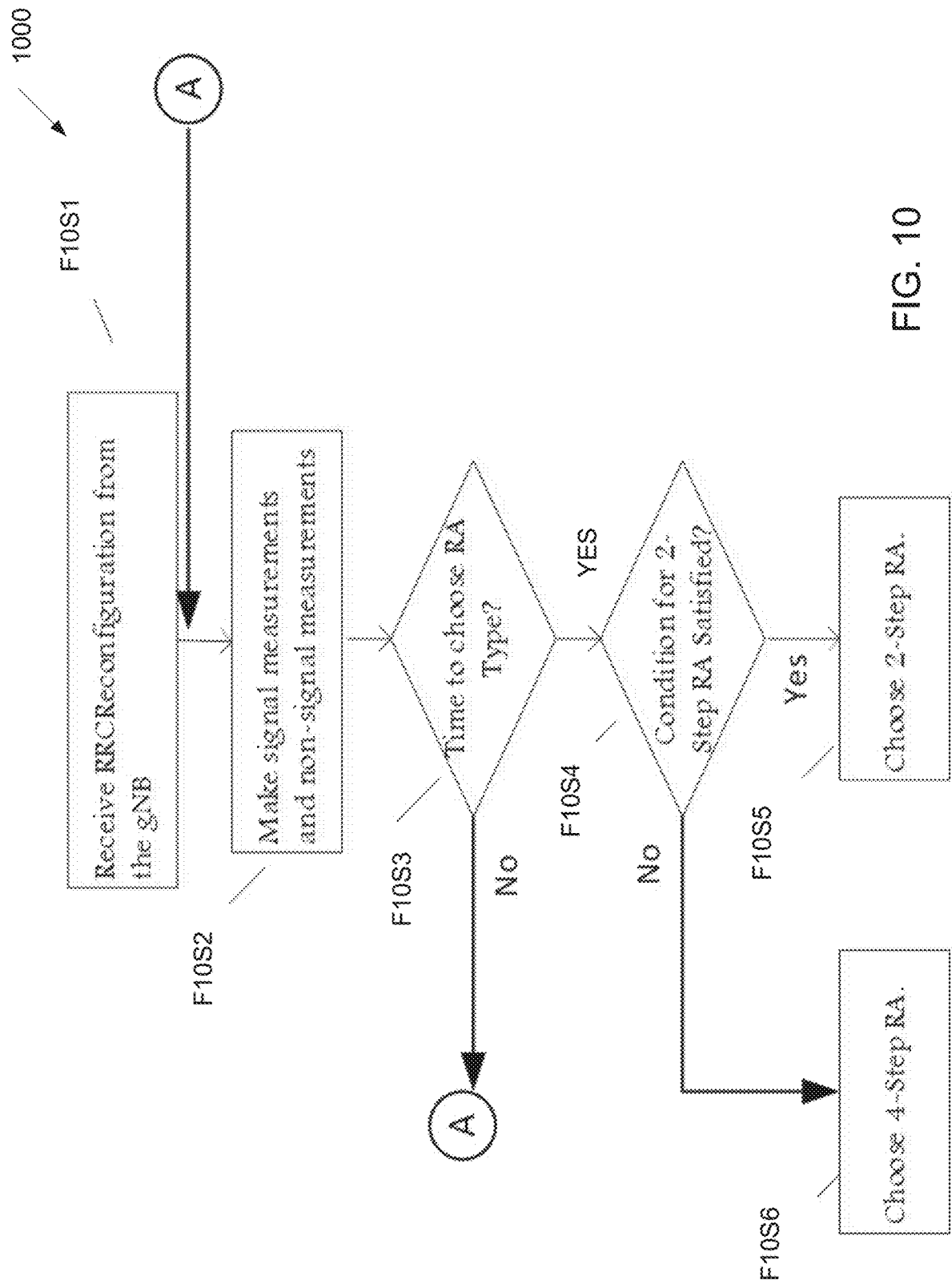
FIG. 10 illustrates a flowchart of a method for RA type selection framework according to embodiments of the present disclosure.

Details of the UE-network signaling exchange and the UE procedure for the disclosure are provided in FIG. 9 and FIG. 10, respectively.

FIG. 9 illustrates a signaling flow for UE-network procedure 900 according to embodiments of the present disclosure. For example, the UE-network procedure 900 as may be performed by a UE (e.g., 111-116 as illustrated in FIG. 1) and/or a BS (e.g., 101-103 as illustrated in FIG. 1). An embodiment of the UE-network procedure 900 shown in FIG. 9 is for illustration only. One or more of the components illustrated in FIG. 22 can be implemented in specialized circuitry configured to perform the noted functions or one or more of the components can be implemented by one or more processors executing instructions to perform the noted functions.

AS illustrated in FIG. 9, in Step F9S1, in one example, the gNB (911) specifies to UEs (901) in a cell one or more trigger quantities and associated trigger thresholds to facilitate the RA type selection at UEs via common broadcast signaling such as system information (SI) signaling. A UE uses such broadcast parameters to select a RA type until the UE gets updated parameters via dedicated RRC signaling. Details of these triggers are given in Step F9S4. Furthermore, in one example, one or more trigger conditions or trigger conditions are explicitly identified. In another example, one or more trigger conditions or trigger conditions are pre-defined in specifications (i.e., similar to the legacy 3GPP R16).

In one example, in Step F9S1, to support load balancing between 2-Step RA resources and 4-Step RA resources, the gNB advertises a threshold ("RA_Type_LoadBalancing_Threshold") in a SIB. This threshold can then be used by the UE in Step F9S2 and/or Step F9S5 to choose the RA type. For example, the UE generates a random number X and if X is greater than RA_Type_LoadBalancing_Threshold, the UE chooses the 2-step RA; otherwise, the UE chooses the 4-step RA. The condition "greater than" can be replaced by "greater than or equal to," "less than," or "less than or equal to." Furthermore, "the UE chooses the 2-step RA; otherwise, the UE chooses the 4-step RA" can be reverse such that "the UE chooses the 4-step RA; otherwise, the UE chooses the 2-step RA."

In yet another example, the UE carries out RA type selection based on the LCG characteristics.

In yet another example, the UE uses the priority associated with the assigned 5QI to select the RA type. If multiple bearers have been set up, the highest-priority 5QI is used by the UE to choose the RA type.

In yet another example, the UE uses the cause for random access (e.g., RRC connection setup or reestablishment and handover) to choose the RA type.

In one embodiment, two or more of (i) signal measurements, (ii) non-signal measurements, (iii) LCG, (iv) 5QI, and (v) random access cause are combined (e.g., weighted in a pre-defined manner) by the UE to choose the RA type.

In Step F9S2, in an embodiment, the UE makes one or more signal measurements identified in Step F9S4. The UE also determines zero or more of non-signal measurements identified in Step F9S4. The UE evaluates one or more trigger conditions to select the RA type. Details of these trigger conditions are given in Step F9S5 below.

In Step F9S3, the UE sends a RA Preamble to the gNB when the UE has selected the 4-Step RA procedure. If the UE has selected the 2-Step RA procedure, the UE sends msgA to the gNB.

The Steps F9S4 to F9S6 are applicable after a dedicated RRC signaling connection between the UE and its serving cell has been established.

In Step F9S4, in one example, the gNB utilizes dedicated RRC signaling to specify to the UE one or more trigger quantities and associated trigger thresholds to facilitate the RA type selection at the UE. Furthermore, in one example, one or more trigger conditions or trigger conditions are explicitly identified. In another example, one or more trigger conditions or trigger conditions are pre-defined in specifications.

In one embodiment, the trigger quantities include (i) signal measurements such as RSRP, RSRQ, SINR, and CQI and (ii) non-signal measurements such as distance from the cell center, distance from the serving cell, distance from a neighbor cell, timing advance for the serving cell, and timing advance for a neighbor cell, time since last handover, (estimated) time remaining in the serving cell, and power headroom. The quantities related to a neighbor cell are relevant when the random access procedure is used during handover.

In Step F9S5, in an embodiment, the UE makes one or more signal measurements identified in Step F9S4. The UE also determines zero or more of non-signal measurements identified in Step F9S4.

In Step F9S5, after quantifying signal measurements and non-signal measurements, the UE evaluates a condition to determine if a 2-step RA procedure may be used or a 4-step RA procedure may be used.

More specifically, in an embodiment, the UE utilizes one or more types of conditions or triggers from Condition (A), Condition (B), and Condition (C). In the descriptions below, Th1 is Threshold 1, Th2 is Threshold 2, and Hyst is hysteresis.

The structure of Condition (A) specified below as shown in TABLE 1.

TABLE 1

Condition (A)

If (Quantity 1 > Th1) AND (Quantity2 < Th2), use the 2-Step RA.
Otherwise, use the 4-Step RA.
  Condition (A)

Note that ">" can replaced by ">=" and "<" can be replaced by "<=" in Condition (A) above.

Quantity1 can be measuredSignalQuantity or measuredNonSignalQuantity, and Quantity2 can be measuredSignalQuantity or measuredNonSignalQuantity. Furthermore, these quantities can be for the serving cell, a neighbor cell, and both the serving cell and a neighbor cell.

In another embodiment, the UE evaluates the condition (B) specified below as shown in TABLE 2.

TABLE 2

Condition (B)

If (Quantity 1 > Th1) AND (Quantity2 > Th2), use the 2-Step RA.
Otherwise, use the 4-Step RA.
  Condition (B)

In yet another embodiment, the UE evaluates the condition (C) specified below as shown in TABLE 3.

TABLE 3

Condition (C)

If (Quantity 1 + Hyst > Th), use the 2-Step RA.
Otherwise, use the 4-Step RA.
  Condition (C)

In Condition (C), Th is a threshold and Hyst is a hysteresis.

In an example for Condition (C), Quantity1 is RSRP and Hyst is made a function of quantities such as non-RSRP signal measurements and non-signal measurements. Hyst can also be set to 0. Furthermore, Hyst is made larger to encourage the selection of a 2-step RA procedure when the UE is near the cell center. Additionally, Hyst is made smaller (even negative) to discourage the selection of a 2-step RA procedure when the UE is near the cell edge.

In another example, when Hyst is made larger to encourage the selection of a 2-step RA procedure when the UE is experiencing good channel conditions (e.g., high SINR or high CQI). In contrast, Hyst is made smaller (even negative) to discourage the selection of a 2-step RA procedure when the UE is experiencing poor channel conditions (e.g., low SINR or low CQI).

In an example for Condition (C), Quantity1 is RSRQ instead of RSRP.

In another example for Condition (C), Quantity1 is SINR instead of RSRP.

In yet another example for Condition (C), Quantity1 is CQI instead of RSRP.

In an example embodiment, the gNB informs the UE which condition (i.e., A, B, or C) to apply in a suitable message (e.g., an RRC reconfiguration message). In another example, such condition(s) is/are pre-defined in 3GPP specifications.

In Condition (A), Condition (B), and Condition (C), measuredSignalQuantity can be Quantity1 or Quantity2 and is one of as RSRP, RSRQ, SINR, and CQI. Furthermore, measuredNonSignalQuantity can be Quantity1 or Quantity2 and is one of distance from the cell center, distance from the serving cell, distance from a neighbor cell, Timing Advance for the serving cell, and Timing Advance for a neighbor cell. The quantities "distance from the serving cell" and "distance from a neighbor cell" can be (i) the distance between the UE and the platform (e.g., GEO, MEO, LEO, and HAPS) or (ii) the distance between the UE and the gNB that is controlling the cell under consideration.

In Step F9S6, the UE sends a RA Preamble to the gNB when the UE has selected the 4-Step RA procedure. If the UE has selected the 2-Step RA procedure, the UE sends msgA to the gNB.

Specific examples of trigger combinations that utilize Condition (A) and Condition (B) are given below as shown in TABLE 4.

TABLE 4

Condition A1

Condition A1
If (RSRP > Th1) AND (distance_UE_ReferencePoint < Th2), use the 2-Step RA. Otherwise, use the 4-Step RA.

The first part of Condition (A1) indicates that the UE has adequate signal strength at the current location and the second part of Condition (A1) indicates that the UE is close to the Reference Point such as the cell center. When such condition is satisfied for the combined trigger of RSRP and distance_UE_ReferencePoint, the condition corresponds to a good quality of the radio environment, pointing to the suitability of the 2-Step RA procedure.

In an example, Condition A1 can be updated such that "Th1" is set to msgA-RSRP-Threshold (defined in Release 16), "distance_UE_ReferencePoint" is replaced by any new "candidate trigger" (e.g., any signal measurement or non-signal measurement such as UE-serving cell distance, UE-neighbor cell distance, one-way or round-trip propagation time or delay between the UE and the serving cell, one-way or round-trip propagation time or delay between the UE and the neighbor cell and so on). TABLE 5 shows Condition A1-1.

TABLE 5

Condition A1-1

If (RSRP > msgA-RSRP-Threshold) AND ("Candidate Trigger" < Threshold), use the 2-Step RA. Otherwise, use the 4-Step RA.

In yet another example, "<" can be replaced by ">", "<=" or ">=" depending upon the selected candidate trigger. TABLE 6 shows Condition A2.

TABLE 6

Condition A2

Condition A2
If (RSRP > Th1) AND (distance_UE_ServingCell < Th2), use the 2-Step RA. Otherwise, use the 4-Step RA.

The first part of Condition (A2) indicates that the UE has adequate signal strength at the current location and the second part of Condition (A2) indicates that the UE is close to the serving cell. The variable distance_UE_ServingCell may refer to the distance between the UE and the platform (e.g., a LEO satellite) or the distance between the UE and the gNB (which would be on the ground for the case of a transparent payload) Reference Point such as the cell center. When such condition is satisfied for the combined trigger of RSRP and distance_UE_ServingCell, the condition corresponds to a good quality of the radio environment, pointing to the suitability of the 2-Step RA procedure. TABLE 7 shows Condition A2.

TABLE 7

Condition A3

Condition A3
If (RSRQ > Th1) AND (distance_UE_ReferencePoint < Th2), use the 2-Step RA. Otherwise, use the 4-Step RA.

The first part of Condition (A3) indicates that the UE has adequate signal strength at the current location and the second part of Condition (A3) indicates that the UE is close to the Reference Point such as the cell center. When such condition is satisfied for the combined trigger of RSRP and distance_UE_ReferencePoint, the condition corresponds to a good quality of the radio environment, pointing to the suitability of the 2-Step RA procedure. TABLE 8 shows Condition A4.

TABLE 8

Condition A4

Condition A4
If (RSRQ > Th1) AND (distance_UE_ServingCell < Th2), use the 2-Step RA. Otherwise, use the 4-Step RA.

The first part of Condition (A4) indicates that the UE has adequate signal strength at the current location and the second part of Condition (A4) indicates that the UE is close to the serving cell. The variable distance_UE_ServingCell may refer to the distance between the UE and the platform (e.g., a LEO satellite) or the distance between the UE and the gNB (which would be on the ground for the case of a transparent payload) Reference Point such as the cell center. When such condition is satisfied for the combined trigger of RSRP and distance_UE_ServingCell, the condition corresponds to a good quality of the radio environment, pointing to the suitability of the 2-Step RA procedure. TABLE 9 shows Condition A5.

TABLE 9

Condition A5

Condition A5
If (SINR > Th1) AND (distance_UE_ReferencePoint < Th2), use the 2-Step RA. Otherwise, use the 4-Step RA.

The first part of Condition (A5) indicates that the UE has adequate signal strength at the current location and the second part of Condition (A5) indicates that the UE is close to the Reference Point such as the cell center. When such condition is satisfied for the combined trigger of RSRP and distance_UE_ReferencePoint, the condition corresponds to a good quality of the radio environment, pointing to the suitability of the 2-Step RA procedure. TABLE 10 shows Condition A6.

TABLE 10

Condition A6

Condition A6
If (SINR > Th1) AND (distance_UE_ServingCell < Th2), use the 2-Step RA. Otherwise, use the 4-Step RA.

The first part of Condition (A6) indicates that the UE has adequate signal strength at the current location and the second part of Condition (A6) indicates that the UE is close to the serving cell. The variable distance_UE_ServingCell may refer to the distance between the UE and the platform (e.g., a LEO satellite) or the distance between the UE and the gNB (which would be on the ground for the case of a transparent payload) Reference Point such as the cell center. When such condition is satisfied for the combined trigger of RSRP and distance_UE_ServingCell, the condition corresponds to a good quality of the radio environment, pointing to the suitability of the 2-Step RA procedure. TABLE 11 shows Condition A7.

TABLE 11

Condition A7

Condition A7
If (RSRP > Th1) AND (distance_UE_NeighborCell < Th2), use the 2-Step RA. Otherwise, use the 4-Step RA.

The first part of Condition (A7) indicates that the UE has adequate signal strength at the current location toward the neighbor cell and the second part of Condition (A7) indicates that the UE is close to a handover target cell. When such condition is satisfied for the combined trigger of RSRP and distance_UE_NeighborCell, the condition corresponds to a good quality of the radio environment, pointing to the suitability of the 2-Step RA procedure.

In one example, the "distance_UE_NeighborCell" is the distance between the UE and the platform associated with the neighbor cell. In another example, the "distance_UE_NeighborCell" is the distance between the UE and the gNB associated with the neighbor cell. In yet another example, the "distance_UE_NeighborCell" is the distance between the UE and the NTN-GW associated with the neighbor cell. In another example, the "distance_UE_NeighborCell" is the distance between the UE and the center of the neighbor cell's footprint or coverage on the ground. TABLE 12 shows Condition B1.

TABLE 12

Condition B1

Condition B1
If (RSRP > Th1) AND (SINR > Th2), use the 2-Step RA. Otherwise, use the 4-Step RA.

The first part of Condition (B1) indicates that the UE has adequate signal strength at the current location in the serving cell and the second part of Condition (B1) indicates that the UE has a good-quality radio environment in the serving cell. When such condition is satisfied for the combined trigger of RSRP and SINR, the condition corresponds to a radio environment that is conducive to the 2-Step RA procedure. TABLE 13 shows Condition B2.

TABLE 13

Condition B2

Condition B2
If (RSRP > Th1) AND (RSRQ > Th2), use the 2-Step RA. Otherwise, use the 4-Step RA.

The first part of Condition (B2) indicates that the UE has adequate signal strength at the current location in the serving cell and the second part of Condition (B2) indicates that the UE has a good-quality radio environment in the serving cell. When such condition is satisfied for the combined trigger of RSRP and RSRQ, the condition corresponds to a radio environment that is conducive to the 2-Step RA procedure. TABLE 14 shows Condition B3.

TABLE 14

Condition B3

Condition B3
If (RSRP > Th1) AND (CQI > Th2), use the 2-Step RA. Otherwise, use the 4-Step RA.

The first part of Condition (B3) indicates that the UE has adequate signal strength at the current location in the serving cell and the second part of Condition (B3) indicates that the UE has a good-quality radio environment in the serving cell. When such condition is satisfied for the combined trigger of RSRP and CQI, the condition corresponds to a radio environment that is conducive to the 2-Step RA procedure.

FIG. 10 illustrates a flowchart of a method 1000 for RA type selection framework according to embodiments of the present disclosure. For example, the method 1000 as may be performed by a UE such as 111-116 as illustrated in FIG. 1. An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

As illustrated om FIG. 10, in Step F10S1, the UE receives the configuration for the RA selection mechanism in an RRC reconfiguration message. In particular, the UE receives suitable thresholds for the trigger quantities. These thresholds are described earlier in Step F10S2.

In Step F10S2, the UE makes measurements of signals such as RSRP, RSRQ, SINR, and CQI as configured by the gNB explicitly or per definitions in specifications. In an example, the UE makes these measurements for the serving cell. In another example, the UE can also make signal measurements for one or more neighbor cells (e.g., RSRP and RSRQ).

In Step F10S3, the UE checks if it is time to choose a RA type. Examples of situations where the UE needs to choose an RA type include idle to active mode transition, RLFs, and handover. If yes, it goes to Step F1054. Otherwise, it goes back to Step F1052.

In Step F10S4, the UE checks if the condition for 2-Step RA has been satisfied (e.g., Conditions with the structures specified in Condition (A), Condition (B), and Condition (C) described above in Step F9S2. If yes, it goes to Step F1055. Otherwise, it goes to Step F1056.

In Step F10S5, the UE chooses 2-Step RA and carries out the 2-Step RA procedure.

In Step F10S6, the UE chooses 4-Step RA and carries out the 4-Step RA procedure.

Figure 11:
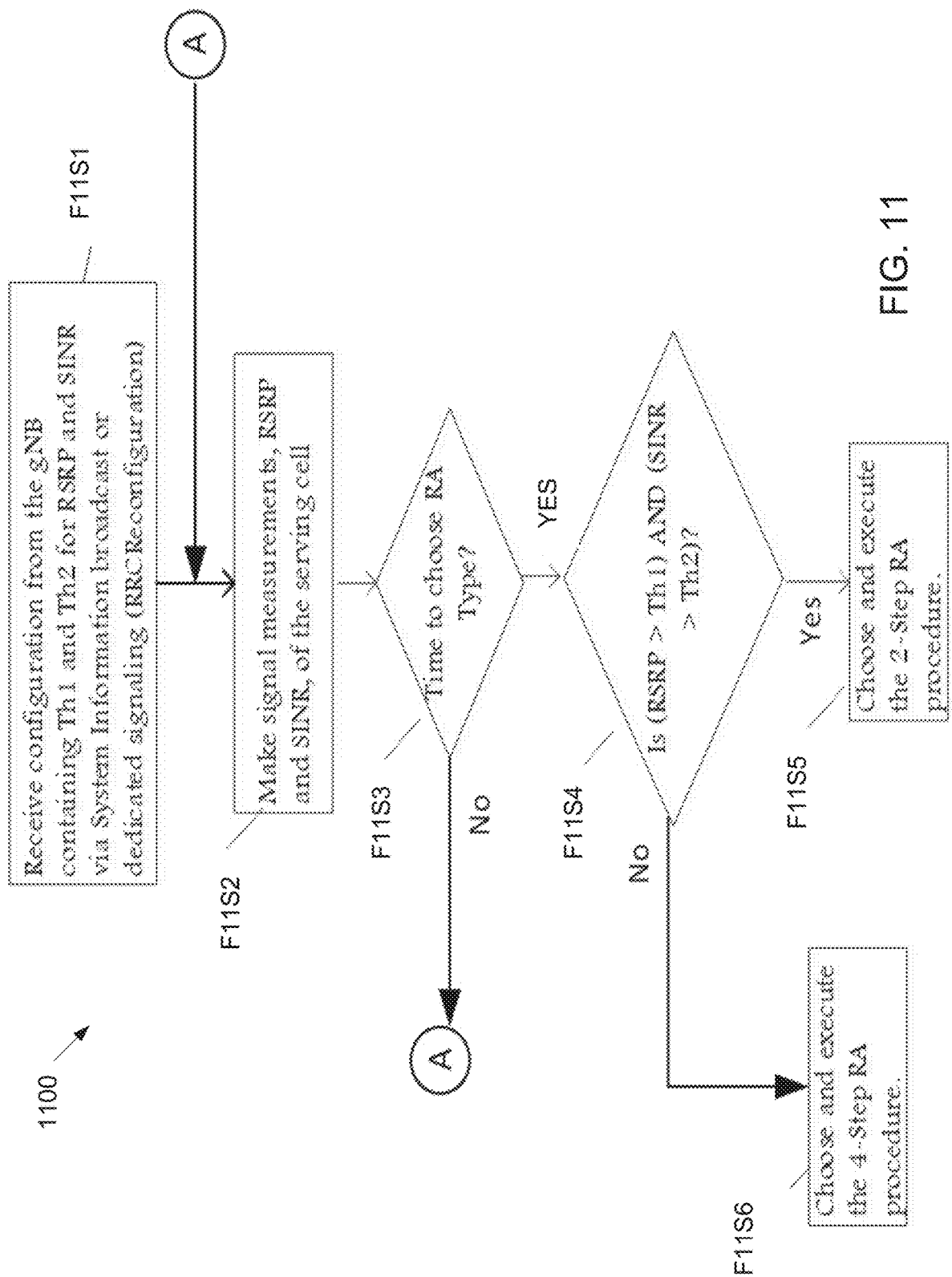
FIG. 11 illustrates a flowchart of a method for RA type selection according to embodiments of the present disclosure.

FIG. 11 illustrates a flowchart of a method 1100 for RA type selection according to embodiments of the present disclosure. For example, the method 1100 as may be performed by a UE such as 111-116 as illustrated in FIG. 1. An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

FIG. 11 illustrates an example where the UE carries a procedure to select an RA type based on a combination trigger that involves two measurements: (i) RSRP and (ii) SINR in case of the RA type being selected for a non-handover case.

As illustrated in FIG. 11, in Step F11S1, the UE receives the configuration for the RA selection mechanism via system information broadcast or via dedicated RRC signaling (e.g., an RRC reconfiguration message). In particular, the UE receives the thresholds Th1 and Th2 for the trigger quantities RSRP and SINR, respectively. These thresholds are used by the UE in conjunction with Condition (B) (e.g., more specifically Condition (B1)) in Step F11S4. The trigger condition is predefined in specifications or explicitly identified in system information and/or the RRC reconfiguration message t.

In Step F11S2, the UE makes RSRP and SINR measurements of the serving cell as configured by the gNB explicitly or per definitions in specifications.

In Step F11S3, the UE checks if it is time to choose a RA type for non-handover cases such as idle to active mode transition, radio link failures, and beam failures. If yes, it goes to Step F11S4. Otherwise, it goes back to Step F11S2.

In Step F11S4, the UE checks if the condition (B1) has been satisfied. More specifically, the UE checks if (RSRP>Th1) AND (SINR>Th2), where RSRP is the measured RSRP of the serving cell and SINR is the measured SINR of the serving cell. If this condition (B1) is satisfied, the UE goes to Step F11S5. Otherwise, it goes to Step F11S6.

In Step F11S5, the UE chooses 2-Step RA and carries out the 2-Step RA procedure. For example, the UE begins to send msgA, which is the first step of the 2-Step RA procedure.

In Step F11S6, the UE chooses 4-Step RA and carries out the 4-Step RA procedure. For example, the UE begins to send a RA Preamble per configuration by the gNB (e.g., a contention-based RA preamble or a contention-free RA preamble), which is the first step of the 4-Step RA procedure.

In another example, instead of RSRP and SINR used in FIG. 11, the UE utilizes RSRP and RSRQ as Trigger 1 and Trigger 2, respectively.

In another example, instead of RSRP and SINR used in FIG. 11, the UE utilizes RSRP and distance to the platform as Trigger 1 and Trigger 2, respectively.

As mentioned earlier, different embodiments of the disclosure make use of different standalone triggers or different combinations of individual triggers.

Furthermore, embodiments of the disclosure utilize the triggers or trigger combinations that are suitable for the RA procedure during handover.

Additionally, embodiments of the disclosure utilize the triggers or trigger combinations that are suitable for the RA procedure during non-handover scenarios such as initial random access, radio link failures, idle-to-active and inactive-to-active transitions, and beam failures.

In an embodiment, when distance is used as one of the criteria for the RA type selection, the distance is measured as the distance between the UE and the center of the suitable cell (i.e., the serving cell for the random access in the serving cell and a neighbor cell for the random access being carried out in the target handover candidate cell), where the center of the cell is the center of the beam's coverage on the ground.

In another example, the distance is defined as the distance between the UE and the NTN platform (e.g., a satellite or HAPS) associated with the cell (via the gNB) under consideration. In yet another example, the distance is defined as the distance between the UE and the NTN gateway associated with the cell (via the gNB) under consideration. In yet another example, the distance is defined as the distance between the UE and the gNB associated with the cell under consideration.

When both regular RAT type selection criterion and a load-balancing based RT type selection criterion are available in a given cell, the UE needs to combine these criteria to make a final determination of the RA type.

In an embodiment, a logical OR condition is used to combine these criteria (i.e., regular and load-balancing criteria). In other words, when any of the criteria is met, the UE chooses the 2-step RA; otherwise, the UE chooses the 4-step RA type.

In another embodiment, a logical AND condition is used to combine these criteria (i.e., regular and load-balancing criteria). In other words, when all the criteria are met, the UE chooses the 2-step RA; otherwise, the UE chooses the 4-step RA type.

In another embodiment, weight factors are used for regular and load-balancing criteria. When the combined numerical value of weighted criteria exceeds a threshold, the UE chooses the 2-step RA; otherwise, the UE chooses the 4-step RA type as shown below in Condition (CC1).

For example, when a regular criterion points to the 2-Step RA, the value of such criterion can be considered 1.0 and when a given regular criterion points to the 4-Step RA, the value of such criterion (i.e., "valueRegularCriterion") can be considered 0. Similarly, when a load-balancing criterion points to the 2-Step RA, the value of such criterion (i.e., "valueLoadBalancingCriterion") can be considered 1.0 and when a given load-balancing criterion points to the 4-Step RA, the value of such criterion can be considered 0. In an example implementation, the weight factors for the regular criterion and the load-balancing criterion can be weightFactorRegularCriterion and weightFactorLoadBalancingCriterion, respectively. The final numerical value that combines both criteria can be defined as Equation (1):

valueCombinedCriteria=[(weightFactorRegularCriterion* valueRegularCriterion)+weightFactorLoadBalancing Criterion* valueLoadBalancingCriterion)]  Equation (1)

The RA type selection condition can now be defined as follows in an example.

If (valueCombinedCriteria>combinedThreshold),
choose 2-step RA type; otherwise, choose
4-step RA type  Condition (CC1).

The gNB can convey weightFactorRegularCriterion, weightFactorRegularCriterion, and combinedThreshold in Step F9S2 or Step F9S4 in FIG. 9.

The 3GPP Release 16 utilizes a criterion that guides the UE to look for neighbors and make signal measurements such as RSRP and RSRQ of neighbor cells when the UE is in an idle, inactive, or connected mode. For example, if the RSRP of the service cell is large, the UE is not required to perform neighbor cell measurements, saving processing power and increasing the battery life. However, the use of this criterion is inadequate for an NTN because of several reasons. First, RSRP variations in a large NTN cell are relatively small from one location to another (e.g., cell center, middle of the cell and the cell edge). Such propagation phenomenon makes the use of signal measurements (e.g., RSRP and RSRQ) less reliable or less robust in an NTN compared to a TN. The use of distance as a criterion can make the neighbor search decision-making more robust. Furthermore, the deterministic movement of satellites enables the use of time as another useful criterion to make the overall neighbor cell search mechanism even more reliable and more robust.

The present disclosure introduces enhancements to the neighbor cell search mechanism used by the UE so that unnecessary measurements of neighbor cells can be avoided for a larger number of UEs, reducing the overall processing at the UE and increasing the UE battery life. Furthermore, this disclosure can also avoid the unnecessary SMTC (SS/PBCH Block measurement time configuration) gaps, eliminating any potential throughput loss, because the UE can now be scheduled whenever deemed appropriate by the gNB.

Figure 12:
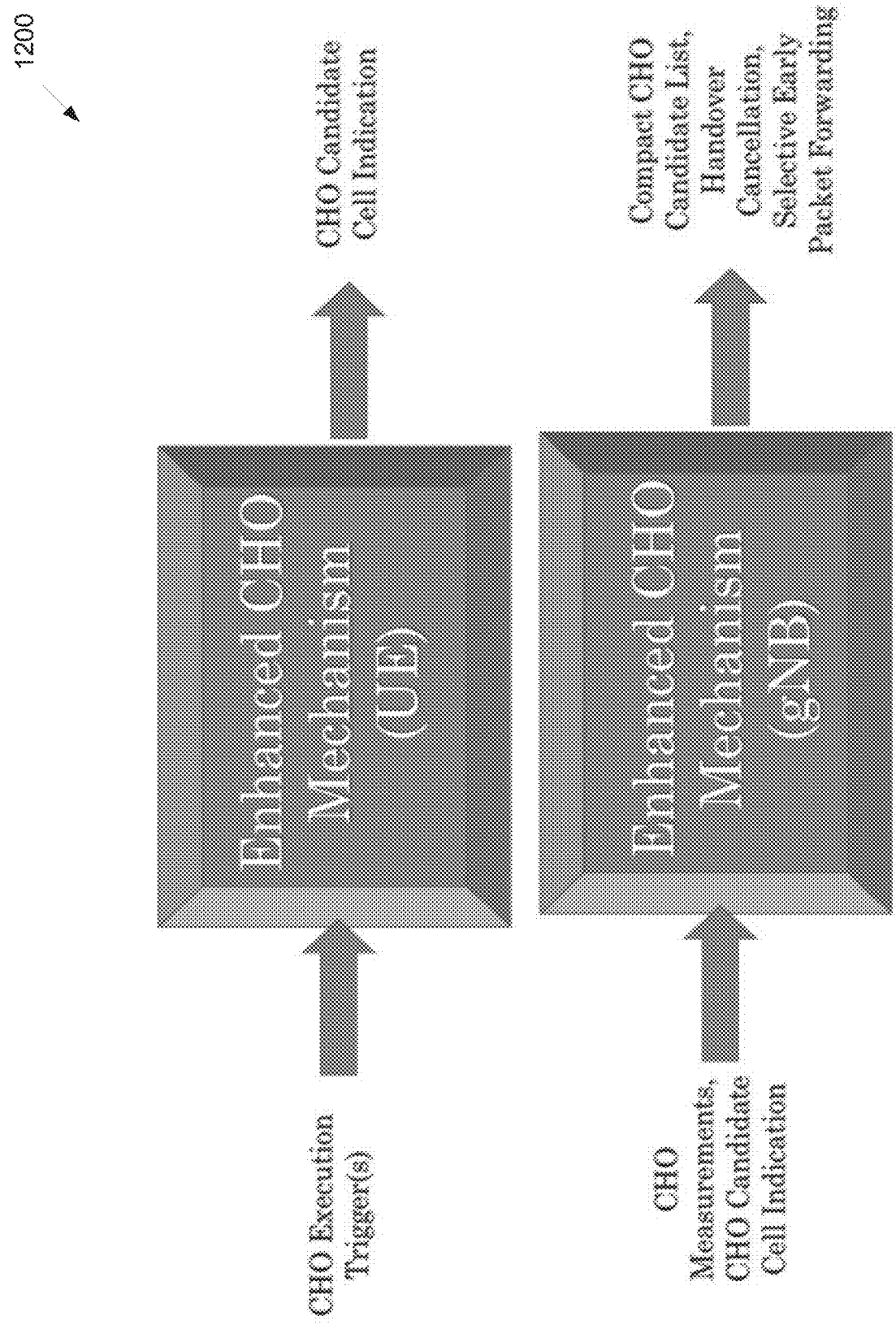
FIG. 12 illustrates an example of RA type selection mechanism according to embodiments of the present disclosure.

FIG. 12 illustrates an example of RA type selection mechanism 1200 according to embodiments of the present disclosure. An embodiment of the RA type selection mechanism 1200 shown in FIG. 12 is for illustration only.

The 3GPP Release 16 has defined conditional handover (CHO) that aims to reduce the user traffic interruption compared to traditional Release 15 handover.

However, CHO increases the radio resource consumption, because resources are reserved in multiple cells but are actually used only in one cell. In particular, in an NTN, massive handover is expected. This massive handover may lead to significant radio resource consumption for overhead and reduce the resource availability for regular users in the cell.

Furthermore, the processing load and the bandwidth requirements per gNB would increase significantly in an NTN due to a large number of users experiencing handover at the same time, especially when early packet forwarding is applied.

In CHO, since the S-gNB does not know for some time (which can be quite long-tens or hundreds of milliseconds in an NTN) that the UE has "left" the serving cell, S-gNB may allocate precious radio resources to the UE, leading to the waste of precious radio resources considering the massive handover.

The present disclosure introduces enhancements to CHO so that the overall time period during which resources are reserved in candidate cells is reduced. These enhancements reduce the resource consumption in CHO. Furthermore, this disclosure can reduce the bandwidth usage in the backhaul in CHO through more selective early packet forwarding.

Figure 13:
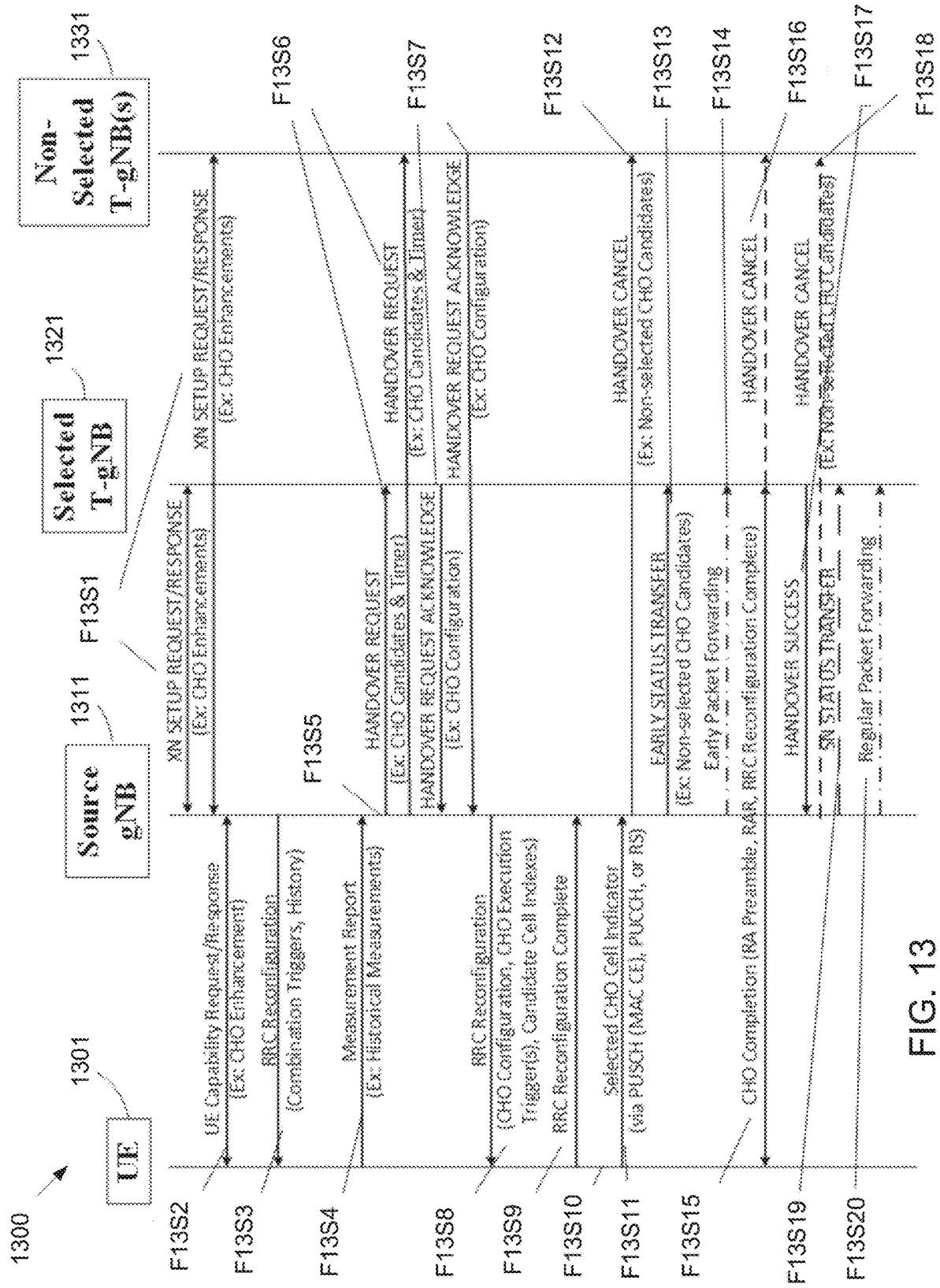
FIG. 13 illustrates a signaling flow of UE-network procedure according to embodiments of the present disclosure.

FIG. 13 illustrates a signaling flow of UE-network procedure 1300 according to embodiments of the present disclosure. For example, the UE-network procedure 1300 as may be performed by a UE (e.g., 111-116 as illustrated in FIG. 1) and/or a BS (e.g., 101-103 as illustrated in FIG. 1). An embodiment of the UE-network procedure 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

FIG. 13 provides example inputs and outputs of enhanced CHO mechanisms implemented at the UE and the gNB. The UE considers the CHO execution triggers provided by the Serving gNB (S-gNB) and indicates the identity of the selected candidate cell to the serving cell of the S-gNB. The S-gNB considers the measurement report sent by the UE to determine a compact CHO candidate list for the UE. The S-gNB or the selected target gNB (T-gNB) cancels the resource reservation at the cells not selected by the UE and can also decide to do early packet forwarding to the T-gNB selected by the UE.

Details of the UE-network signaling exchange and the UE procedure for the disclosure are provided in FIG. 23 and FIG. 14, respectively. Details of the S-gNB procedure and the T-gNB procedure are illustrated in FIGS. 15A and 15B, and FIGS. 16A and 16B, respectively.

As illustrated in FIG. 13, in Step F13S1, in one example, a gNB (1311) specifies to neighbor gNBs (1321 and 1331) the CHO enhancement(s) that is supports in an XnAP "XN SETUP REQUEST" message. The neighboring gNBs reply with an indication of the support for CHO enhancement(s). Examples of CHO enhancements include proactive handover cancellation, proactive early packet forwarding, and buffering of the forwarded packets at the S-gNB until the reception of the HANDOVER SUCCESS message from the UE-selected T-gNB.

In Step F13S2, the S-gNB and the UE exchange UE capability enquiry and UE capability information messages. In an embodiment, the UE indicates its support for the CHO enhancements such as an indication of the identity of the CHO candidate cell selected by the UE as a result of CHO execution trigger in Step F13511 (i.e., "Target_CHO_Cell_Indicator_Supported"). In another embodiment, such CHO enhancement is mandatory for a given UE and hence does not need to be exchanged as part of Step F14S2 signaling.

In Step F13S3, the S-gNB configures the UE for measurements in support of potential CHO. For example, the S-gNB may choose measurement event thresholds such that such reports are received at an instant that is earlier than an instant for traditional handover. Furthermore, the S-gNB may ask the UE to (i) use combination triggers (e.g., a combined RSRP and location-based trigger or a combined RSRP and time/timer-based trigger) and (ii) provide historical measurements to the gNB to facilitate implementation of a predictive handover.

In Step F13S4, the UE sends a measurement report when a suitable trigger condition is satisfied. Per configuration by the S-gNB, the UE includes historical measurements.

In Step F13S5, in an implementation-specific manner, the S-gNB decides to use CHO instead of regular or traditional handover and selects a set of CHO candidate cells.

In Step F13S6, in an embodiment, the S-gNB specifies a timer in the HANDOVER REQUEST message to the T-gNBs of candidate CHO cells. In an example implementation, this timer is at least (1.5*RTT) long, where RTT is the estimated UE-T-gNB round trip time and can assume the minimum expected RTT. This timer indicates to the T-gNB that the T-gNB can reserve any required resources after the timer expires and hence the T-gNB can make use of these DL and/or UL resources for other users or other purposes until the timer expires. In another embodiment, each T-gNB may use an implementation-specific timer so that T-gNB can make use of these DL and/or UL resources for other users or other purposes until the timer expires. In yet another embodiment, the S-gNB may convey to a T-gNB candidate cells along with or without T-gNB identities so that the UE-selected T-gNB can perform handover cancellation (if needed and deemed suitable by the T-gNB) in Step F13S16.

Examples of dedicated radio resources that a T-gNB reserves for a UE include new C-RNTI, a set of RACH resources, UE-specific CSI-RS configuration(s), PUCCH resources, and SRS resources.

In Step F13S7, the T-gNB(s) replies/reply with the HANDOVER REQUEST ACKNOWLEDGE message to the S-gNB and specifies the CHO configuration for the UE's use upon CHO to the selected candidate cell.

In Step F13S8, the S-gNB sends an RRC reconfiguration message containing CHO configurations specified by T-gNBs (e.g., in "conditionalReconfiguration" Information Element) and CHO execution trigger(s). These CHO execution triggers can make use of combination triggers. In an example, the S-gNB specifies the identities of CHO candidate cells so that the UE can convey the ID of the selected cell in Step F13S11. In an example, an N-bit cell index can be used as a compact Cell ID. A 2-bit cell index can represent four candidate cells (0, 1, 2, and 3) and a 3-bit cell index can represent eight candidate cells (0 to 7).

In Step F13S9, the UE replies with the RRC reconfiguration complete message.

In Step F13S10, the UE evaluates the CHO execution condition(s) and selects a CHO candidate cell for performing CHO to such cell.

In Step F13S11, in an embodiment, the UE conveys the ID of the selected CHO candidate cell to the S-gNB via the source cell before contacting the selected CHO candidate cell. In one example, the UE uses MAC signaling such as a MAC Control Element to convey the cell ID. In another example, the UE uses PHY signaling (e.g., PUCCH sequence, a QPSK modulation scheme on PUCCH, re-purposed higher PUCCHs that convey the selected CHO cell ID instead of their regular R16 content such as CSI and HARQ feedback, and an uplink reference signal such as SRS). In yet another example, the UE may send an RRC signaling message to convey the cell ID. In an embodiment, a compact cell index is used as a cell ID. In another embodiment, PCI is used as the cell ID. In an embodiment, to enable the S-gNB to reliably detect the CHO cell ID being conveyed by the UE, repetition at PHY or MAC layer may be used.

In Step F13S12, the S-gNB sends a HANDOVER CANCEL message to the T-gNB(s) (or cells) not selected by the UE so that the T-gNB can release resources reserved for the UE and start making use of those resources.

In Step F13S13, in an example, the S-gNB sends an EARLY STATUS TRANSFER message to the selected T-gNB to facilitate packet forwarding from the S-gNB to the selected T-gNB in Step F13S14 so that the selected T-gNB is ready to transmit DL packets to the UE as soon as the UE and the T-gNB have established a radio connection in the target cell.

In Step F13S15, the UE and the selected T-gNB complete the CHO in the target cell through a random access procedure and RRC signaling (e.g., RA preamble, RAR, and RRC reconfiguration for a 4-step RA procedure and msg A and msgB for a 2-step RA procedure).

In Step F13S16, in an embodiment, the T-gNB sends a HANDOVER CANCEL message to the T-gNB(s) (or cells) not selected by the UE so that these T-gNBs can release resources reserved for the UE and start making use of those resources. In an example, the selected T-gNB sends such message to other T-gNBs upon successfully receiving a RA preamble from the UE. In another embodiment, the selected T-gNB sends such message to other T-gNBs after receiving the RRC reconfiguration complete message from the UE.

Note that while this step is not necessary if the S-gNB has already sent a HANDOVER CANCEL message to the T-gNB(s) (or cells) in Step F13S12, it is possible for both S-gNB and the selected T-gNB to send a HANDOVER CANCEL message to the non-selected T-gNBs. In an example, if a T-gNB receives an additional HANDOVER CANCEL message for its CHO cell and if the T-gNB has already acted upon a previously received HANDOVER CANCEL message, the T-gNB ignores such messages and discards the messages.

In Step F13S17, the selected T-gNB sends a HANDOVER SUCCESS message to the S-gNB to inform the S-gNB that CHO with the UE has been successfully completed. In an example, the T-gNB sends such message to the S-gNB upon successfully receiving a RA preamble from the UE. In another traditional example, the T-gNB sends such message to the S-gNB after receiving the RRC reconfiguration complete message from the UE.

In Step F13S18, in an example, the S-gNB sends a HANDOVER CANCEL message to non-selected cells/T-gNBs in Step F13S18 if it has not done so in Step F13S12.

In Step F13S19, in an example, the S-gNB sends a STATUS TRANSFER message to the selected T-gNB to facilitate regular packet forwarding from the S-gNB to the selected T-gNB in Step F13S20 so that the selected T-gNB can transmit DL packets to the UE in the target cell.

As illustrated in FIG. 13, in case that the UE's indication of the selected CHO cell is not successfully received at the S-gNB in Step F13S11, the selected T-gNB (per implementation or as required per specifications) can always send the HANDOVER CANCEL message in Step F13S16. A drawback of this example is that a T-gNB may receive two HANDOVER CANCEL messages. In yet another example, instead of T-gNB, the S-gNB can send a HANDOVER CANCEL message to non-selected cells/T-gNBs in Step F13S18 if it has not done so in Step F13S12.

As illustrated in FIG. 13, if CHO fails (e.g., unsuccessful RA procedure between the UE and the T-gNB in the selected cell), the UE carries out contention-based random access in the best cell at the time of RA.

Figure 14A:
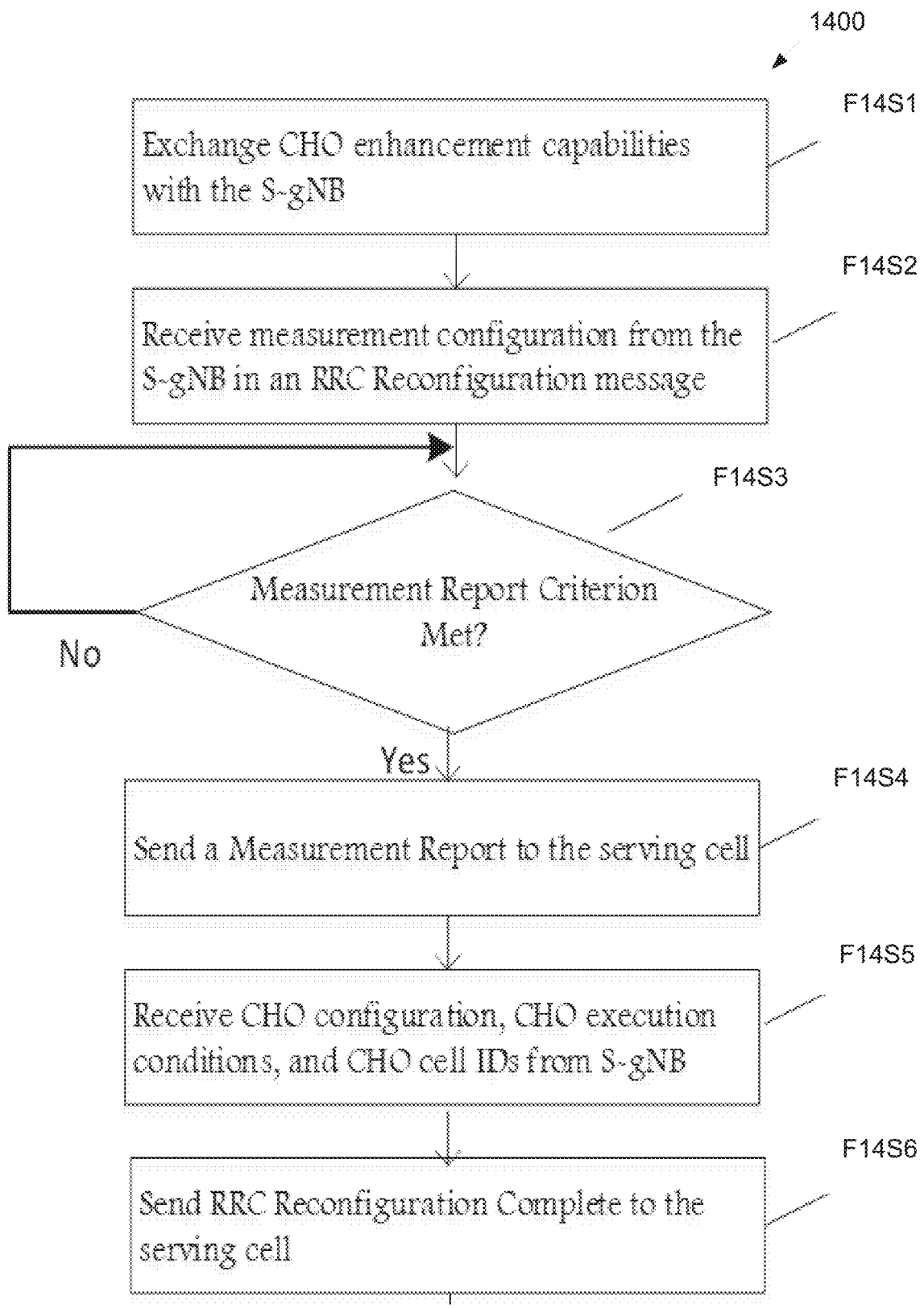
FIG. 14A illustrates a flowchart of a method for enhanced CHO according to embodiments of the present disclosure.

FIG. 14A illustrates a flowchart of a method 1400 for enhanced CHO according to embodiments of the present disclosure. For example, the method 1400 as may be performed by a UE such as 111-116 as illustrated in FIG. 1. An embodiment of the method 1400 shown in FIG. 14A is for illustration only. One or more of the components illustrated in FIG. 14A can be implemented in specialized circuitry configured to perform the noted functions or one or more of the components can be implemented by one or more processors executing instructions to perform the noted functions.

Figure 14B:
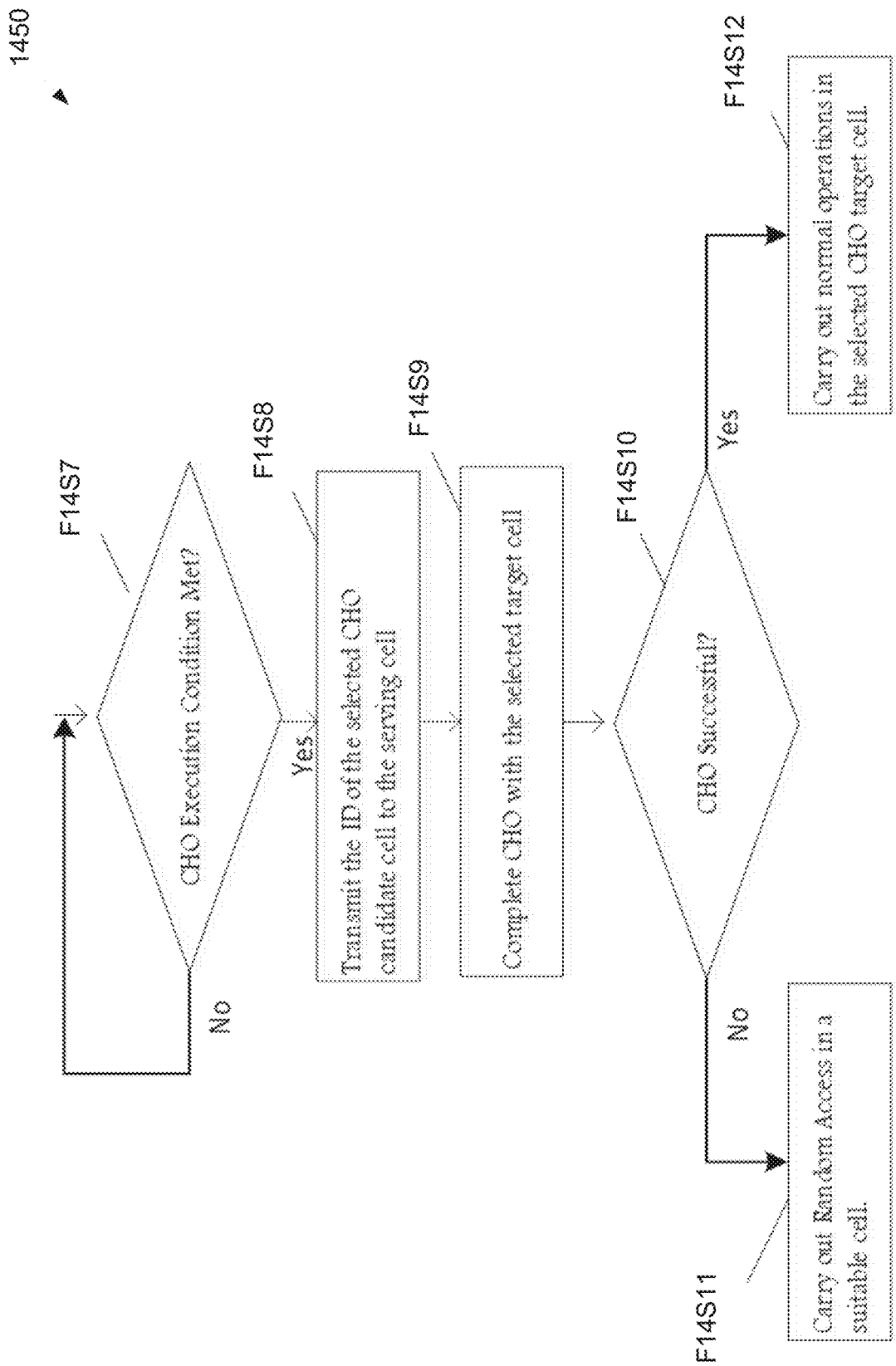
FIG. 14B illustrates a flowchart of a method for enhanced CHO according to embodiments of the present disclosure.

FIG. 14B illustrates a flowchart of a method 1450 for enhanced CHO according to embodiments of the present disclosure. For example, the method 14500 as may be performed by a UE such as 111-116 as illustrated in FIG. 1. An embodiment of the method 1450 shown in FIG. 14B is for illustration only. One or more of the components illustrated in FIG. 14B can be implemented in specialized circuitry configured to perform the noted functions or one or more of the components can be implemented by one or more processors executing instructions to perform the noted functions. Note that Step F14S7 in FIG. 14B is connected to Step F14S6 as illustrated in FIG. 14.

AS illustrated in FIG. 14A, in Step F14S1, in an example, the UE exchanges its CHO enhancement related capabilities (e.g., the ability to send an indicator of the selected CHO cell to the serving cell in Step F14S8 or "Target_CHO_Cell_Indicator_Supported") with the S-gNB. In another embodiment, such CHO enhancement capabilities are made mandatory in specifications for all UEs or a category of UEs.

In Step F14S2, the UE obtains measurement configuration (e.g., criterion for sending a measurement report) from the S-gNB in an RRC reconfiguration message. For example, the S-gNB may configure the UE for Event A3. In particular, for an NTN, combination triggers (e.g., RSRP and time/timer or RSRP and location-based quantity) may be specified by the S-gNB. The S-gNB may also ask the UE to report a history of quantities (i.e., a set of "N" RSRP values measured at different instants with a periodicity of X ms).

In Step F14S3, the UE evaluates the radio environment and checks if the criterion for sending a measurement report is met. If the criterion for Event A3 is met (if configured in Step F14S2), the UE sends a measurement report containing the measurement results to the S-gNB in Step F14S4 and thereafter goes to Step F14S5. Such measurement report include historical measurements of designated quantities per configuration specified in Step F14S2. In an example, such historical reporting of quantities by the UE in support of CHO enables the S-gNB to estimate these quantities at a future instant to reflect long delays in an NTN and choose a better set of CHO candidate cells. If the measurement criterion is not met, the UE continues to evaluate the radio environment.

In Step F14S5, the UE receives in an RRC reconfiguration message from the S-gNB. This message contains the CHO configurations determined by T-gNB(s) and CHO execution condition(s) determined by the S-gNB. In an embodiment, this message contains cell identities of candidate CHO cells. In an embodiment, a compact cell index is used as a cell ID. In another embodiment, PCI is used as the cell ID. In an embodiment, to enable the S-gNB to reliably detect the CHO cell ID being conveyed by the UE, repetition at PHY or MAC layer may be used. In an example implementation, such repetition is specified by the S-gNB in the RRC reconfiguration message.

In Step F14S6, the UE sends an RRC reconfiguration complete message to the S-gNB in the serving cell to acknowledge the reception of an RRC reconfiguration message in Step F14S5.

In Step F14S7, the UE evaluates the radio channel conditions to determine if a CHO execution condition is satisfied or not. If not, the UE continues evaluating the radio environment. If yes, the UE proceeds to Step F14S8.

In Step F14S8, in an embodiment, as mentioned earlier in Step F13S11 as illustrated in FIG. 13, the UE transmits the ID of the selected CHO candidate cell (i.e., the one that has met the CHO execution condition) to the S-gNB via the source cell before contacting the selected CHO candidate cell. In one example, the UE uses MAC signaling such as a MAC Control Element to convey the cell ID. In another example, the UE uses PHY signaling (e.g., PUCCH sequence, a QPSK modulation scheme on PUCCH, re-purposed higher PUCCHs that convey the selected CHO cell ID instead of their regular R16 content such as CSI and HARQ feedback, and an uplink reference signal such as SRS). In yet another example, the UE may send an RRC signaling message to convey the cell ID.

In Step F14S9, the UE tries to complete the CHO with the selected target cell. In one example, the UE utilizes a 2-step RA procedure toward the target cell and sends msgA (containing an RA preamble and an RRC reconfiguration complete message) to the target cell and receives msgB from the target cell. In another example, the UE utilizes a 4-step RA procedure toward the target cell and sends a RA preamble to the target cell, receives a random access response (RAR) from the target cell, and sends an RRC reconfiguration complete message to the target cell. In yet another example, CHO completion can also occur in RACH-less HO (e.g., the UE sends an RRC reconfiguration complete to the target cell without using RACH).

In Step F14S10, the UE evaluates if CHO has been successfully completed. tries to complete the CHO with the selected target cell. If no, the UE goes to Step F14S11. Otherwise, it goes to Step F14S12.

In Step F14S11, the UE carries out random access in a suitable cell and resume regular communications with such cell.

In Step F14S12, the UE carries out normal communications with the cell with which the UE has successfully completed CHO.

Figure 15A:
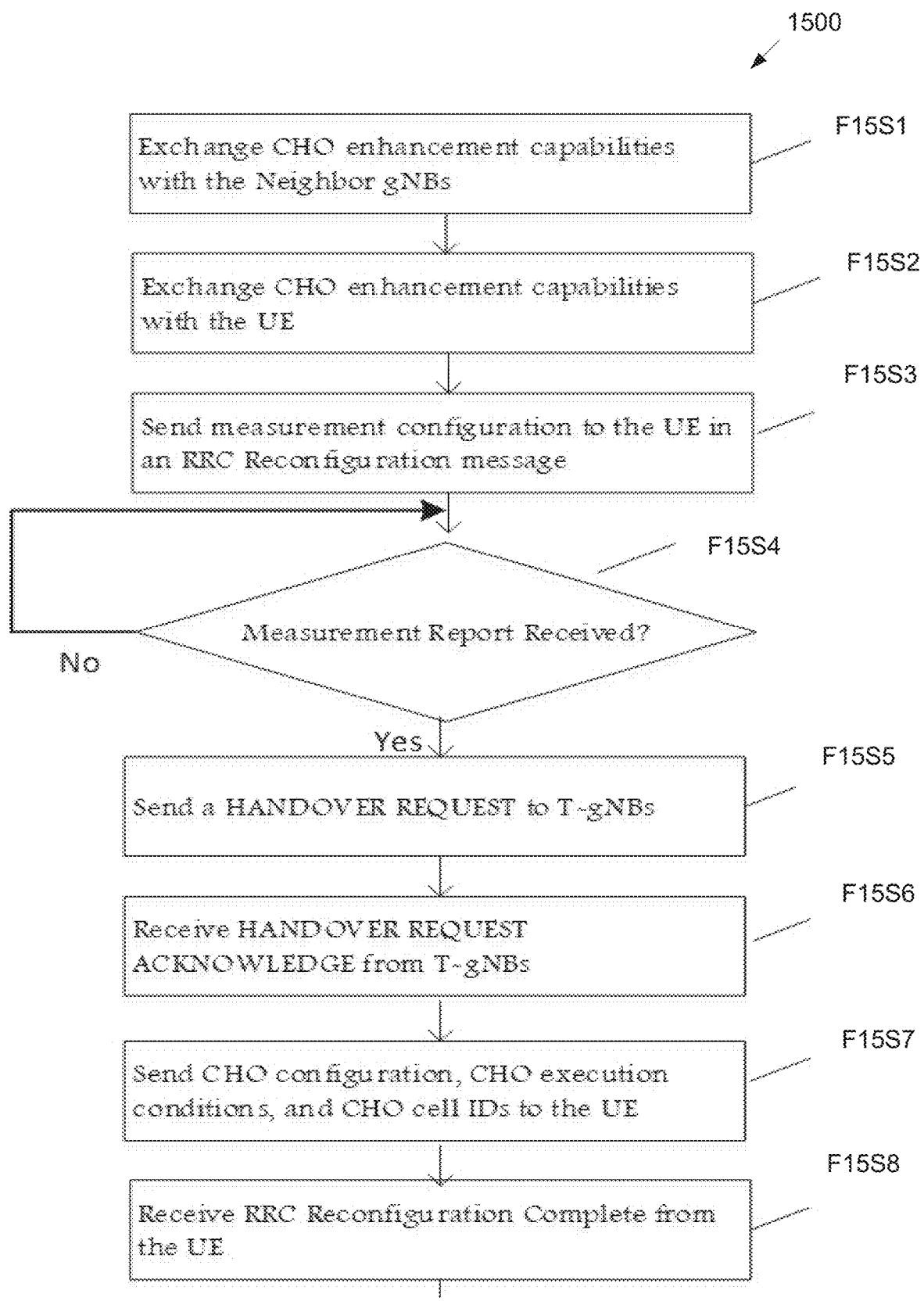
FIG. 15A illustrates a flowchart of a method for enhanced CHO according to embodiments of the present disclosure.

FIG. 15A illustrates a flowchart of a method 1500 for enhanced CHO according to embodiments of the present disclosure. For example, the method 1500 as may be performed by a UE such as 111-116 as illustrated in FIG. 1. An embodiment of the method 1500 shown in FIG. 15A is for illustration only. One or more of the components illustrated in FIG. 15A can be implemented in specialized circuitry configured to perform the noted functions or one or more of the components can be implemented by one or more processors executing instructions to perform the noted functions.

Figure 15B:
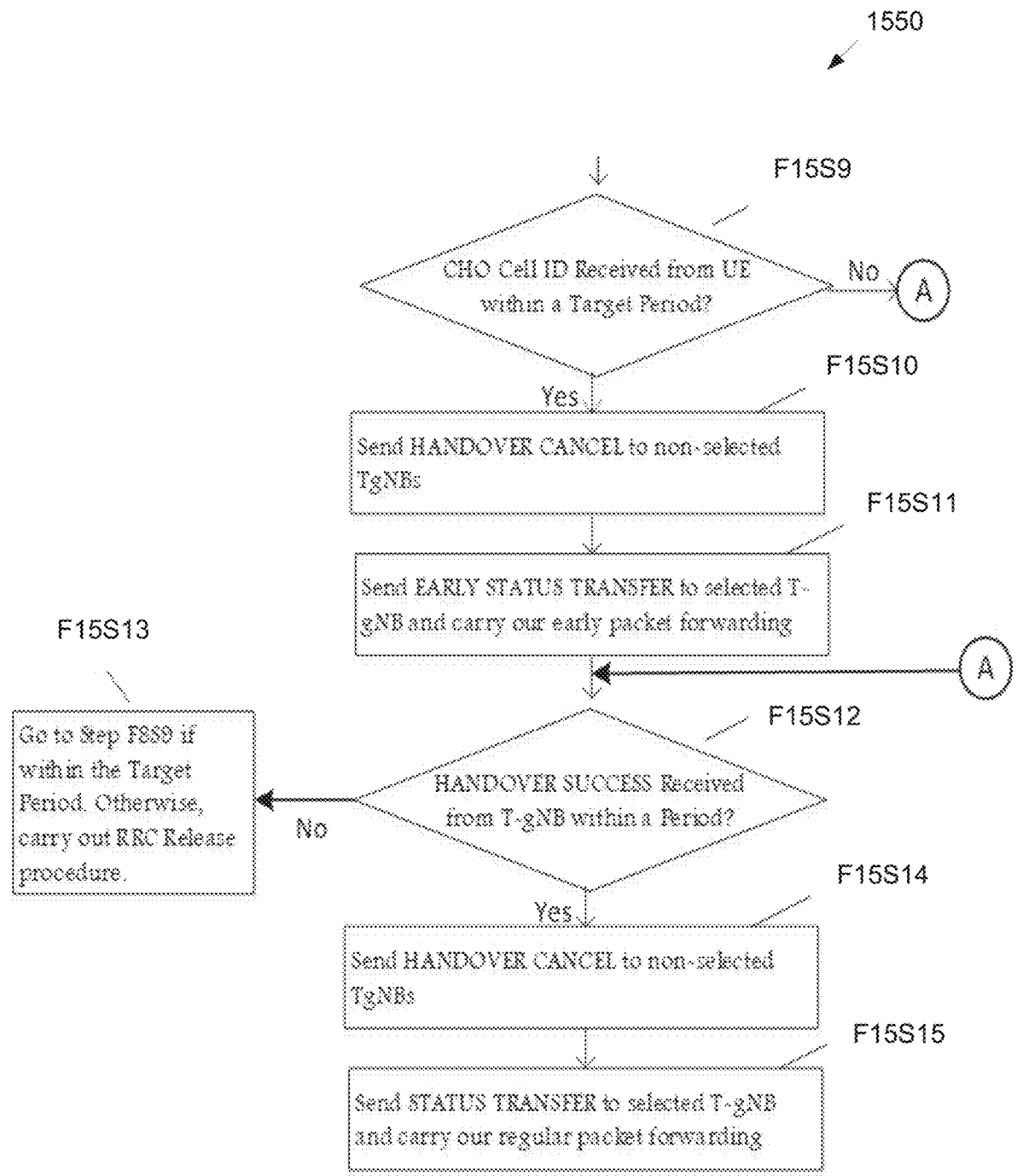
FIG. 15B illustrates a flowchart of a method for enhanced CHO according to embodiments of the present disclosure.

FIG. 15B illustrates a flowchart of a method 1550 for enhanced CHO according to embodiments of the present disclosure. For example, the method 1550 as may be performed by a UE such as 111-116 as illustrated in FIG. 1. An embodiment of the method 1550 shown in FIG. 15B is for illustration only. One or more of the components illustrated in FIG. 15B can be implemented in specialized circuitry configured to perform the noted functions or one or more of the components can be implemented by one or more processors executing instructions to perform the noted functions. Note that Step F15S9 as illustrated in FIG. 15B is connected to Step F15S8 as illustrated in FIG. 15A.

FIGS. 15A and 15B illustrate the procedure carried by the S-gNB in support of enhanced CHO in an example. Note that each gNB may be prepared to be an S-gNB or a T-gNB for a given UE. Hence, each gNB may execute FIGS. 15A and 15B steps as an S-gNB and FIGS. 16A and 16B steps as a T-gNB.

In Step F15S1, in one example, the S-gNB and neighboring gNBs exchange the CHO enhancement(s) that the S-gNB and neighboring gNBs support in an XnAP "XN SETUP REQUEST" and "XN SETUP RESPONSE" messages. Examples of CHO enhancements include support for processing of the indication of the selected CHO cell identity from the UE ("Target_CHO_Cell_Indicator_Supported"), proactive handover cancellation, proactive early packet forwarding, and buffering of the forwarded packets at the S-gNB until the reception of the HANDOVER SUCCESS message from the UE-selected T-gNB.

In Step F15S2, in an example, the S-gNB and the UE exchange CHO enhancement related capabilities (e.g., the ability of the UE to send an indicator of the selected CHO cell to the serving cell or "Target_CHO_Cell_Indicator_ Supported" and the ability of the gNB to receive such indicator in Step F15S1). In another embodiment, such CHO enhancement capabilities are made mandatory in specifications for all UEs or a category of UEs.

In Step F15S3, the S-gNB provides measurement configuration (e.g., criterion for sending a measurement report) to the UE in an RRC reconfiguration message. For example, the S-gNB may configure the UE for Event A3. In particular, for an NTN, combination triggers (e.g., RSRP and time/timer or RSRP and location-based quantity) may be specified by the S-gNB. In an example, the S-gNB may choose measurement event thresholds such that such reports are received at an instant that is earlier than an instant for traditional handover. In another example, the S-gNB may also ask the UE to report a history of quantities (i.e., a set of "N" RSRP values measured at different instants with a periodicity of X ms) to facilitate implementation of a predictive handover.

In Step F15S4, the S-gNB checks if the S-gNB has received a measurement report from the UE. If not, the S-gNB continues looking for such RRC message from the UE. If yes, the S-gNB goes to Step F15S5.

In Step F15S5, in an implementation-specific manner, the S-gNB decides to use CHO instead of regular or traditional handover and selects a set of CHO candidate cells, and sends HANDOVER REQUEST messages to the T-gNBs of candidate CHO cells.

In Step F15S5, in an embodiment, the S-gNB specifies a timer in the HANDOVER REQUEST message to the T-gNBs of candidate CHO cells. In an example implementation, this timer is at least (1.5*RTT) long, where RTT is the estimated UE-T-gNB round trip time and can assume the minimum expected RTT. This timer indicates to the T-gNB that the T-gNB can reserve any required resources after the timer expires and hence the T-gNB can make use of these DL and/or UL resources for other users or other purposes until the timer expires. In another embodiment, the S-gNB may convey to a T-gNB candidate cells along with or without T-gNB identities so that the UE-selected T-gNB can perform handover cancellation if needed and if deemed suitable by the T-gNB.

In Step F15S6, the T-gNB(s) replies/reply with the HANDOVER REQUEST ACKNOWLEDGE message to the S-gNB and specifies the CHO configuration for the UE's use upon CHO to the selected candidate cell. In an embodiment, the S-gNB sends a list of candidate CHO cells and/or associated T-gNBs to the TgNBs that have accepted the handover request. The T-gNBs can then use such list to send a HANDOVER CANCEL message to non-selected TgNBs (e.g., after successful reception of an RA preamble or RRC reconfiguration complete message from the UE).

In Step F15S7, the S-gNB sends an RRC reconfiguration message containing CHO configurations specified by T-gNBs (e.g., in "conditionalReconfiguration" Information Element) and CHO execution trigger(s). These CHO execution triggers can make use of combination triggers. In an example, the S-gNB specifies the identities of CHO candidate cells so that the S-gNB can receive the identity of the CHO cell selected by the UE in Step F15S9. In an example, a compact cell index is used as a cell ID; an N-bit cell index can be used as a compact Cell ID. A 2-bit cell index can represent four candidate cells (0, 1, 2, and 3) and a 3-bit cell index can represent eight candidate cells (0 to 7). In another embodiment, PCI is used as the cell ID. In an embodiment, to enable the S-gNB to reliably detect the CHO cell ID being conveyed by the UE, repetition at PHY or MAC layer may be used. In an example implementation, such repetition is specified by the S-gNB in the RRC reconfiguration message in Step F15S7.

In Step F15S8, the S-gNB receives the RRC reconfiguration complete message from the UE, which acknowledges the UE's reception of an RRC reconfiguration message in Step F15S7.

In Step F15S9, in an embodiment, the S-gNB keeps checking within an implementation-specific time period for the selected CHO cell indicator from the UE. The Step F15S9 and Step F15S12 are continuously checked in sequence the relevant condition is satisfied within implementation-specific timers. If the S-gNB detects the CHO cell indication from the UE, it goes to Step F15S10. If not, it goes to Step F15S12.

In Step F15S10, the S-gNB sends a HANDOVER CANCEL message to the T-gNB(s) (or cells) not selected by the UE so that the T-gNB can release resources reserved for the UE and start making use of those resources.

In Step F15S11, in an example, the S-gNB sends an EARLY STATUS TRANSFER message to the selected T-gNB to facilitate packet forwarding from the S-gNB to the selected T-gNB so that the selected T-gNB is ready to transmit DL packets to the UE as soon as the UE and the T-gNB have established a radio connection in the target cell.

In Step F15S12, the S-gNB checks if a T-gNB sends a HANDOVER SUCCESS message from a T-gNB is received or not. If such message has not been received, it goes to Step F15S13. If such message has been received, the S-gNB goes to Step F15S14.

In Step F15S13, the S-gNB decides to go to Step F15S9 if the time period has not elapsed. If the target time period has elapsed, it implies that the S-gNB has waited for a long enough time for handover to complete and the S-gNB initiates an RRC release procedure.

In Step F15S14, in an example, the S-gNB sends a HANDOVER CANCEL message to non-selected cells/T-gNBs if it has not done so in Step F15S10.

In Step F15S15, in an example, the S-gNB sends a STATUS TRANSFER message to the selected T-gNB to facilitate regular packet forwarding from the S-gNB to the selected T-gNB so that the selected T-gNB can transmit DL packets to the UE in the target cell.

Figure 16A:
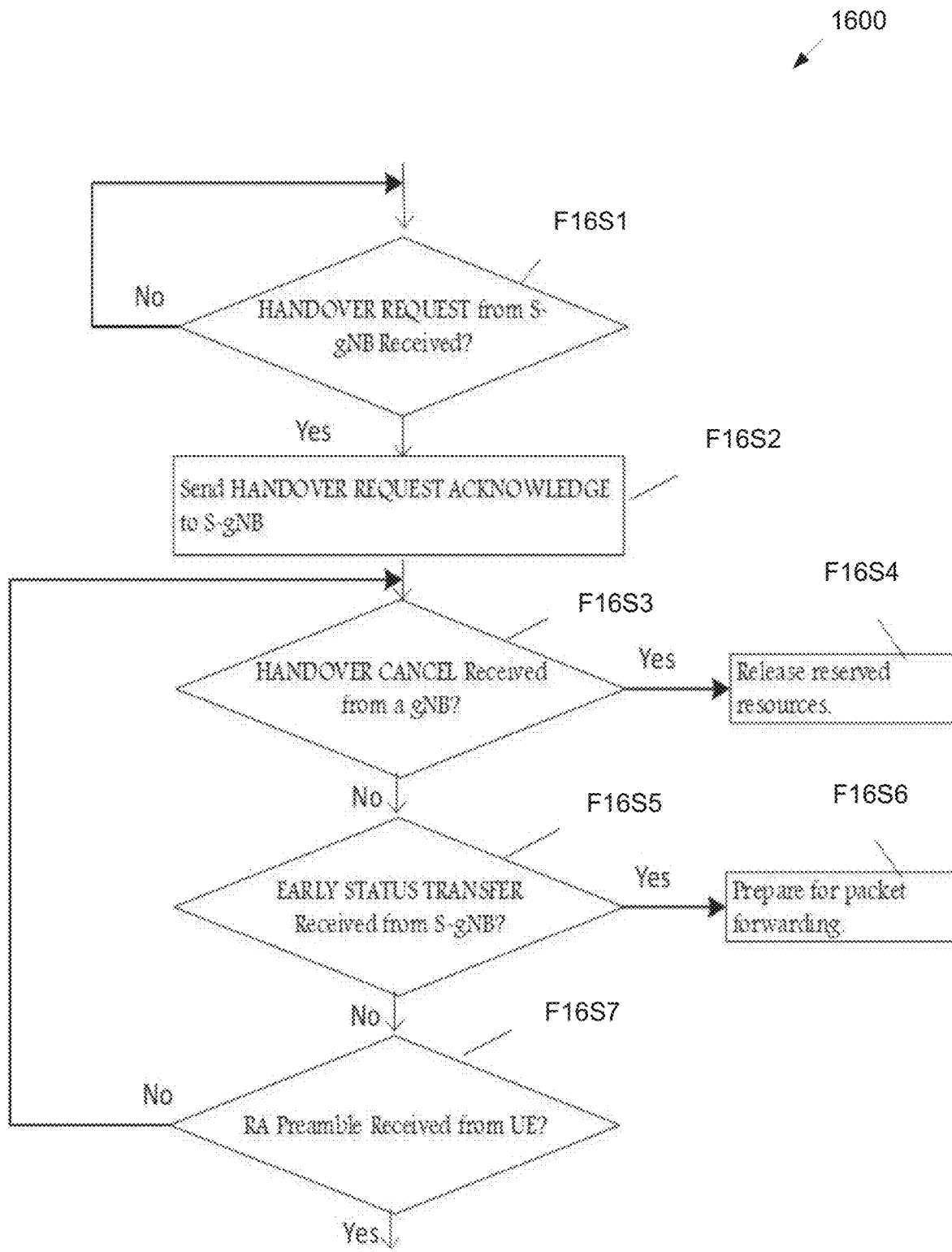
FIG. 16A illustrates a flowchart of a method for enhanced CHO according to embodiments of the present disclosure.

FIG. 16A illustrates a flowchart of a method 1600 for enhanced CHO according to embodiments of the present disclosure. For example, the method 1600 as may be performed by a UE such as 111-116 as illustrated in FIG. 1. An embodiment of the method 1600 shown in FIG. 16A is for illustration only. One or more of the components illustrated in FIG. 16A can be implemented in specialized circuitry configured to perform the noted functions or one or more of the components can be implemented by one or more processors executing instructions to perform the noted functions.

Figure 16B:
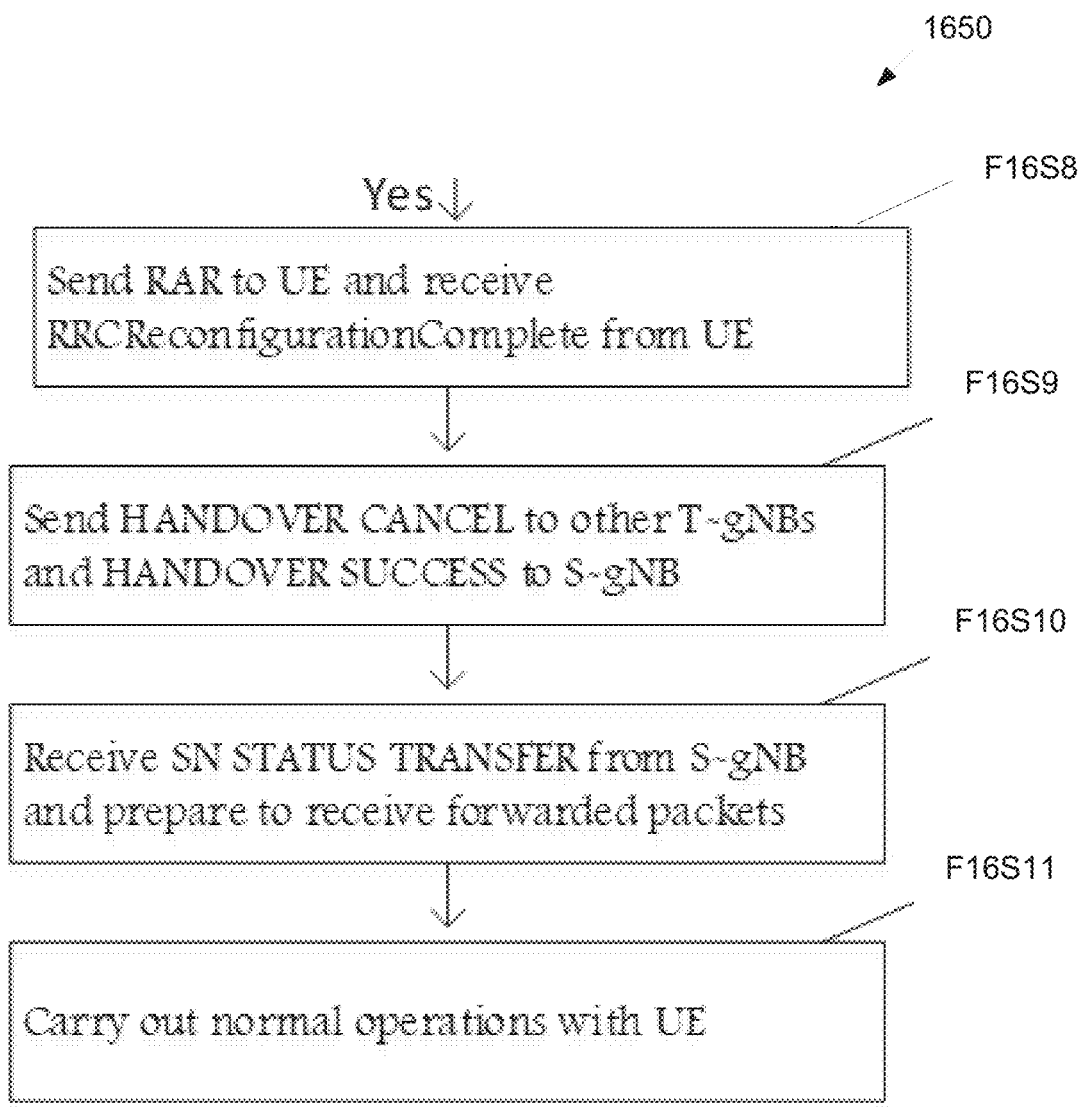
FIG. 16B illustrates a flowchart of a method for enhanced CHO according to embodiments of the present disclosure.

FIG. 16B illustrates a flowchart of a method 1650 for enhanced CHO according to embodiments of the present disclosure. For example, the method 1650 as may be performed by a UE such as 111-116 as illustrated in FIG. 1. An embodiment of the method 1650 shown in FIG. 16B is for illustration only. One or more of the components illustrated in FIG. 16B can be implemented in specialized circuitry configured to perform the noted functions or one or more of the components can be implemented by one or more processors executing instructions to perform the noted functions. Note that Step F16S8 as illustrated in FIG. 16B is connected to Step F16S7 as illustrated in FIG. 16A.

FIGS. 16A and 16B illustrate the procedure carried by a T-gNB in support of enhanced CHO in an example.

As illustrated in FIG. 16A, in Step F16S1, the T-gNB checks if a HANDOVER REQUEST message from the S-gNB has been received. If not, the T-gNB continues to wait for such message. If yes, the T-gNB proceeds to Step F16S2.

In Step F16S1, in an embodiment, if the S-gNB has specifies a timer in the HANDOVER REQUEST message the T-gNB reserves any required resources after the timer expires and hence makes use of these DL and/or UL resources for other users or other purposes until the timer expires. In another embodiment, the T-gNB starts an implementation-specific timer upon receiving the HANDOVER REQUEST message and makes a resource reservation for the UE that is valid after the expiration of such timer. In an example, if the S-gNB specifies a list of other candidate cells and/or T-gNBs in this message or any other message, the T-gNB makes a record of such list so that can perform handover cancellation if needed in Step F16S9.

In Step F16S2, the T-gNB replies with the HANDOVER REQUEST ACKNOWLEDGE message to the S-gNB and specifies the CHO configuration for the UE's use upon CHO to the selected candidate cell.

In Step F16S3, the T-gNB checks if a HANDOVER CANCEL message is received or not. If yes, it proceeds to Step F16S4; otherwise, it goes to Step F16S5.

In Step F16S4, the T-gNB releases the resources the T-gNB had reserved for the UE.

In Step F16S5, the T-gNB checks if an EARLY STATUS TRANSFER message is received or not. If yes, it proceeds to Step F16S6; otherwise, it goes to Step F16S7.

In Step F16S6, the T-gNB prepares to receive the forwarded DL packets from the S-gNB so that it is ready to transmit those packets to the UE when a radio connection with the UE is established.

In Step F16S7, the T-gNB checks if a random access preamble from the UE has been detected or not. If yes, it proceeds to Step F16S8; otherwise, it goes to Step F16S3.

In Step F16S8, the T-gNB sends a random access response to the UE and receives an RRC reconfiguration complete message from the UE.

In Step F16S9, the T-gNB sends a HANDOVER CANCEL message to other T-gNBs (the list of which is obtained from the S-gNB). Furthermore, the T-gNB sends a HANDOVER SUCCESS message to the S-gNB.

In Step F16S10, the T-gNB receives an SN STATUS TRANSFER message and prepares to receive the forwarded DL packets from the S-gNB so that the T-gNB can transmit those packets to the UE.

In Step F16S11, the T-gNB carries out normal operations with the UE such as data transfer since the CHO has been successfully completed for the UE.

It is possible that the set of triggers specified in the RRC reconfiguration message in Step F13S3 as illustrated in FIG. 13 (for the UE to be able to send a measurement report in Step F13S4) and/or the set of CHO execution triggers specified in the RRC reconfiguration message in Step F13S8 (for the UE to be able to execute CHO to the selected CHO target cell in Step F13S15) may not be satisfied. However, a given location would not be served by the currently serving cell after a certain instant in the case of the quasi-earth-fixed beams, earth-moving beams, and the feeder link switch. Hence, in an embodiment, the UE carries out regular handover or the CHO handover to the fallback cell specified by the gNB.

In an example, the fallback cell for handover is only specified in a SIB. In another example, the fallback cell for handover is only specified in a dedicated RRC signaling message such as RRC reconfiguration message in Step F13S3 and/or F13S8 as illustrated in FIG. 13. In yet another example, the fallback cell for handover is specified in a SIB as well as in a dedicated RRC signaling message.

In an embodiment, when the fallback handover cell is specified in a SIB, the following condition FH1 is evaluated by the UE for regular handover or CHO:

[Is "remainingServingTime<fallbackHandover Threshold"?] (FH1)

In an example, when the condition FH1 is satisfied, the UE performs regular handover to the fallback handover cell. The UE calculates remainingServingTime as the difference between endServingTime (i.e., the time when the serving cell would no longer serve the current geographic area) and the current time. In an example, the UE sends a measurement report message to the source gNB indicating the use of the default handover cell, and remaining steps of the handover procedure are the same as in case of a regular handover. In another example, the UE directly sends a RA preamble to the fallback handover cell (which is selected from the set of contention-based RA preambles). In an example implementation, a set of RA preambles is designated for fallback handover and the UE chooses a RAN preamble from this set.

In another example, if CHO is configured for the UE and if the condition FH1 is satisfied, the UE performs CHO to the fallback handover cell. The UE calculates remainingServingTime as the difference between endServingTime (i.e., the time when the serving cell would no longer serve the current geographic area) and the current time. In an example, the UE sends a RA preamble in the fallback handover cell.

In an embodiment, the gNB broadcasts (per serving cell) fallbackHandoverThreshold and identity of the fallback neighbor cell in system information.

The FH1 condition for fallback handover is suitable for quasi-earth-fixed beams and feeder link switch for quasi-earth-fixed beams and earth-moving beams and is applicable when broadcast signaling is used to convey the identity of the fallback cell and/or the fallback handover parameters such as fallbackHandoverThreshold. In another embodiment, fallbackHandoverThreshold is specified as endServingTime-timeMargin and timeMargin is broadcast in system information instead of fallbackHandoverThreshold.

In an embodiment, when the fallback handover cell is specified in a SIB, the following condition FH2 is evaluated by the UE for regular handover or CHO:

[Is "dwellTime>maxServingTimeThreshold"?] (FH2)

The variable dwellTime is the time elapsed since handover to the current serving cell (e.g., starting from the instant the UE has sent an RRC reconfiguration complete message to indicate the completion of handover) and maxServingTimeThreshold specifies the maximum period for which an earth-moving beam covers a given point on the earth's surface area. In an embodiment, the gNB broadcasts (per serving cell) maxServingTimeThreshold and identity of the fallback neighbor cell.

In an example, when the condition FH2 is satisfied, the UE performs regular handover to the fallback handover cell. In an example, the UE sends a measurement report message to the source gNB indicating the use of the default handover cell, and remaining steps of the handover procedure are the same as in case of a regular handover. In another example, the UE directly sends a RA preamble to the fallback handover cell (which is selected from the set of contention-based RA preambles). In an example implementation, a set of RA preambles is designated for fallback handover and the UE chooses a RAN preamble from this set.

In another example, if CHO is configured for the UE and if the condition FH2 is satisfied, the UE performs CHO to the fallback handover cell. In an example, upon meeting the FH2 condition, the UE executes CHO and sends a RA preamble in the fallback handover cell.

The FH2 condition for fallback handover is suitable for earth-moving beams and is applicable when broadcast signaling is used to convey the identity of the fallback cell and/or the fallback handover parameters such as maxServingTimeThreshold.

In an embodiment, when the fallback handover cell is specified in a SIB, the following condition FH3 is evaluated by the UE for regular handover or CHO:

[Is "ueDwellTimer>fallbackHandoverTimerX"?] (FH3)

In FH3, X is [ ] (i.e., null or absent) if the network wants to use only one type of handover (i.e., regular or CHO) for fallback. If the network wants to configure such timers independently for regular handover and CHO, the network can use X=1 for regular HO and X=2 form CHO in an example.

In an example, when the condition FH3 is satisfied, the UE performs regular handover to the fallback handover cell. The UE starts or restarts the timer ueDwellTimer upon receiving the parameter fallbackHandoverTimerX in the RRCConfiguration message in Step F13S3. In an example, the UE sends a measurement report message to the source gNB indicating the use of the default handover cell, and remaining steps of the handover procedure are the same as in case of a regular handover. In another example, the UE directly sends a RA preamble to the fallback handover cell (which is selected from the set of contention-based RA preambles). In an example implementation, a set of RA preambles is designated for fallback handover and the UE chooses a RAN preamble from this set.

In another example, if CHO is configured for the UE and if the condition FH3 is satisfied, the UE performs CHO to the fallback handover cell. The UE starts or restarts the timer ueDwellTimer upon receiving the parameter fallbackHandoverTimerX in the RRCConfiguration message in Step F13S8.

The FH3 condition for fallback handover is suitable for quasi-earth-fixed beams and feeder link switch for quasi-earth-fixed beams and earth-moving beams and is applicable when RRC signaling is used to convey the identity of the fallback cell and/or the fallback handover parameters such as fallbackHandoverTimerX.

In an embodiment, when the fallback handover cell is specified via RRC signaling, the following condition FH4 is evaluated by the UE for regular handover or CHO:

[Is "ueDwellTimer>maxServingTimerX"?] (FH4)

In FH4, X is [ ] (i.e., null or absent) if the network wants to use only one type of handover (i.e, regular or CHO) for fallback. If the network wants to configure such timers independently for regular handover and CHO, the network can use X=1 for regular HO and X=2 form CHO in an example.

The variable ueDwellTimer is the time elapsed since the reception of the RRC reconfiguration message conveying the measurement report configuration for regular handover in Step F13S3 or the time elapsed since the reception of the RRC reconfiguration message conveying the CHO configuration for CHO in Step F13S8. maxServingTimerX is intended to be the maximum period for which an earth-moving beam covers a given point on the earth's surface area from the perspective of the gNB. The gNB may choose somewhat different values of maxServingTimerX for different UEs to balance the signaling load.

In an example, when the condition FH4 is satisfied, the UE performs regular handover to the fallback handover cell. In an example, the UE sends a measurement report message to the source gNB indicating the use of the default handover cell, and remaining steps of the handover procedure are the same as in case of a regular handover. In another example, the UE directly sends a RA preamble to the fallback handover cell (which is selected from the set of contention-based RA preambles). In an example implementation, a set of RA preambles is designated for fallback handover and the UE chooses a RAN preamble from this set.

In another example, if CHO is configured for the UE and if the condition FH4 is satisfied, the UE performs CHO to the fallback handover cell. In an example, upon meeting the FH4 condition, the UE executes CHO and sends a RA preamble in the fallback handover cell.

The FH4 condition for fallback handover is suitable for earth-moving beams and is applicable when dedicated RRC signaling is used to convey the identity of the fallback cell and/or the fallback handover parameters such as maxServingTimerX.

In an embodiment, when the UE receives fallback handover parameters for both regular HO and CHO, the UE maintains multiple variables (i.e., ueDwellTimer1 and ueDwellTimer2) and timers (i.e., maxServingTimer1 and maxServingTimer2) separately or independently.

In an embodiment, when the UE receives fallback handover configuration via both system information signaling, the RRC signaling parameters supersede the SI parameters.

Figure 17:
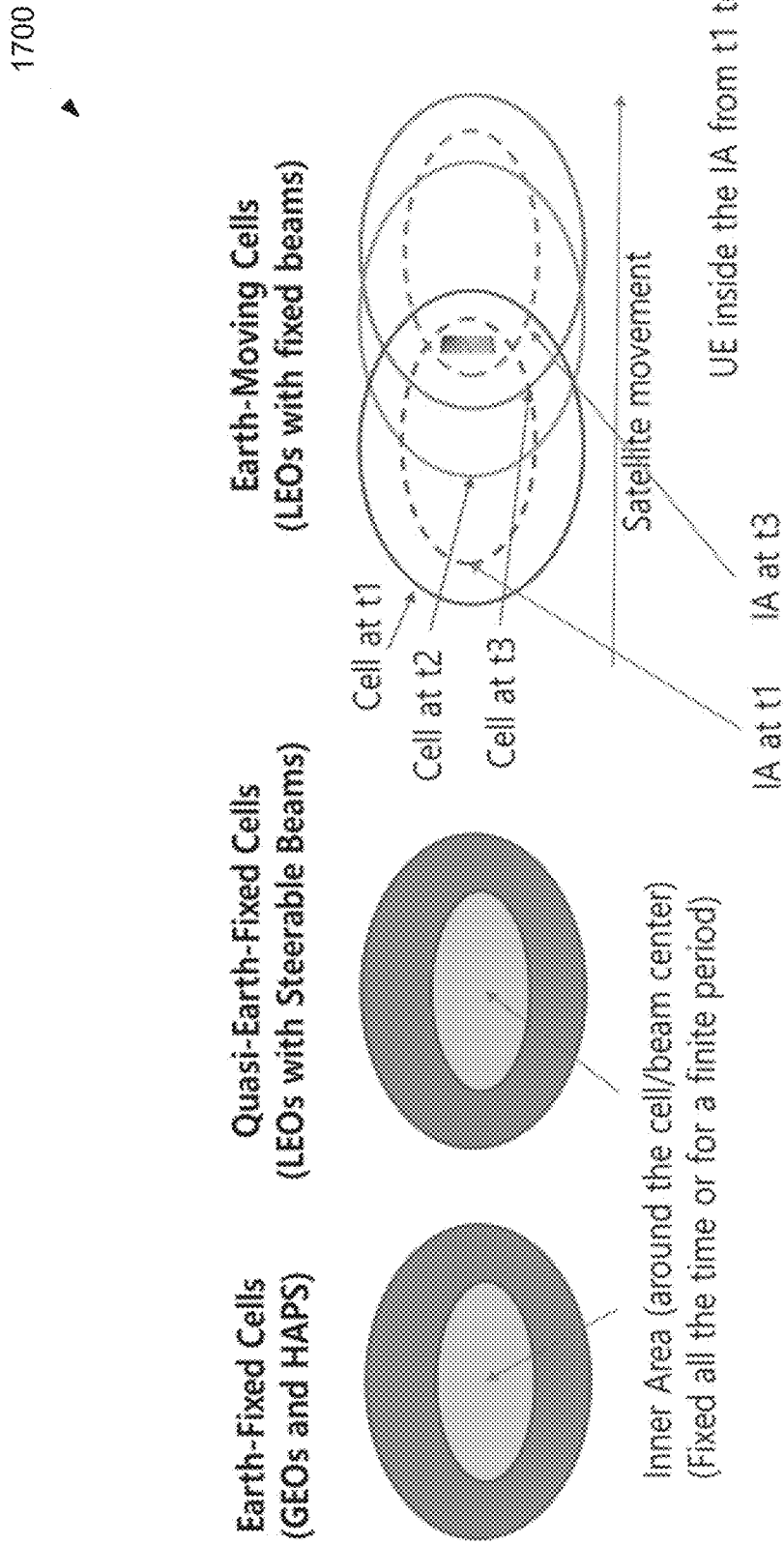
FIG. 17 illustrates an example of inner areas for skipping neighbor cell measurements according to embodiments of the present disclosure.

FIG. 17 illustrates an example of inner areas for skipping neighbor cell measurements 1700 according to embodiments of the present disclosure. An embodiment of the inner areas for skipping neighbor cell measurements 1700 shown in FIG. 17 is for illustration only.

FIG. 17 illustrates geographic areas in cells where the neighbor cell measurements can be skipped in three different scenarios: earth-fixed beams or cells, quasi-earth-fixed beams or cells, or earth-moving beams. These areas are referred to as inner areas (IAs) in the present disclosure.

GEOs and HAPS create beams that are fixed on the earth's surface area all the time. In contrast, LEOs with steerable beams create beams that are fixed on the earth's surface area for a finite period before illuminating a different geographic area. LEOs with fixed (i.e., non-steerable) beams create earth-moving beams that illuminate a different geographic area from one instant to the next. In all these types of beams, the neighbor cell search can be skipped in the IA. This disclosure describes how the IA can be defined using a new criterion relative to the existing criterion used in wireless systems. The size of the IA can be determined based on the expected maximum speeds of the UE and the platform and the cell size. The IA size can then be represented by one or more thresholds in a neighbor search criterion.

Figure 18:
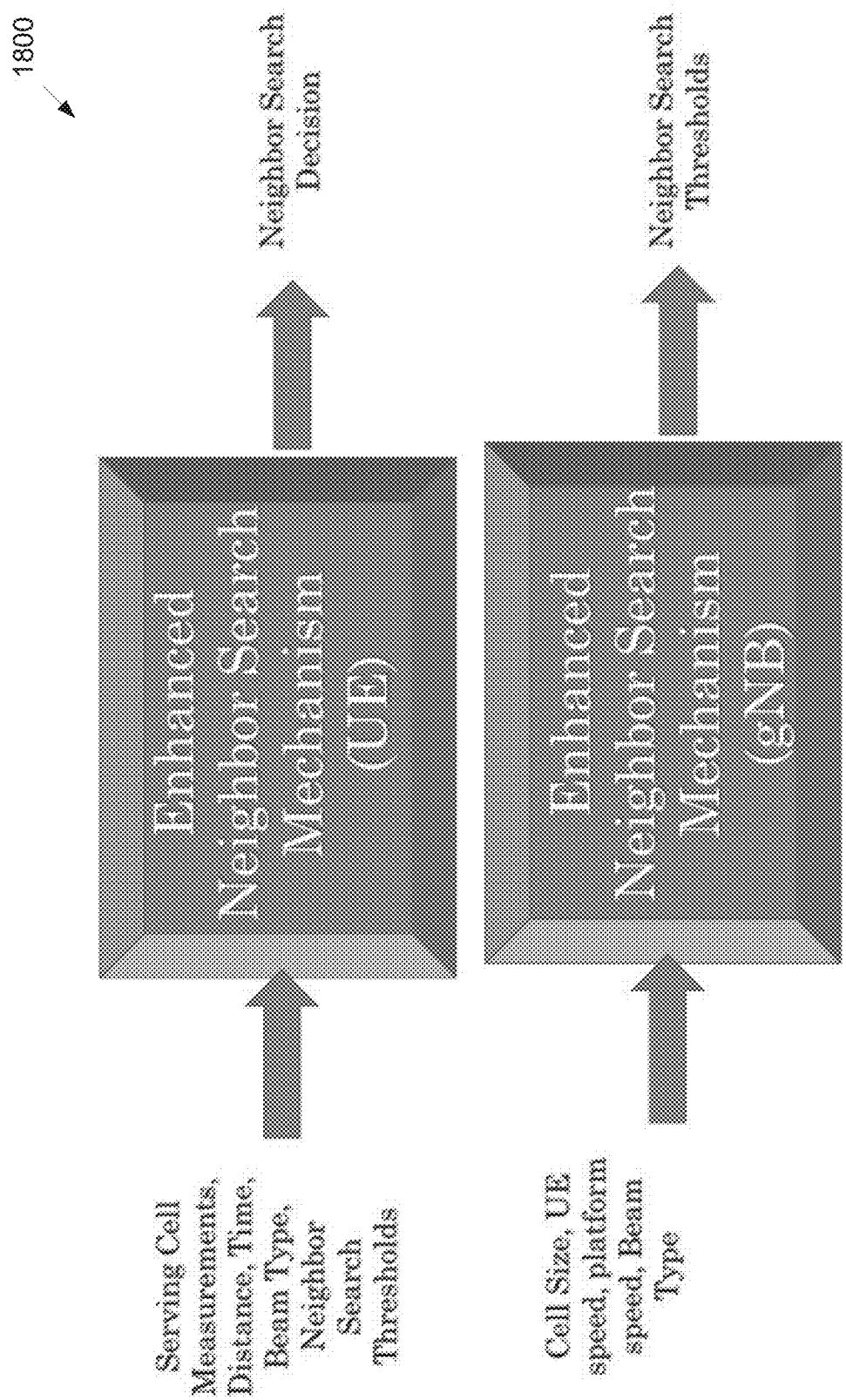
FIG. 18 illustrates an example of enhanced neighbor search mechanism according to embodiments of the present disclosure.

FIG. 18 illustrates an example of enhanced neighbor search mechanism 1800 according to embodiments of the present disclosure. An embodiment of the enhanced neighbor search mechanism 1800 shown in FIG. 18 is for illustration only.

FIG. 18 illustrates inputs and outputs of the enhanced neighbor search mechanisms of the disclosure implemented at the UE and the gNB. The UE considers the factors such as the serving cell measurements (e.g., RSRP and RSRQ), distance from the center of the cell, time since last cell reselection or handover, beam type (e.g., earth-fixed, quasi-earth-fixed, or earth-moving), and the neighbor search thresholds provided by the gNB and makes a decision to search for neighbors or not. The gNB considers the factors such as the size of the cell, the speeds of the UE and the platform (e.g., satellites), and the beam type, determines neighbor search thresholds, and conveys these thresholds to UEs.

Details of the UE-network signaling exchange, the gNB procedure, and the UE procedure for the disclosure are provided in FIGS. 19, 20, 21A, and 21B, respectively.

Figure 19:
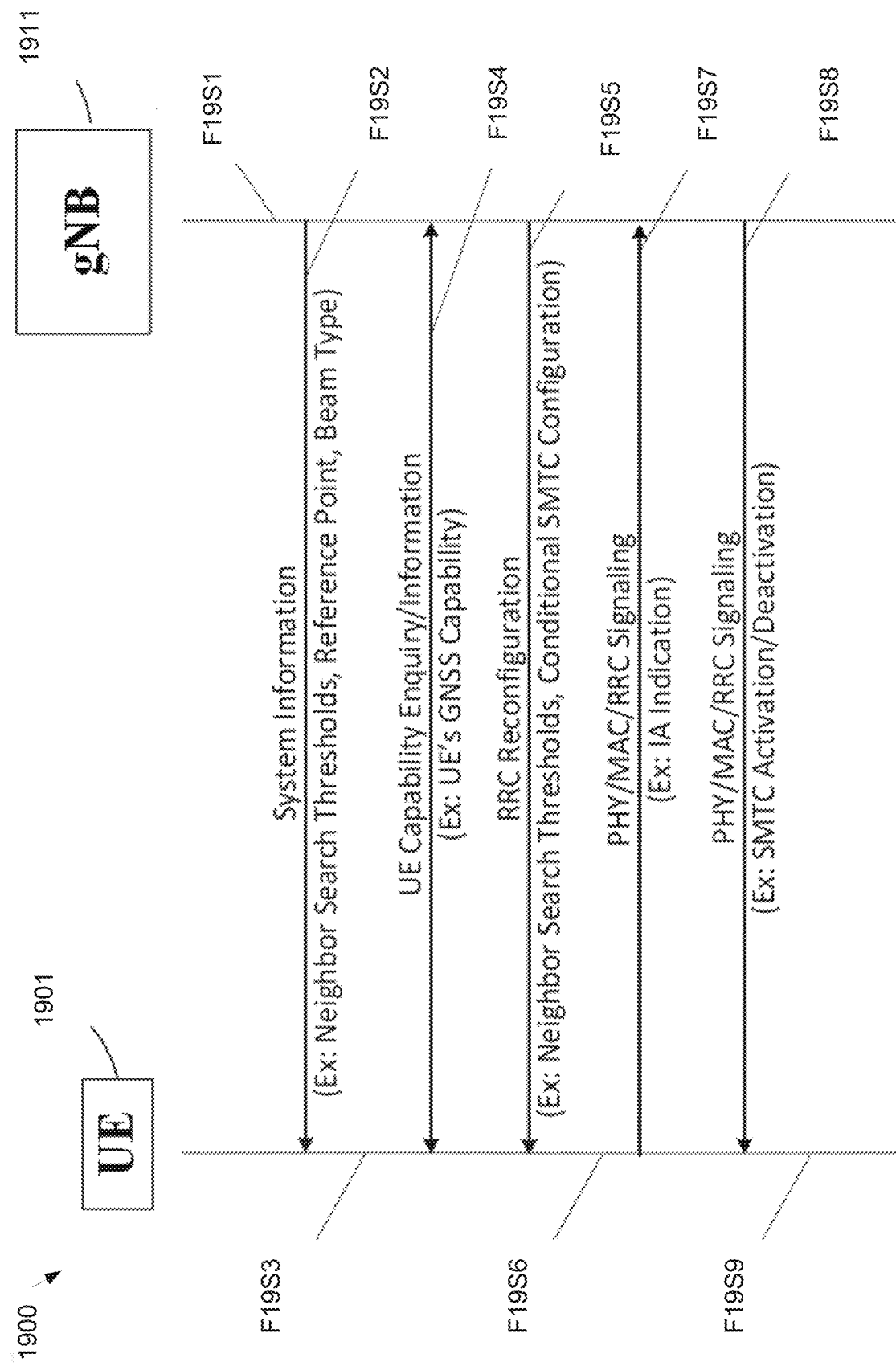
FIG. 19 illustrates a signaling flow of UE-network procedure according to embodiments of the present disclosure.

FIG. 19 illustrates a signaling flow of UE-network procedure 1900 according to embodiments of the present disclosure. For example, the UE-network procedure 1900 as may be performed by a UE (e.g., 111-116 as illustrated in FIG. 1) and/or a BS (e.g., 101-103 as illustrated in FIG. 1). One or more of the components illustrated in FIG. 19 can be implemented in specialized circuitry configured to perform the noted functions or one or more of the components can be implemented by one or more processors executing instructions to perform the noted functions.

As illustrated FIG. 19, in Step F19S1, the gNB (1911) considers the factors such as the size of the cell, the speeds of the UE and the platform (e.g., satellites), and the beam type and determines neighbor search thresholds for the UEs in the idle and inactive modes (i.e., in the RRC state of RRC_IDLE or RRC_INACTIVE). Examples of these neighbor search thresholds include R16 thresholds such as SIntraSearchP and SIntraSearchQ, (and optionally 5-MeasureConfig, which is specified as ssb-RSRP or csi-RSRP) and new thresholds such as distanceThreshold, time1Threshold, and time2Threshold. Details of these thresholds are given in the description associated with FIG. 20.

In Step F19S1, to facilitate prioritization of a specific NTN type by the UE, in an example, the gNB specifies the NTN type (e.g., a terrestrial network, a GEO platform, a LEO platform, HAPS, air-to-ground, and so on) for the neighbor cell in addition to specifying such NTN type for the serving (or the current) cell. Such indication of the NTN type for the neighboring cells enables the UE to prioritization cell selection/reselection toward the desired NTN type. Such prioritization can reflect the NTN type priorities determined by the service provider's policies.

In Step F19S2, in an example, the gNB conveys the neighbor search thresholds in an existing or new system information block (SIB). In another example, the gNB specifies the coordinates of the Reference Point (e.g., center of the cell) in system information. In yet another example, the gNB includes the type of the beam (e.g., earth-fixed, quasi-earth-fixed, and earth-moving). These parameters may be specified in an existing SIB or a new SIB or may be distributed between an existing SIB and a new SIB.

Figure 20:
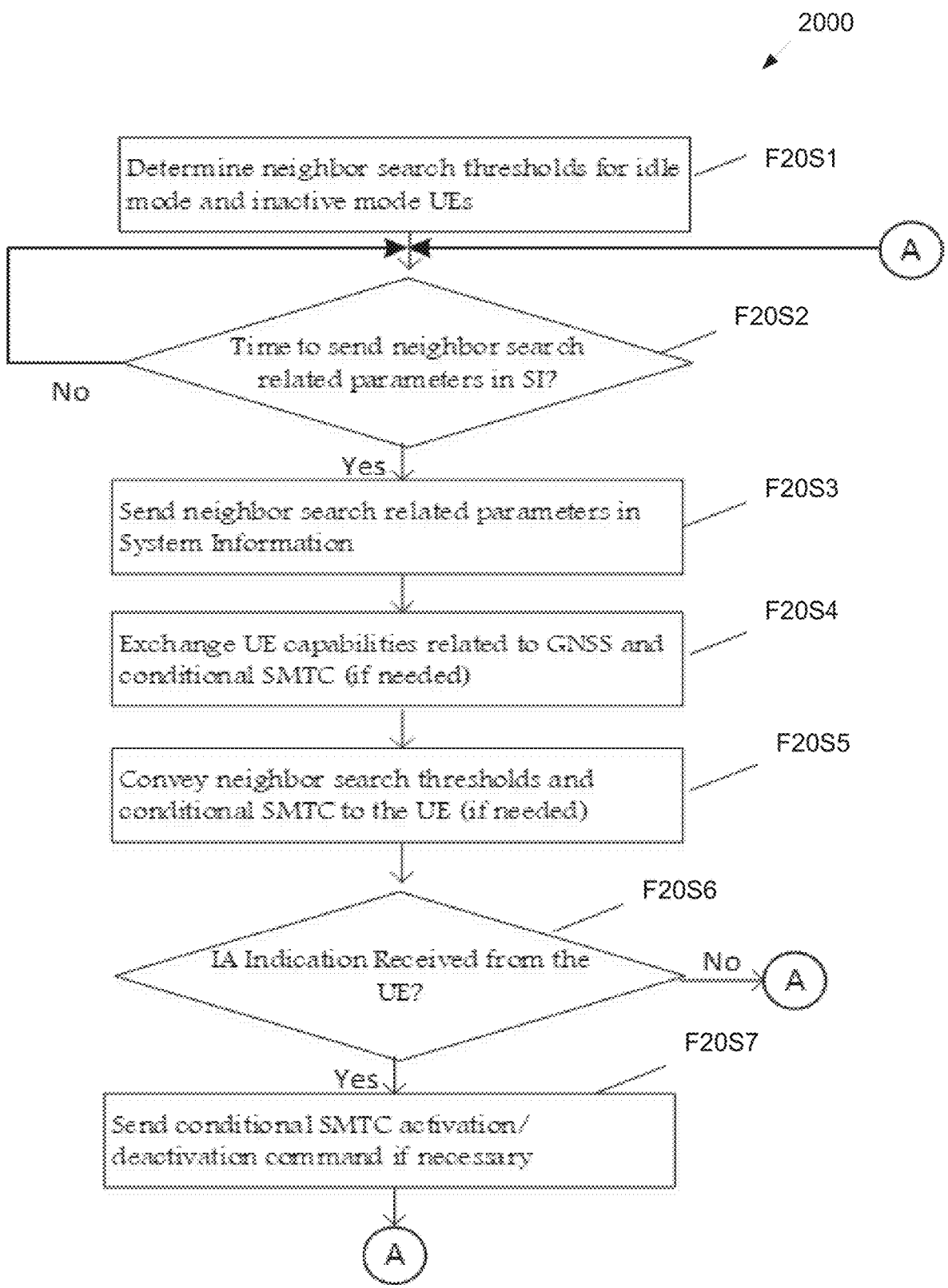
FIG. 20 illustrates a flowchart of a method for enhanced neighbor search according to embodiments of the present disclosure.

In Step F19S3, The UEs in the idle or inactive mode utilize the idle/inactive mode related thresholds obtained in Step F19S2 and makes a decision whether to search for a neighbor cell or not. The UE does not search for neighbor cells when the UE is in the IA of the cell. Details of how the idle/inactive mode UE determines whether the UE is in the IA or not are given in Step F20S1 as illustrated in FIG. 20.

For a UE in the connected mode, Steps F19S4 to F19S9 are executed.

In Step F19S4, the UE and the gNB exchange UE capability enquiry and UE capability information messages. In an example, the UE informs the gNB if the UE has a global navigation satellite system (GNSS) capability.

In Step F19S5, in an example, the gNB configures the UE with neighbor search trigger conditions by specifying suitable neighbor search thresholds based on the UE's GNSS capability. In an example, based on the gNB and the UE capabilities and the gNB decision, the gNB may specify in Step F19S5 conditional SS/PBCH Block measurement time configuration (SMTC) to the UE, where the SMTC is used by the connected mode UE to make measurements of neighbor cells only after the UE receives an activation command from the gNB. In other words, the UE makes use of the SMTC to make neighbor cell measurements at the configured periodicity only after the gNB has activated conditional SMTC. Conditional SMTC ensures that both the gNB and the UE have the same understanding of the UE's location being inside or outside the IA.

In Step F19S6, The UEs in the connected mode utilize the connected mode related thresholds obtained in Step F19S2 or Step F19S5 and makes a decision whether to search for a neighbor cell or not. The UE does not search for neighbor cells when the UE is in the IA of the cell. Details of how the connected mode UE determines whether the UE is in the IA or not are given in Step F20S1 of FIG. 20.

If a connected mode UE is configured by the gNB with conditional SMTC, Steps F19S7 to F19S9 are executed. Otherwise, these steps are skipped.

In Step F19S7, in an example, the connected mode UE informs the gNB weather the UE is inside the IA or outside the IA. Such indication can be provided via physical (PHY) layer signaling, MAC layer signaling, or RRC signaling. In an example for the PHY signaling, the IA indication may be part of uplink control information (UCI).

In another example for the PHY signaling, the IA indication may be represented by a PUCCH sequence. In an example for the MAC signaling, a new MAC control element (CE) may be defined to convey the IA indication or a bit from an existing MAC CE can be used for the IA indication. The IA indication may also be conveyed in a header at the PHY, MAC, RLC, or PDCP layer in another example. For example, a "reserved bit" at any suitable layer of the radio interface protocol stack can be used to indicate "inside IA" (e.g., bit=1) or "outside the IA" (e.g., bit=0) or vice versa.

In Step F19S8, in an example, the gNB utilizes PHY, MAC, or RRC signaling to send an SMTC activation or deactivation command to the UE based on the status of the IA indication provided by the UE. For example, if the UE has indicated in Step F19S7 that the UE is inside the IA, the gNB sends the SMTC deactivation command if it has not done so after receiving an "inside IA" indication. Similarly, if the UE has indicated in Step F19S7 that the UE is outside the IA, the gNB sends the SMTC activation command if it has not done so after receiving an "outside IA" indication.

In Step F19S9, in an example, the UE makes neighbor cell measurements using the SMTC configuration when the UE is outside the IA and after it has received an SMTC activation command from the UE. Similarly, the UE does not search for neighbor cells when the UE is inside the IA and after it has received an SMTC deactivation command from the UE.

As mentioned earlier, if the gNB does not intend to use conditional SMTC configuration and intends to use regular R16 SMTC for the UE, Steps F19S7 to F19S9 are skipped.

FIG. 20 illustrates a flowchart of a method 2000 for enhanced neighbor search according to embodiments of the present disclosure. For example, the method 2000 as may be performed by a UE such as 111-116 as illustrated in FIG. 1. An embodiment of the method 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions.

As illustrated in FIG. 20, in Step F20S1, in an example, the gNB considers the factors such as the size of the cell, the speeds of the UE and the platform (e.g., satellites), and the beam type and determines neighbor search thresholds. Examples of these neighbor search thresholds include R16 thresholds such as SIntraSearchP and SIntraSearchQ and S-MeasureConfig (which is specified as ssb-RSRP or csi-RSRP) and new thresholds such as distanceThreshold, startTimeThreshold, and endTimeThreshold. Details of these thresholds including their applicability to (A) idle/inactive mode UEs and connected UEs and (B) three types of beams (i.e., earth-fixed beams, quasi-earth-fixed beams, and earth-moving beams) are given below.

According to 3GPP Release 16 procedures, an idle/inactive mode UE may choose not to perform intra-frequency measurements if the condition in Equation (2) is met: "$S_{rxlev}>S_{IntraSearchP}$" AND "$S_{qual}>S_{IntraSearchQ}$" . . . Equation (2), where $S_{rxlev}$ is (measured RSRP−RSRP threshold) and $S_{qual}$ is (measured RSRQ−RSRQ threshold), and the neighbor search thresholds of $S_{IntraSearchP}$ and $S_{IntraSearchQ}$ are specified by the gNB in system information.

Equation (3) is used by idle and connected mode UEs in a TN. Furthermore, according to 3GPP Release 16, a connected mode UE may choose not to process intra-frequency measurements if the condition in Equation (3) is met:

"RSRP>=S-MeasureConfig(=ssb-RSRP or csi-RSRP)"     Equation (3)

In an example, Equation (2) is replaced by Equation (4) specified below:

"UE-Reference Point distance<distanceThreshold"     Equation (4)

In Equation (4), "UE-reference point distance" is the distance between the UE and the Reference Point (e.g., in km or m) and distanceThreshold is the distance threshold (e.g., in km or m) determined by the gNB. If the condition in Equation (4) is satisfied, the UE is inside the IA and hence does not need to perform neighbor cell measurements. In contrast, if the condition in Equation (4) is not satisfied, the UE is outside the IA and hence is required to perform neighbor cell measurements.

The use of distance, provided by this disclosure, makes the neighbor search criterion more robust, more definitive, and more flexible in an NTN compared to the RSRP/RSRQ based criterion supported up to R16.

In Equation (4), "<" can be replaced by "<=" in another example.

In an embodiment, per gNB indication or per specifications, the idle/inactive mode UE evaluates Equation (4) and decides not to perform neighbor cell measurements when this condition is satisfied. The criterion specified in Equation (4) is suitable for earth-fixed beams and earth-moving beams.

In another embodiment, per gNB indication or per specifications, the idle/inactive mode UE evaluates both Equation (2) and Equation (4) and decides not to perform neighbor cell measurements when both conditions are satisfied. This implies the use of an "AND" operator between Equation (2) and Equation (4).

In yet another embodiment, per gNB indication or per specifications, the idle/inactive mode UE evaluates both Equation (2) and Equation (4) and decides not to perform neighbor cell measurements when any of the two conditions is satisfied. This implies the use of an "OR" operator between Equation (2) and Equation (4).

The combination of Equation (2) criterion and Equation (4) criterion is suitable for earth-fixed beams and earth-moving beams.

In another embodiment, Equation (2) is replaced by Equation (5) specified below:

"startTimeThreshold<timeSinceLastCell-
Reselection<endTimeThreshold"  Equation (5)

In Equation (5), "timeSinceLastCellReselection" is the time since the last cell reselection was performed by the UE (e.g., in s or ms), startTimeThreshold is the start of the time window during which neighbor cell measurements can potentially be skipped, and endTimeThreshold is the end of the time window during which neighbor cell measurements can potentially be skipped. The time thresholds, startTimeThreshold and endTimeThreshold, are determined by the gNB. If the condition in Equation (5) is satisfied, the idle/inactive mode UE is inside the IA and hence does not need to perform neighbor cell measurements. In contrast, if the condition in Equation (5) is not satisfied, the idle/inactive mode UE is outside the IA and hence is required to perform neighbor cell measurements.

The use of time, provided by this disclosure, makes the neighbor search criterion more robust, more definitive, and more flexible in an NTN compared to the RSRP/RSRQ based criterion supported up to R16.

The criterion specified in Equation (5) is suitable for quasi-earth-fixed beams and earth-moving beams.

In Equation (5), "<" can be replaced by "<=" in another example.

In another embodiment, per gNB indication or per specifications, the idle/inactive mode UE evaluates both Equation (4) and Equation (5) and decides not to perform neighbor cell measurements when both conditions are satisfied. This implies the use of an "AND" operator between Equation (4) and Equation (5).

In yet another embodiment, per gNB indication or per specifications, the idle/inactive mode UE evaluates both Equation (4) and Equation (5) and decides not to perform neighbor cell measurements when any of the two conditions is satisfied. This implies the use of an "OR" operator between Equation (4) and Equation (5).

The combination of Equation (4) criterion and Equation (5) criterion is suitable for quasi-earth-fixed beams and earth-moving beams.

In yet another embodiment, Equation (2) criterion, Equation (4) criterion, and Equation (5) criterion can be combined in one of the following ways (e.g., options) by a UE in the idle/inactive mode:

(i) Equation (2) AND [Equation (4) AND Equation (5)];
(ii) Equation (2) AND [Equation (4) OR Equation (5)];
(iii) Equation (2) OR [Equation (4) AND Equation (5)]; and/or
(iv) Equation (2) OR [Equation (4) OR Equation (5)].

For example, in case of Option (i) above, the idle/inactive mode UE does not perform neighbor cell search when all the three criteria specified in Equation (2), Equation (4), and Equation (5) are satisfied. Otherwise, the idle/inactive mode UE performs neighbor cell search. Such combination would the most robust option for neighbor cell search.

In another example, in case of Option (iv) above, the idle/inactive mode UE does not perform neighbor cell search when any of the three criteria specified in Equation (2), Equation (4), and Equation (5) is satisfied. Otherwise, the idle/inactive mode UE performs neighbor cell search.

In one example implementation, one or more of these options are explicitly indicated by the gNB in system information. In another example implementation, one or more of these options are pre-defined in specifications so that the idle/inactive mode UE know which combination(s) to utilize while making a determination about neighbor cell search.

The combination of three criteria is suitable for quasi-earth-fixed beams and earth-moving beams.

In an embodiment, per gNB indication or per specifications, the connected mode UE evaluates Equation (4) and decides not to perform neighbor cell measurements when this condition is satisfied. The criterion specified in Equation (4) is suitable for earth-fixed beams and earth-moving beams.

In an embodiment, per gNB indication or per specifications, the connected mode UE evaluates both Equation (3) and Equation (4) and decides not to perform neighbor cell measurements when both conditions are satisfied. This implies the use of an "AND" operator between Equation (3) and Equation (4).

In yet another embodiment, per gNB indication or per specifications, the connected mode UE evaluates both Equation (3) and Equation (4) and decides not to perform neighbor cell measurements when any of the two conditions is satisfied. This implies the use of an "OR" operator between Equation (3) and Equation (4).

The combination of Equation (3) criterion and Equation (4) criterion is suitable for earth-fixed beams and earth-moving beams.

In another embodiment, Equation (3) is replaced by Equation (6) specified below:

"startTimeThreshold<timeSinceLastHand-
over<endTimeThreshold"  Equation (6)

In Equation (6), "timeSinceLastHandover" is the time since the last handover was performed by the UE (e.g., in s or ms), startTimeThreshold is the start of the time window during which neighbor cell measurements can potentially be skipped, and endTimeThreshold is the end of the time window during which neighbor cell measurements can potentially be skipped. The time thresholds, startTimeThreshold and endTimeThreshold, are determined by the gNB. If the condition in Equation (6) is satisfied, the UE is inside the IA and hence does not need to perform neighbor cell measurements. In contrast, if the condition in Equation (6) is not satisfied, the UE is outside the IA and hence is required to perform neighbor cell measurements.

The use of time, provided by this disclosure, makes the neighbor search criterion more robust, more definitive, and more flexible in an NTN compared to the RSRP/RSRQ based criterion supported up to R16.

The criterion specified in Equation (6) is suitable for quasi-earth-fixed beams and earth-moving beams.

In Equation (6), "<" can be replaced by "<=" in another example.

In another embodiment, per gNB indication or per specifications, the connected mode UE evaluates both Equation (4) and Equation (6) and decides not to perform neighbor cell measurements when both conditions are satisfied. This implies the use of an "AND" operator between Equation (4) and Equation (6).

In yet another embodiment, per gNB indication or per specifications, the idle/inactive mode UE evaluates both Equation (4) and Equation (6) and decides not to perform neighbor cell measurements when any of the two conditions is satisfied. This implies the use of an "OR" operator between Equation (4) and Equation (6).

The combination of Equation (4) criterion and Equation (6) criterion is suitable for quasi-earth-fixed beams and earth-moving beams.

In yet another embodiment, Equation (3) criterion, Equation (4) criterion, and Equation (6) criterion can be combined in one of the following ways by a UE in the idle/inactive mode:

(i) Equation (3) AND [Equation (4) AND Equation (6)];
(ii) Equation (3) AND [Equation (4) OR Equation (6)];
(iii) Equation (3) OR [Equation (4) AND Equation (6)]; and/or
(iv) Equation (3) OR [Equation (4) OR Equation (6)].

For example, in case of Option (i) above, the connected mode UE does not perform neighbor cell search when all the three criteria specified in Equation (3), Equation (4), and Equation (6) are satisfied. Otherwise, the connected mode UE performs neighbor cell search. Such combination would the most robust option for neighbor cell search.

In another example, in case of Option (iv) above, the connected mode UE does not perform neighbor cell search when any of the three criteria specified in Equation (3), Equation (4), and Equation (6) is satisfied. Otherwise, the UE performs neighbor cell search.

In one example implementation, one or more of these options are explicitly indicated by the gNB via dedicated signaling. In another implementation, one or more of these options are explicitly indicated by the gNB in system information. In yet another example implementation, one or more of these options are pre-defined in specifications so that the UE know which combination(s) to utilize while making a determination about neighbor cell search.

The combination of three criteria (i.e., RSRP/RSRQ, distance, and time) is suitable for quasi-earth-fixed beams and earth-moving beams.

In Step F20S2, in an example embodiment, the gNB evaluates if it is time to send one or more parameters in system information. The gNB determines which parameters may be sent in what system information block (SIB). In particular, the gNB may decide to send one set of parameters in one SIB and a different set of parameters in a different SIB. For example, the gNB may send parameters with different periodicities (e.g., one periodicity for neighbor search thresholds and a different periodicity for reference point coordinates). If it is the time to send selected parameters (e.g., neighbor search thresholds), the gNB sends those in a SIB. Otherwise, the gNB waits for a suitable instant to send the relevant SIB.

In Step F20S3, the gNB broadcasts neighbor search thresholds in an existing or new SIB. In another example, the gNB specifies the coordinates of the reference point (e.g., center of the cell) in an existing or new system information. In yet another example, the gNB includes the type of the beam (e.g., earth-fixed, quasi-earth-fixed, and earth-moving) in an existing or new system information. In an example implementation, the gNB may broadcast the trigger conditions (e.g., standalone Equation (2), Equation (4), or Equation (5) or one or more of their combinations) to be used by the UEs for neighbor cell search determination. In another example implementation, specific trigger conditions may be fully defined in specifications, potentially as a function of beam type. These parameters may also be distributed between an existing SIB and a new SIB.

In Step F20S4, the gNB exchanges UE capability enquiry and UE capability information messages with the UE if it has done so after the RRC connection setup. In an example, the gNB learns from the UE capability information message if the UE has a global navigation satellite system (GNSS) capability. The gNB may also receive such capability indication via another RRC message. In another example, all UEs are required to support the GNSS capability. In yet another example, all UEs of a certain category are required to support the GNSS capability. In an example implementation, the gNB may receive an indication about the UE's support of conditional SMTC.

In Step F20S5, in an example, the gNB configures the UE with neighbor search trigger conditions by specifying suitable neighbor search thresholds in an RRC reconfiguration message based on the UE's GNSS capability if it has done so after the RRC connection setup. In an example, based on the gNB and the UE capabilities, the gNB also configures the UE with conditional SMTC to the UE in an RRC reconfiguration message. In another example, the gNB may configure the UE with reporting of the IA indication in support of conditional SMTC (e.g., periodic IA indication or event-based IA indication).

In Step F20S6, in an embodiment, if conditional SMTC has been configured for the UE, the gNB checks if the IA indication has been received from the UE or not. If yes, Step F20S7 is executed; otherwise, Step F20S2 is executed.

In Step F20S7, in an embodiment, the gNB sends an activation or deactivation command (if necessary) for conditional SMTC if needed. For example, if the gNB has not yet sent an activation command for the conditional SMTC in the recent past after receiving an IA indication of "Outside IA" from the UE, the gNB sends such activation command to the UE. Similarly, if the gNB has not yet sent a deactivation command for the conditional SMTC in the recent past after receiving an IA indication of "Inside IA" from the UE, the gNB sends such deactivation command to the UE. In an example, the gNB sends the command via a new MAC CE or an enhanced MAC CE. In another embodiment, the command is sent in a downlink control information (DCI) at the physical layer. In another embodiment, the command is sent using a bit (e.g., even a reserved bit) in the header of a radio protocol stack layer such as MAC and RLC. In yet another embodiment, the command is sent as part of an RRC message such as an RRC reconfiguration message. After executing Step F20S7, Step F20S2 is executed.

If the gNB does not intend to use conditional SMTC configuration and intends to use regular 3GPP R16 SMTC for the UE, Steps F20S6 and F20S7 are skipped.

Figure 21A:
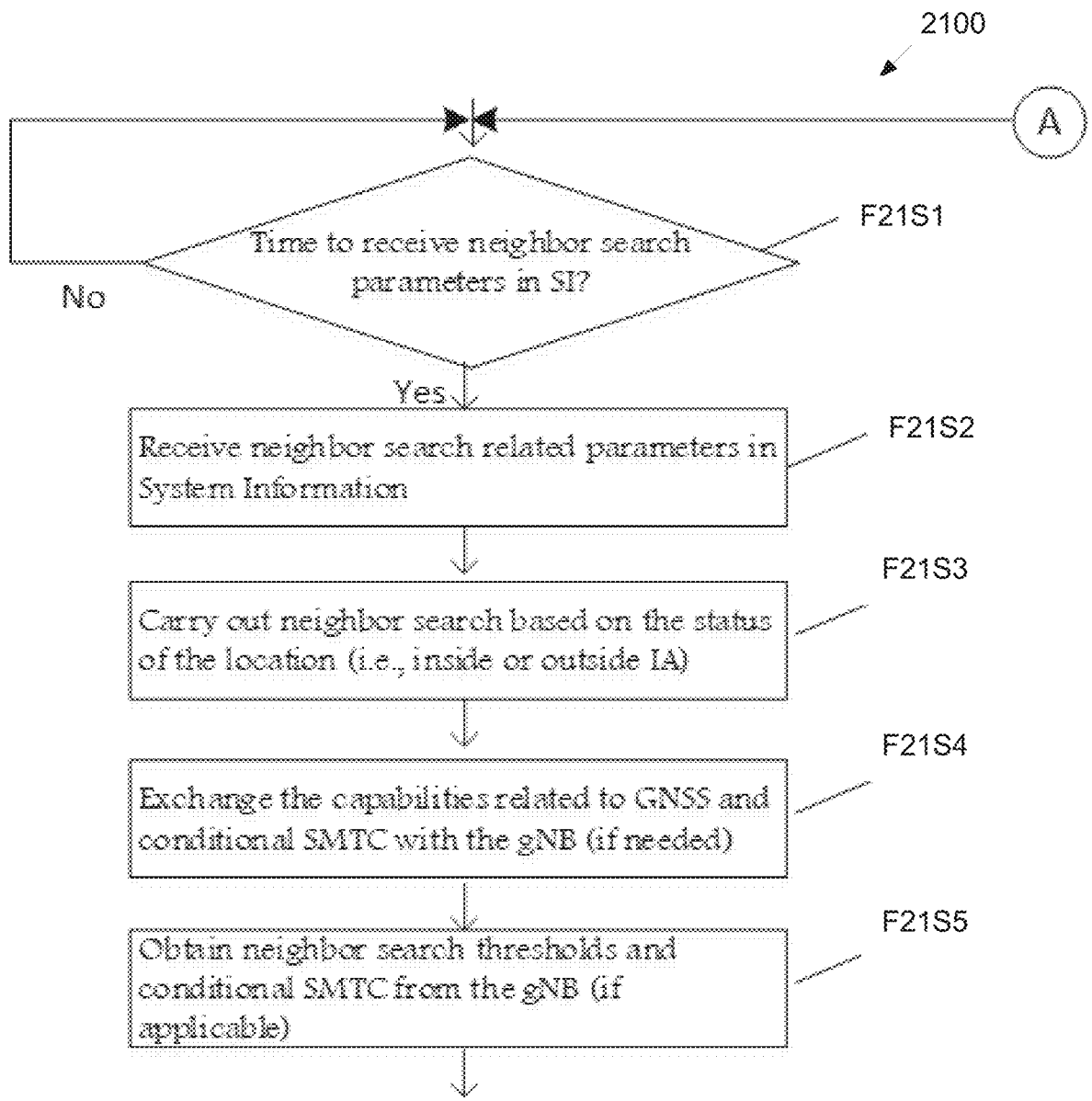
FIG. 21A illustrates a flowchart of a method for enhanced CHO according to embodiments of the present disclosure.

FIG. 21A illustrates a flowchart of a method 2100 for enhanced CHO according to embodiments of the present disclosure. For example, the method 2100 as may be performed by a UE such as 111-116 as illustrated in FIG. 1. An embodiment of the method 2100 shown in FIG. 21A is for illustration only. One or more of the components illustrated in FIG. 21A can be implemented in specialized circuitry configured to perform the noted functions or one or more of the components can be implemented by one or more processors executing instructions to perform the noted functions.

Figure 21B:
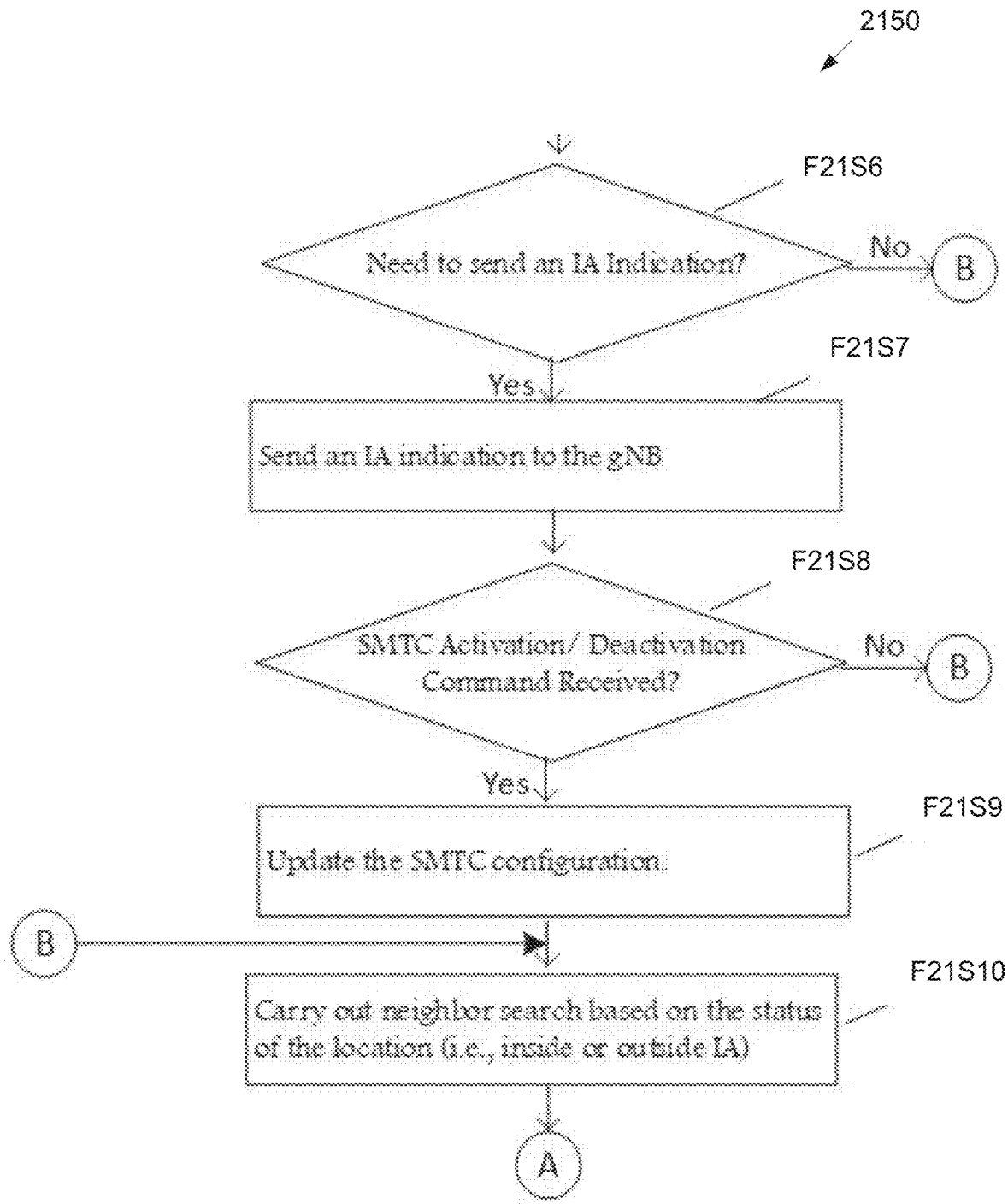
FIG. 21B illustrates a flowchart of a method for enhanced CHO according to embodiments of the present disclosure.

FIG. 21B illustrates a flowchart of a method 2150 for enhanced CHO according to embodiments of the present disclosure. For example, the method 2150 as may be performed by a UE such as 111-116 as illustrated in FIG. 1. An embodiment of the method 2150 shown in FIG. 21B is for illustration only. One or more of the components illustrated in FIG. 21B can be implemented in specialized circuitry configured to perform the noted functions or one or more of the components can be implemented by one or more processors executing instructions to perform the noted functions. Note that Step F21S6 as illustrated in FIG. 21B is connected to Step F21S5 as illustrated in FIG. 21A.

As illustrated in Step F21S1, in an example, the UE evaluates if it is time to receive one or more parameters related to neighbor cell search in system information. As described in Step F20S2 for FIG. 20, the gNB may send parameters such as neighbor search thresholds, reference point coordinates, and beam type with different periodicities. If it is the time to receive such parameters, the UE proceeds to Step F21S2; otherwise, the UE waits for such instant to arrive. For example, the UE may prepare to receive neighbor search thresholds with the periodicity of X ms, where X is known to both the gNB and the UE per specifications.

In Step F21S2, the UE receives neighbor search related parameters in system information in an existing or new SIB in an embodiment.

In Step F21S3, in an example, the UE carries out neighbor cell search based on the status of its location (e.g., inside the IA or outside the IA). More specifically, the UE utilizes the neighbor cell search thresholds received from the gNB in Step F21S2 and evaluates the conditions such as one or more of Equation (2), Equation (4), and Equation (5) to determine if the UE is inside the IA or outside the IA. The specific triggers used by the UE may be explicitly defined in specifications or broadcast by the gNB as summarized in Step F20S3 for FIG. 20. Based on whether one or more trigger conditions are satisfied or not, the UE decides whether to carry out or not carry out neighbor cell search.

In Step F21S3, for the distance-based criterion, the GNSS-capable UE calculates the distance between itself and the center of the serving cell (identified by the reference point coordinates obtained from the gNB in Step F21S2) before evaluating Equation (4).

In Step F21S3, for the time-based criterion used in Equation (5), the UE maintains a timer that keeps track of the time elapsed since the last cell reselection. Such timer is reset each time the UE performs cell reselection.

In Step F21S4, the connected mode UE exchanges UE capability enquiry and UE capability information messages with the gNB. More specifically, in response to the received UE capability enquiry message, the UE indicates to the gNB in the UE capability information if the UE has a GNSS capability in an example. In another example, when all UEs are required to support the GNSS capability, such explicit GNSS capability indication is not needed. In yet another example, if the UE belongs to a specific category, the UE may support the GNSS capability, and, an explicit GNSS capability indication is not needed. In an example implementation, the UE may also inform the gNB about the UE's support for conditional SMTC.

In Step F21S5, in an example, the connected mode UE may receive UE=-specific neighbor search configuration from the gNB (e.g., trigger conditions and neighbor search thresholds) in an RRC reconfiguration message. The UE may also receive conditional SMTC information from the gNB in an RRC reconfiguration message (e.g., the use or the absence of the use of conditional SMTC and IA indication reporting configuration if applicable). The neighbor search parameters received via dedicated signaling supersede the parameter settings obtained via SIB(s).

If the gNB has not configured the UE for conditional SMTC configuration (i.e., traditional 3GPP R16 SMTC is configured for the UE), the UE skips Steps F21S6 to F21S9.

In Step F21S6, in an embodiment, the UE checks if the UE needs to send an IA indication or not. If not, the UE proceeds to Step F21S10; otherwise, the UE proceeds to Step F21S7. In an example, the UE decides not to send an IA indication if there is no change in the IA indication compared to the last IA indication sent to the gNB. In another example, the UE always sends the IA indication along with another suitable report or UL control information.

In Step F21S7, in an embodiment, the UE sends the IA indication via MAC, PHY, or RRC signaling. For example, the UE may send the IA indication (e.g., inside the IA or outside the IA per evaluation of the trigger conditions such as Equation (3), Equation (4), and/or Equation (6)) in an existing or new MAC CE. The UE may also send the IA indication via PHY signaling such as a UCI, a PUCCH sequence, a re-purposed PUCCH, or using a new PUCCH format. A header at a suitable radio protocol stack layer (e.g., MAC) may also be used by the UE to send the IA indication (e.g., a reserved bit if available).

In Step F21S8, in an embodiment, the UE checks if the UE has received an activation or deactivation command from the gNB. If not, the UE proceeds to Step F21S10; otherwise, the UE proceeds to Step F21S9.

In Step F21S9, in an embodiment, the UE updates its SMTC configuration (e.g., whether to use SMTC for making neighbor cell measurements or not perform neighbor cell measurements). The UE then proceeds to Step F21S10.

In Step F21S10, in an embodiment, the UE carries out neighbor cell search, if necessary, based on its location (i.e., inside IA or outside the IA) and the activation/deactivation command received from the gNB. For example, if one or more of the trigger conditions is satisfied (indicating that the UE is inside the IA) and if the gNB has not sent an activation command, the connected mode UE does not perform the neighbor cell search. In contrast, if the UE is outside the IA and the gNB has sent the activation command for conditional SMTC, the UE performs neighbor cell search. The UE then goes to Step F21S1.

In an embodiment, an absolute time is used to facilitate determination of the IA. More specifically, Equation (2) is replaced by Equation (E1) specified below:

"startTimeThreshold<absoluteTime<end-
TimeThreshold"  Equation (E1)

In Equation (E1), "absoluteTime" represents the current time, startTimeThreshold is the start of the time window during which neighbor cell measurements can potentially be skipped, and endTimeThreshold is the end of the time window during which neighbor cell measurements can potentially be skipped and the measurements on neighboring cells are completed until that time. The time thresholds, startTimeThreshold and endTimeThreshold, are determined by the gNB. If the condition in Equation (E1) is satisfied, the idle/inactive mode UE is inside the IA and hence does not need to perform neighbor cell measurements. In contrast, if the condition in Equation (E1) is not satisfied, the idle/inactive mode UE is outside the IA and hence is required to perform neighbor cell measurements.

In an embodiment, Equation (E1) is also used by connected mode UEs to determine if the UEs are in the IA or not. In such case, the thresholds broadcast by the gNB can be used as initial or default values. In another example, such thresholds are conveyed to the UE by the gNB in a unicast or groupcast/multicast manner. When dedicated RRC signaling is used, an RRC message such as RRC reconfiguration message can convey such thresholds.

In another embodiment, the criterion of Equation (E1) is combined with Equation (2) using a logical AND condition for idle/inactive mode UEs to create a combined neighbor search criterion that utilizes both RSRP/RSRQ and absolute time. In other words, when both Equation (2) and Equation (E1) are satisfied, the UE does not need to search for neighbors. Such combined criterion is also used by connected mode UEs in another example.

In yet another embodiment, the criterion of Equation (E1) is combined with Equation (2) using a logical OR condition for idle/inactive mode UEs to create a combined neighbor search criterion that utilizes both RSRP/RSRQ and absolute time. In other words, when either Equation (2) or Equation (E1) is satisfied, the UE does not need to search for neighbors. Such combined criterion is also used by connected mode UEs in another example.

In another embodiment, the criterion of Equation (E1) is combined with Equation (4) using a logical AND condition for idle/inactive mode UEs to create a combined neighbor search criterion that utilizes both distance and absolute time. In other words, when both Equation (4) and Equation (E1) are satisfied, the UE does not need to search for neighbors. Such combined criterion is also used by connected mode UEs in another example.

In another embodiment, the criterion of Equation (E1) is combined with Equation (4) using a logical OR condition for idle/inactive mode UEs to create a combined neighbor search criterion that utilizes both distance and absolute time. In other words, when either Equation (4) or Equation (E1) is satisfied, the UE does not need to search for neighbors. Such combined criterion is also used by connected mode UEs in another example.

In an embodiment, only the end time threshold is used as shown in Equation (E2). More specifically, Equation (2) is replaced by Equation (E2) specified below:

"absoluteTime<endTimeThreshold"   Equation (E2)

In Equation (E2), "absoluteTime" represents the current time and endTimeThreshold is the end of the time window during which neighbor cell measurements can potentially be skipped and the measurements on neighboring cells are completed until that time. The time threshold, endTimeThreshold, is determined by the gNB. If the condition in Equation (E2) is satisfied, the idle/inactive mode UE is inside the IA and hence does not need to perform neighbor cell measurements. In contrast, if the condition in Equation (E2) is not satisfied, the idle/inactive mode UE is outside the IA and hence is required to perform neighbor cell measurements.

In an embodiment, Equation (E2) is also used by connected mode UEs to determine if the UEs are in the IA or not. In such case, the thresholds broadcast by the gNB can be used as initial or default values. In another example, such thresholds are conveyed to the UE by the gNB in a unicast or groupcast/multicast manner. When dedicated RRC signaling is used, an RRC message such as RRC reconfiguration message can convey such thresholds.

In another embodiment, the criterion of Equation (E2) is combined with Equation (2) using a logical AND condition for idle/inactive mode UEs to create a combined neighbor search criterion that utilizes both RSRP/RSRQ and absolute time. In other words, when both Equation (2) and Equation (E2) are satisfied, the UE does not need to search for neighbors. Such combined criterion is also used by connected mode UEs in another example.

In yet another embodiment, the criterion of Equation (E2) is combined with Equation (2) using a logical OR condition for idle/inactive mode UEs to create a combined neighbor search criterion that utilizes both RSRP/RSRQ and absolute time. In other words, when either Equation (2) or Equation (E2) is satisfied, the UE does not need to search for neighbors. Such combined criterion is also used by connected mode UEs in another example.

In another embodiment, the criterion of Equation (E2) is combined with Equation (4) using a logical AND condition for idle/inactive mode UEs to create a combined neighbor search criterion that utilizes both distance and absolute time. In other words, when both Equation (4) and Equation (E2) are satisfied, the UE does not need to search for neighbors. Such combined criterion is also used by connected mode UEs in another example.

In another embodiment, the criterion of Equation (E2) is combined with Equation (4) using a logical OR condition for idle/inactive mode UEs to create a combined neighbor search criterion that utilizes both distance and absolute time. In other words, when either Equation (4) or Equation (E2) is satisfied, the UE does not need to search for neighbors. Such combined criterion is also used by connected mode UEs in another example.

In an embodiment, multiple criteria of RSRP/RSRQ, distance, timer, and time are combined in a flexible manner (e.g., various combinations of logical AND OR operations) to create a more robust or reliable neighbor search criterion. The specific combinations are explicitly specified by the gNB via unicast, groupcast/multicast, or broadcast signaling in one example. In another example, such allowed combinations are pre-defined in specifications, and the UE makes use of these combinations implicitly (e.g., via one or more rules). In yet another example, the gNB indicates which combination(s) may be used by UEs.

In an example, the UE makes measurements and stores them as historical measurements with a configurable time periodicity (e.g., N samples of RSRP/RSRQ of the serving cell and neighbor cells and M samples of GNSS-based UE location) if the UE has determined that the UE is outside the IA. The UE reports these historical measurements via suitable RRC signaling (e.g., in a measurement report message) when a relevant measurement reporting criterion is met.

In an embodiment, the absolute time in Equation (E1) and Equation (E2) is expressed as the UTC time (i.e., universal coordinated time). In another example, one or more of the NR time units such as hyperframe number, system frame number, subframe number, slot number, and OFDM symbol number are used to specify the time. Furthermore, in an example, to represent the absolute time in a compact manner, the gNB may specify the thresholds such as a reference time or common portion of the time thresholds is specified first, and unique or incremental portion of the time is specified separately. This may reduce the overall length of the signaling message, increasing the signaling efficiency.

In an embodiment, the serving cell conveys to the UE via unicast, groupcast/multicast, or broadcast signaling the start and/or end times of the neighbor cells in the overall geographic area where the UE is currently located. For earth-fixed beams and earth-moving beams, such times are not needed, because the relative positions of cells are fixed (i.e., these relative positions do not change from one instant to the next). For quasi-earth-moving beams, the neighbor cells are of two classes-(i) the ones that are currently geographic neighbors of the serving cell and (ii) the ones that would provide coverage in future.

In an embodiment, for quasi-earth-fixed beams, end times of the first class of neighbors are specified, and start and end times of the second class of neighbors are specified to facilitate cell reselection and handover.

Four standalone triggers and their combinations were identified earlier as represented by the equations: RSRP- and RSRQ-based Equation (2), S-MeasureConfig-based Equation (3), Equation (4), and Equation (5).

In an example, the criterion (5) is used by the UE in Step F21S10 to determine if the UE is inside the Inner Area or not:

"UE position within the elliptical geographic area?"   Criterion (5)

In criterion (5), the UE utilizes the cell center (i.e., the reference point expressed as (cx, cy)), the major axis of the IA (majorAxis=2a, with a=semi-major axis), and minor axis of the IA (minorAxis=2b, with b=semi-major axis) and its GNSS-based position (ueX, ueY) to determine if the UE is inside the IA nor not. The UE receives (cx, cy), majorAxis (or semi-major axis), and minorAxis (or semi-minor axis) in Step F21S2 and/or Step F21S5.

The UE determines whether the UE is inside (or on) the IA or nor in an implementation-specific manner. Here is one possible example. The UE calculates the following quantity: comparisonValue=$(ueX-cx)^2/a^2+(ueY-cy)^2/b^2$. If comparisonValue<=1, the UE is inside or on the IA. Otherwise, the is outside the IA.

In one example, if the criterion (5) is used as the sole standalone criterion, the UE does not need to perform neighbor cell measurements. In contrast, if the criterion (5) is not satisfied, the UE is required to perform neighbor cell measurements.

In another example, the criterion (5) is combined with one or more of other criteria (e.g., Equation (2), Equation (3), Equation (5), Equation (7), and/or Equation (8)) to create a combination criteria using functions such as logical AND logical OR. In an embodiment, if the combined criteria is satisfied, the UE does not need to carry out the neighbor cell search. Otherwise, the UE needs to carry out the neighbor cell search.

In an example, the combined criterion for neighbor search is created by using logical AND between the RSRP/RSRQ-based Equation (2) and elliptical area-based Equation (6) as follows:

If Equation (2) is satisfied AND Equation (6) is satisfied, the UE does not need to carry out neighbor cell measurements. Otherwise, the UE needs to carry out neighbor cell measurements. (CCNS-1): [CCNS=Combined Criterion for Neighbor Search].

In another embodiment, the combined criterion for neighbor search is created by using logical AND between the S-MeasureConfig-based Equation (3) and elliptical area-based Equation (6) as follows: if Equation (3) is satisfied AND Equation (6) is satisfied, the UE does not need to carry out neighbor cell measurements. Otherwise, the UE needs to carry out neighbor cell measurements. (CCNS-2).

The criteria (CCNS-1) and (CCNS-2) can be helpful for earth-fixed beams and earth-moving beams.

The criterion (5) is useful when the coverage area of the beam illuminated in an NTN cell is elliptical. Hence, the criterion (5) can be considered as an alternative to the distance-based criterion of Equation (4).

In an example, timer-based Equation (7) is used by the UE in Step F21S10 to determine if the UE needs to search for neighbor cells or not, as shown:

$$\text{"timerForNeighborSearch<timerThreshold-ForNeighborSearch"} \quad \text{Equation (7)}$$

In Equation (7), "timerForNeighborSearch" is the time elapsed since cell selection, cell reselection, or handover of/to the current serving cell, and timerThresholdForNeighborSearch is the timer threshold (e.g., in seconds, milliseconds, or minutes) determined by the gNB. The UE receives timerThresholdForNeighborSearch in Step F21S2 and/or Step F21S5.

In one example, if the condition in Equation (7) is satisfied and if Equation (7) is used as the sole standalone criterion, the UE does not need to perform neighbor cell measurements. In contrast, if the condition in Equation (7) is not satisfied and if Equation (7) is used as the sole standalone criterion, the UE is required to perform neighbor cell measurements.

In Equation (7), "<" can be replaced by "<=" in another implementation.

In another example, the condition in Equation (7) is combined with one or more of other criteria (e.g., Equation (2), Equation (3), Equation (4), and/or Equation (6)) to create a combination criteria using functions such as logical AND logical OR. In an embodiment, if the combined criteria is satisfied, the UE does not need to carry out the neighbor cell search. Otherwise, the UE needs to carry out the neighbor cell search.

In an example, the combined criterion for neighbor search is created by using logical AND between the RSRP/RSRQ-based Equation (2) and timer-based Equation (7) as follows: if Equation (2) is satisfied AND Equation (7) is satisfied, the UE does not need to carry out neighbor cell measurements. Otherwise, the UE needs to carry out neighbor cell measurements. (CCNS-3). [CCNS=Combined Criterion for Neighbor Search].

In another embodiment, the combined criterion for neighbor search is created by using logical AND between the S-MeasureConfig-based Equation (3) and timer-based Equation (7) as follows: if Equation (3) is satisfied AND Equation (7) is satisfied, the UE does not need to carry out neighbor cell measurements. Otherwise, the UE needs to carry out neighbor cell measurements. (CCNS-4)

The criteria (CCNS-3) and (CCNS-4) can be helpful for quasi-earth-fixed beams.

In an example, absolute time-based Equation (8) is used by the UE in Step F21S10 to determine if the UE needs to search for neighbor cells or not, as shown:

$$\text{"currentAbsoluteTime<absoluteTimeThresholdForNeighborSearch"} \quad \text{Equation (8)}$$

In Equation (8), "currentAbsoluteTime" is the current absolute time (e.g., in UTC or another suitable format) and absoluteTimeThresholdForNeighborSearch is the absolute time threshold (e.g., in UTC or another suitable format) determined by the gNB. The UE receives absoluteTimeThresholdForNeighborSearch in Step F21S2 and/or Step F21S5. In another implementation, ab soluteTimeThresholdForNeighborSearch may expressed as (endServingTime−searchTimeMargin), where endServingTime is the time when the serving cell is configured to stop serving the current geographic area (e.g., in case of quasi-earth-fixed beams) and searchTimeMargin is the time margin available to UEs to search for neighbor cells. In other words, the gNB may specify endServingTime and searchTimeMargin to the UE in Step F21S2 and/or Step F21S5 instead of ab soluteTimeThresholdForNeighborSearch.

In one example, if the condition in Equation (8) is satisfied and if Equation (8) is used as the sole standalone criterion, the UE does not need to perform neighbor cell measurements. In contrast, if the condition in Equation (8) is not satisfied and if Equation (8) is used as the sole standalone criterion, the UE is required to perform neighbor cell measurements.

In Equation (8), "<" can be replaced by "<=" in another implementation.

In another example, the condition in Equation (8) is combined with one or more of other criteria (e.g., Equation (2), Equation (3), Equation (4), and/or Equation (6)) to create a combination criteria using functions such as logical AND logical OR. In an embodiment, if the combined criteria is satisfied, the UE does not need to carry out the neighbor cell search. Otherwise, the UE needs to carry out the neighbor cell search.

In an example, the combined criterion for neighbor search is created by using logical AND between the RSRP/RSRQ-based Equation (2) and absolute time-based Equation (8) as follows: if Equation (2) is satisfied AND Equation (8) is satisfied, the UE does not need to carry out neighbor cell measurements. Otherwise, the UE needs to carry out neighbor cell measurements. (CCNS-5). [CCNS=Combined Criterion for Neighbor Search].

In another embodiment, the combined criterion for neighbor search is created by using logical AND between the S-MeasureConfig-based Equation (3) and absolute time-based Equation (8) as follows: if Equation (3) is satisfied AND Equation (8) is satisfied, the UE does not need to carry out neighbor cell measurements. Otherwise, the UE needs to carry out neighbor cell measurements. (CCNS-6).

The criteria (CCNS-5) and (CCNS-6) can be helpful for quasi-earth-fixed beams.

In an embodiment, the neighbor cell search criteria described in this disclosure is used for intra-NTN neighbor cell search.

Figure 22:
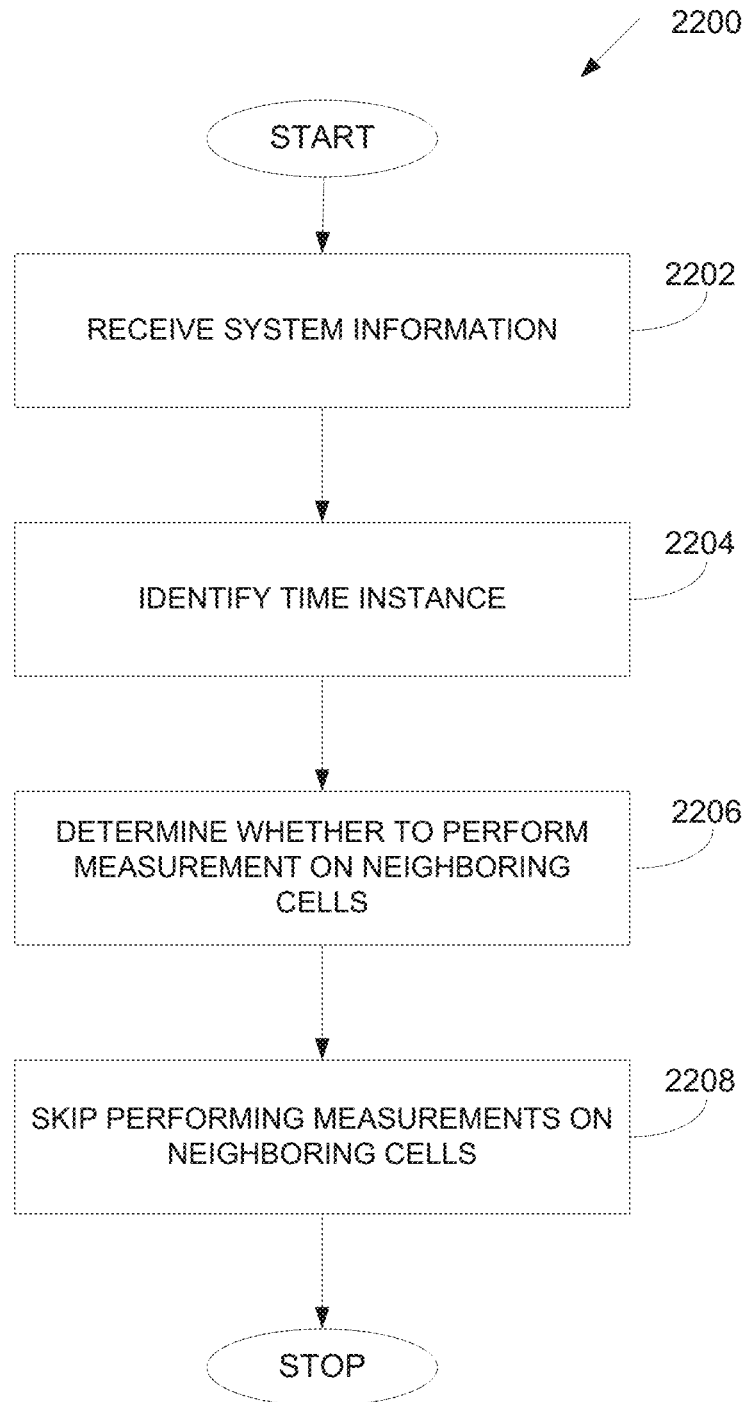
FIG. 22 illustrates a flowchart of a method for an efficient neighbor cell search in a wireless communication network according to embodiments of the present disclosure.

FIG. 22 illustrates a flowchart of a method 2200 for an efficient neighbor cell search in a wireless communication network according to embodiments of the present disclosure. For example, the method 2200 as may be performed by a UE such as 111-116 as illustrated in FIG. 1. An embodiment of the method 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions.

As illustrated in FIG. 22, the method 2200 begins at step 2202. In step 2202, the UE receives system information including time instance information for performing measurements on neighboring cells.

Subsequently, in step 2204, the UE identifies a time instance included in the time instance information. In step 2204, the time instance includes an ending time of the measurements on the neighboring cells.

Next, in step 2206, the UE determines, based on a comparison between a current absolute time and the time instance, whether to perform the measurements on the neighboring cells.

Finally, in step 2208, the UE skips performing the measurements on the neighboring cells based on a determination that the current absolute time is before the time instance.

In one embodiment, the UE identifies a geographical location of the UE, determines a distance between the geographical location of the UE and a location reference point, and skips performing the measurements on the neighboring cells based on the determination that the distance is less than a distance threshold. In such embodiment, the system information further includes the distance threshold and the location reference point.

In one embodiment, the UE measures RSRP and RSRQ based on signals received from a serving cell and skips performing the measurements on the neighboring cells based on a determination that the measured RSRP and RSRQ are greater than thresholds. In such embodiment, the system information further includes the thresholds associated with the RSRP and RSRQ.

In one embodiment, the UE skips performing the measurements on the neighboring cells based on a determination that the current absolute time is between a starting time and an ending time. In such embodiment, the time instance information further includes the starting time and the ending time to skip performing the measurements on the neighboring cells.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
 a transceiver configured to receive system information including time instance information for performing measurements on neighboring cells; and
 a processor operably coupled to the transceiver, the processor configured to:
 identify a time instance included in the time instance information, wherein the time instance includes an ending time of the measurements on the neighboring cells,
 determine, based on a comparison between a current absolute time and the time instance, whether to perform the measurements on the neighboring cells, and
 skip performing the measurements on the neighboring cells based on a determination that the current absolute time is before the time instance.

2. The UE of claim 1, wherein:
 the system information further includes a distance threshold and a location reference point; and
 the processor is further configured to:
 identify a geographical location of the UE;
 determine a distance between the geographical location of the UE and the location reference point; and
 skip performing the measurements on the neighboring cells based on the determination that the distance is less than the distance threshold.

3. The UE of claim 1, wherein:
 the system information further includes thresholds associated with reference signal received power (RSRP) and reference signal received quality (RSRQ); and
 the processor is further configured to:
 measure RSRP and RSRQ based on signals received from a serving cell, and
 skip performing the measurements on the neighboring cells based on a determination that the measured RSRP and RSRQ are greater than the thresholds.

4. The UE of claim 1, wherein:
 the time instance information further includes a starting time and an ending time to skip performing the measurements on the neighboring cells; and
 the processor is further configured to skip performing the measurements on the neighboring cells based on a determination that the current absolute time is between the starting time and the ending time.

5. A method of a user equipment (UE) in a wireless communication system, the method comprising:
receiving system information including time instance information for performing measurements on neighboring cells;
identifying a time instance included in the time instance information, wherein the time instance includes an ending time of the measurements on the neighboring cells;
determining, based on a comparison between a current absolute time and the time instance, whether to perform the measurements on the neighboring cells; and
skipping performing the measurements on the neighboring cells based on a determination that the current absolute time is before the time instance.

6. The method of claim 5, further comprising:
identifying a geographical location of the UE;
determining a distance between the geographical location of the UE and a location reference point; and
skipping performing the measurements on the neighboring cells based on the determination that the distance is less than a distance threshold,
wherein the system information further includes the distance threshold and the location reference point.

7. The method of claim 5, further comprising:
measuring reference signal received power (RSRP) and reference signal received quality (RSRQ) based on signals received from a serving cell; and
skipping performing the measurements on the neighboring cells based on a determination that the measured RSRP and RSRQ are greater than thresholds,
wherein the system information further includes the thresholds associated with the RSRP and RSRQ.

8. The method of claim 5, further comprising skipping performing the measurements on the neighboring cells based on a determination that the current absolute time is between a starting time and an ending time,
wherein the time instance information further includes the starting time and the ending time to skip performing the measurements on the neighboring cells.

9. A base station (BS) in a wireless communication system, the BS comprising:
a processor configured to generate time instance information including a time instance, wherein the time instance includes an ending time of measurements on neighboring cells; and
a transceiver operably coupled to the processor, the transceiver configured to transmit system information including the time instance information for the measurements on the neighboring cells,
wherein:
whether to perform the measurements on the neighboring cells is determined based on a comparison between a current absolute time and the time instance included in the time instance information, and
performing the measurements on the neighboring cells is skipped based on a determination that the current absolute time is before the time instance.

10. The BS of claim 9, wherein:
the system information further includes a distance threshold and a location reference point for determining a distance between a geographical location of a user equipment (UE) and the location reference point; and
performing the measurements on the neighboring cells is skipped based on the determination that the distance is less than the distance threshold.

11. The BS of claim 9, wherein:
the system information further includes thresholds associated with reference signal received power (RSRP) and reference signal received quality (RSRQ) for measuring the RSRP and RSRQ based on signals received from a serving cell; and
performing the measurements on the neighboring cells is skipped based on a determination that the measured RSRP and RSRQ are greater than the thresholds.

12. The BS of claim 9, wherein:
the time instance information further includes a starting time and an ending time to skip performing the measurements on the neighboring cells; and
performing the measurements on the neighboring cells is skipped based on a determination that the current absolute time is between the starting time and the ending time.

* * * * *